United States Patent
Jung et al.

(10) Patent No.: US 11,842,039 B2
(45) Date of Patent: Dec. 12, 2023

(54) ELECTRONIC DEVICE AND METHOD FOR OPERATING SCREEN CAPTURING BY ELECTRONIC DEVICE

(71) Applicant: Samsung Electronics Co., Ltd., Suwon-si (KR)

(72) Inventors: Inhyung Jung, Suwon-si (KR); Sangheon Kim, Suwon-si (KR); Banghyun Kwon, Suwon-si (KR); Hyewon Park, Suwon-si (KR); Dongjun Lee, Suwon-si (KR); Hyungdo Lee, Suwon-si (KR); Yeunwook Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/072,748

(22) Filed: Oct. 16, 2020

(65) Prior Publication Data

US 2021/0117073 A1    Apr. 22, 2021

(30) Foreign Application Priority Data

Oct. 17, 2019    (KR) .................. 10-2019-0129475

(51) Int. Cl.
   *G06F 3/048*    (2013.01)
   *G06F 3/04842*   (2022.01)
   (Continued)

(52) U.S. Cl.
   CPC .......... *G06F 3/04842* (2013.01); *G06T 11/60* (2013.01); *G06V 10/17* (2022.01);
   (Continued)

(58) Field of Classification Search
   CPC ............. G06F 3/04842; G06F 3/04845; G06F 1/1616; G06F 1/1626; G06F 3/04883;
   (Continued)

(56) References Cited

U.S. PATENT DOCUMENTS 8,957,865 B2    2/2015  Cieplinski et al.
9,939,979 B2*   4/2018  Sung ................ H04N 5/232933
   (Continued)

FOREIGN PATENT DOCUMENTS

CN    107678648 A  *  2/2018
CN    107678648 A     2/2018
   (Continued)

OTHER PUBLICATIONS

International Search Report dated Jan. 26, 2021, issued in International Application No. PCT/KR2020/014171.
(Continued)

*Primary Examiner* — Rashawn N Tillery
(74) *Attorney, Agent, or Firm* — Jefferson IP Law, LLP

(57) ABSTRACT

A method for operating capturing by an electronic device is provided. The method includes capturing a screen displayed on a display, extracting at least one region and/or block region from the captured screen, determining whether a command to modify the captured screen has been received, when it is determined that a command to modify the captured screen has been received, determining whether there is a region of interest (ROI) in the captured screen, based on the extracted at least one region and/or block region, and when the ROI exists, displaying a user interface for suggesting the region of interest.

20 Claims, 47 Drawing Sheets

(51) Int. Cl.
*G06T 11/60* (2006.01)
*G06V 10/22* (2022.01)
*G06V 10/25* (2022.01)
*G06V 10/10* (2022.01)
*G06V 40/20* (2022.01)

(52) U.S. Cl.
CPC ............ *G06V 10/235* (2022.01); *G06V 10/25* (2022.01); *G06V 40/28* (2022.01); *G06T 2200/24* (2013.01)

(58) Field of Classification Search
CPC ..... G06F 3/048; G06T 11/60; G06T 2200/24; G06T 1/0007; G06T 7/11; G06K 9/2081; G06V 10/17; G06V 10/25; G06V 40/28; H04M 1/72403
See application file for complete search history.

(56) References Cited

U.S. PATENT DOCUMENTS

| | | | | |
|---|---|---|---|---|
| 9,996,249 B2* | 6/2018 | Park | .................. | G06F 3/0488 |
| 2006/0280364 A1* | 12/2006 | Ma | .................. | G06V 10/25 |
| | | | | 345/620 |
| 2011/0043652 A1* | 2/2011 | King | .................. | G06F 40/194 |
| | | | | 348/222.1 |
| 2012/0044137 A1* | 2/2012 | Oddiraju | .................. | H04N 5/4448 |
| | | | | 345/530 |
| 2012/0072833 A1* | 3/2012 | Song | .................. | G06F 40/106 |
| | | | | 715/243 |
| 2014/0101579 A1* | 4/2014 | Kim | .................. | G06F 3/04883 |
| | | | | 715/761 |
| 2014/0123018 A1* | 5/2014 | Park | .................. | G06F 3/0484 |
| | | | | 715/738 |
| 2014/0313143 A1* | 10/2014 | Jung | .................. | G06F 3/04817 |
| | | | | 345/173 |
| 2014/0364158 A1* | 12/2014 | Hwang | .................. | H04W 4/185 |
| | | | | 455/466 |
| 2014/0372540 A1* | 12/2014 | Libin | .................. | H04L 12/1822 |
| | | | | 709/206 |
| 2015/0007024 A1 | 1/2015 | Jeong et al. | | |
| 2015/0095855 A1* | 4/2015 | Bai | .................. | G06F 3/017 |
| | | | | 715/863 |
| 2015/0220814 A1* | 8/2015 | Verkasalo | .......... | G06Q 20/3255 |
| | | | | 382/103 |
| 2015/0272546 A1* | 10/2015 | Cheon | .................. | G16H 50/30 |
| | | | | 600/408 |
| 2015/0339046 A1* | 11/2015 | Hegde | .................. | G06F 1/3265 |
| | | | | 715/798 |
| 2016/0103811 A1* | 4/2016 | Cullen | .................. | G06F 40/166 |
| | | | | 715/256 |
| 2016/0119576 A1* | 4/2016 | Takeda | .................. | H04N 9/8227 |
| | | | | 348/220.1 |
| 2016/0266769 A1* | 9/2016 | Oursbourn | .............. | G06F 9/451 |
| 2016/0313883 A1* | 10/2016 | Zhang | .................. | G06F 3/0484 |
| 2017/0011525 A1* | 1/2017 | Kim | .................. | H04N 5/23219 |
| 2017/0032257 A1* | 2/2017 | Sharifi | .................. | G06N 5/022 |
| 2017/0139575 A1* | 5/2017 | Chen | .................. | G06F 3/04845 |
| 2017/0148162 A1* | 5/2017 | Kang | .................. | G06T 7/0012 |
| 2017/0222965 A1 | 8/2017 | Hahm et al. | | |
| 2017/0238065 A1* | 8/2017 | Jang | .................. | H04N 21/251 |
| | | | | 725/19 |
| 2018/0114326 A1* | 4/2018 | Roblek | .................. | G06T 7/30 |
| 2018/0150967 A1* | 5/2018 | Averianov | .......... | H04N 5/23293 |
| 2018/0225032 A1* | 8/2018 | Jones | .................. | G06F 16/434 |
| 2018/0348992 A1* | 12/2018 | Ku | .................. | H04N 21/47217 |
| 2019/0147026 A1* | 5/2019 | Jon | .................. | G06F 3/04845 |
| | | | | 715/230 |
| 2019/0208412 A1* | 7/2019 | Lord | .................. | G06F 21/316 |
| 2020/0275048 A1* | 8/2020 | Fu | .................. | H04N 21/4668 |
| 2021/0042724 A1* | 2/2021 | Rathod | .................. | H04W 4/029 |
| 2021/0089334 A1* | 3/2021 | Thota | .................. | G06V 30/19173 |
| 2021/0177373 A1* | 6/2021 | Xie | .................. | A61B 8/469 |

FOREIGN PATENT DOCUMENTS

| | | | | |
|---|---|---|---|---|
| CN | 104536729 B | * | 2/2019 | |
| CN | 109407936 A | * | 3/2019 | ......... G06F 3/04845 |
| CN | 109726712 A | * | 5/2019 | |
| EP | 2813957 A1 | * | 12/2014 | ......... G06F 16/9566 |
| JP | 2017212568 A | * | 11/2017 | |
| JP | 2020091745 A | * | 6/2020 | |
| KR | 10-2009-0074580 A | | 7/2009 | |
| KR | 10-2010-0117156 A | | 11/2010 | |
| KR | 10-2014-0143610 A | | 12/2014 | |
| KR | 10-2015-0002180 A | | 1/2015 | |
| KR | 10-1500726 B1 | | 3/2015 | |
| WO | WO-2020063091 A1 | * | 4/2020 | ........... G06F 3/0484 |

OTHER PUBLICATIONS

Extended European Search Report dated Aug. 31, 2022, issued in a counterpart European Application No. 20877494.3.
European Office Action dated Aug. 4, 2023, issued in European Patent Application No. 20877494.3.

* cited by examiner

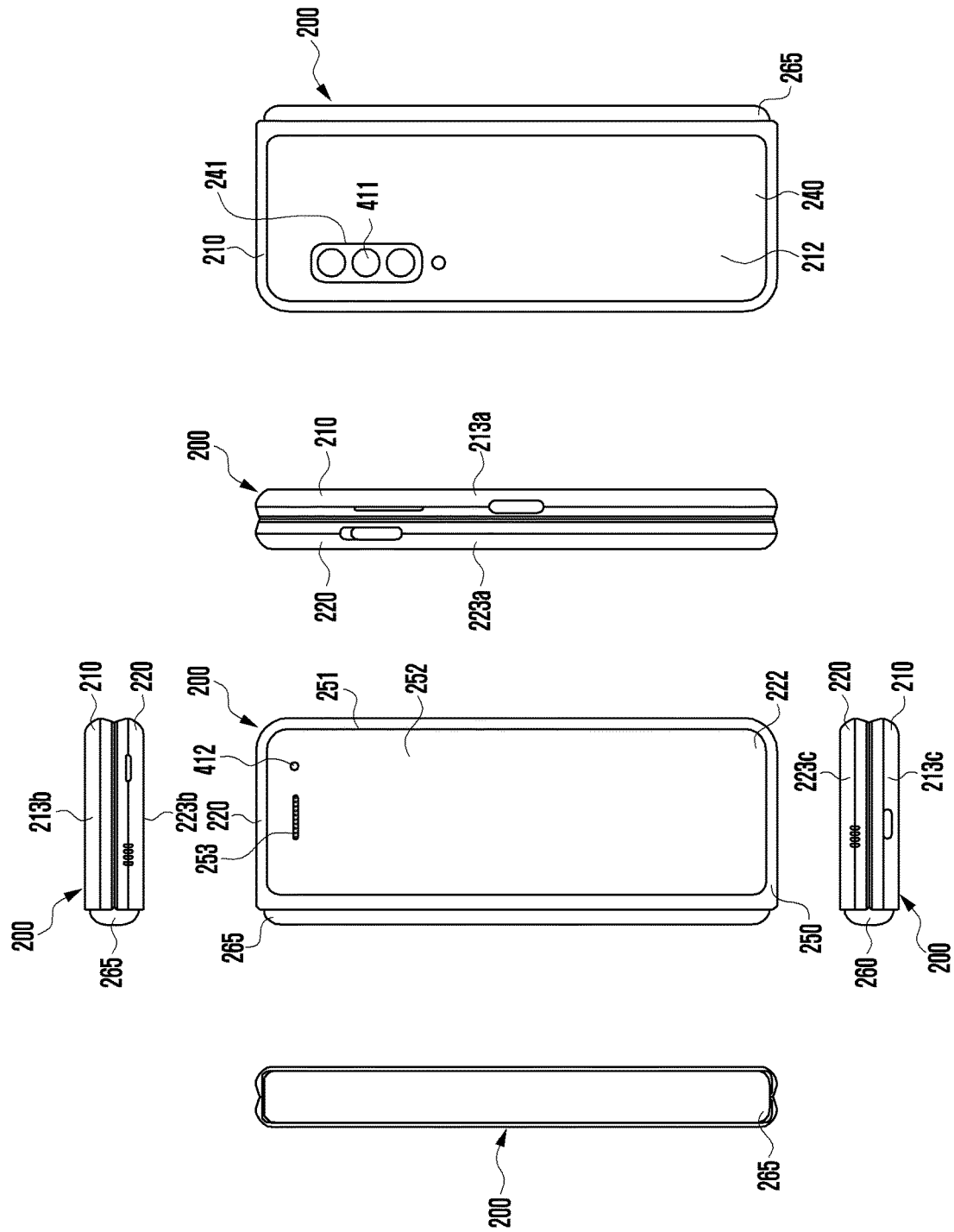

FIG. 30
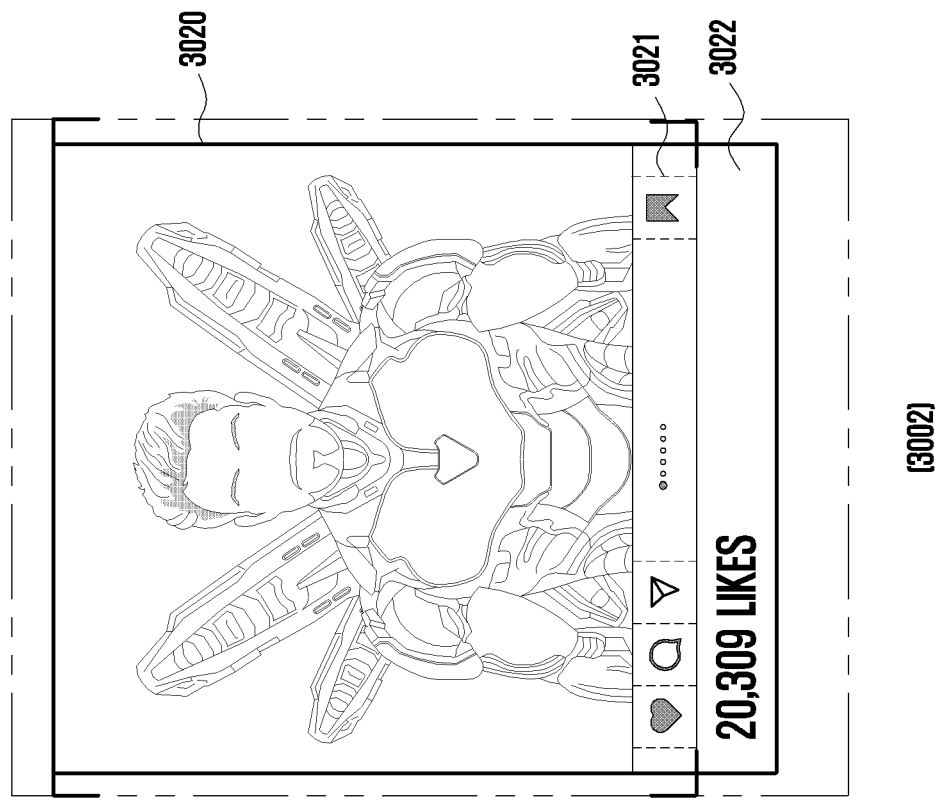
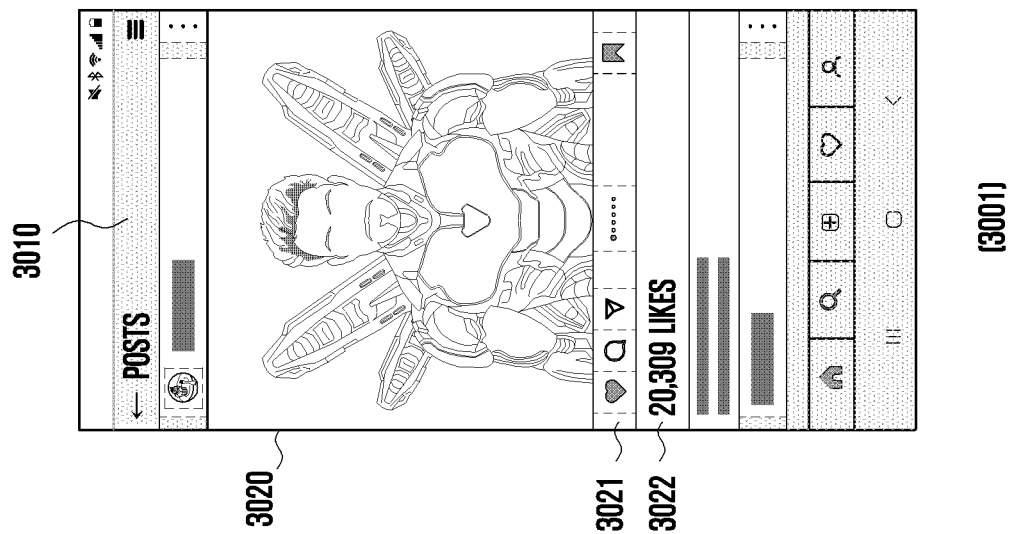

FIG. 36
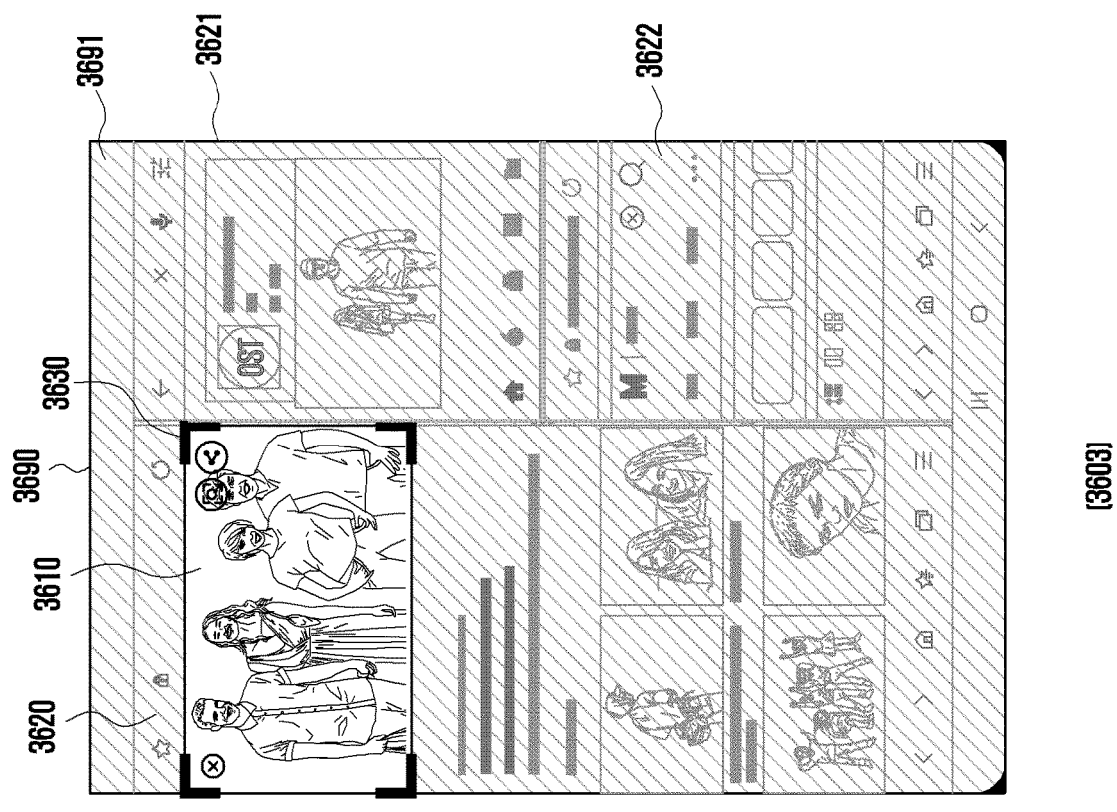
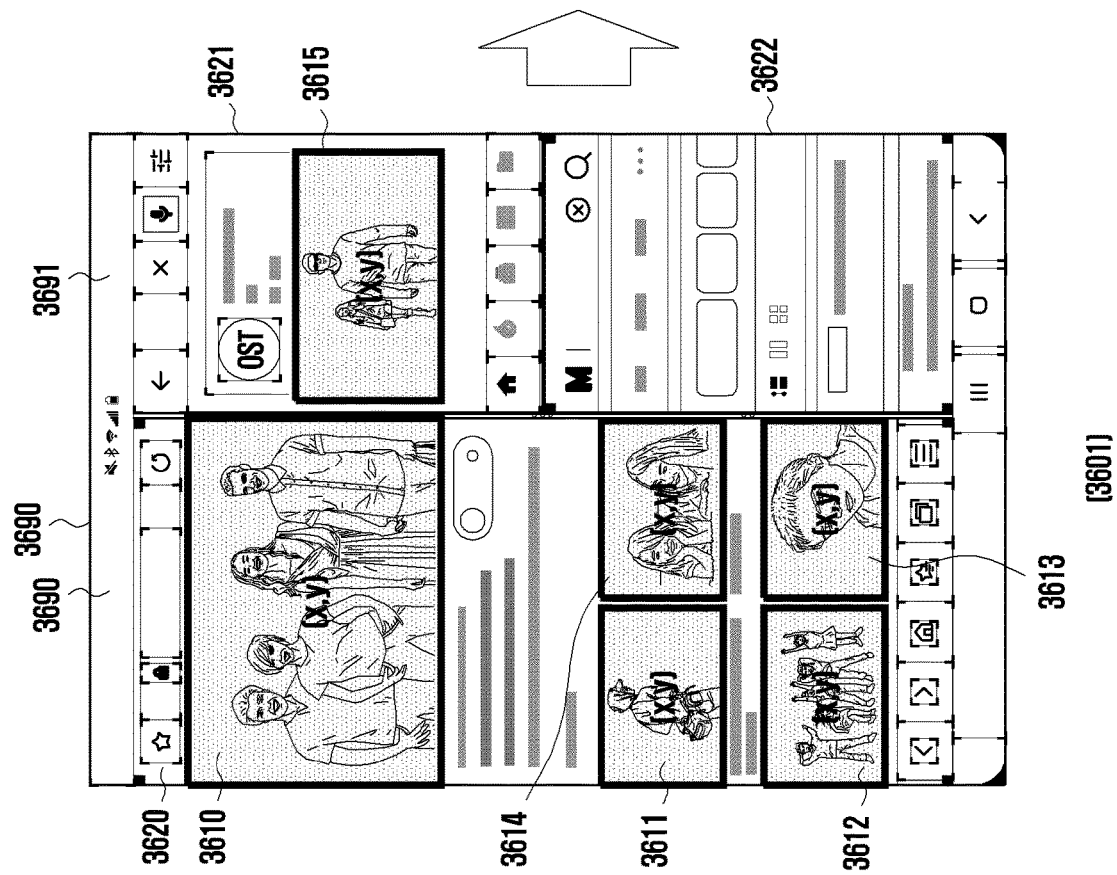

ELECTRONIC DEVICE AND METHOD FOR OPERATING SCREEN CAPTURING BY ELECTRONIC DEVICE

CROSS-REFERENCE TO RELATED APPLICATION(S)

This application is based on and claims priority under 35 U.S.C. § 119(a) of a Korean patent application number 10-2019-0129475, filed on Oct. 17, 2019, in the Korean Intellectual Property Office, the disclosure of which is incorporated by reference herein in its entirety.

BACKGROUND

1. Field

The disclosure relates to an electronic device and a method for operating screen capturing by an electronic device.

2. Description of Related Art

As mobile communication and hardware/software technologies develop, a portable electronic device (hereinafter, an electronic device) represented by a smartphone has constantly evolved to have various functions. An electronic device may include a touch screen-based display to allow a user to easily access various functions, and may provide screens of various applications through the display.

Recently, an electronic device may provide a function allowing a user to capture a screen being displayed on the display.

The above information is presented as background information only to assist with an understanding of the disclosure. No determination has been made, and no assertion is made, as to whether any of the above might be applicable as prior art with regard to the disclosure.

SUMMARY

When a user captures a screen of an electronic device, there is a problem in that an unintended screen is captured. In addition, if an unintended screen is captured, it is inconvenient for the user to control the electronic device several times.

Aspects of the disclosure are to address at least the above-mentioned problems and/or disadvantages and to provide at least the advantages described below. Accordingly, an aspect of the disclosure is to provide an electronic device and a method for operating screen capturing by an electronic device according to various embodiments of the disclosure, a screen intended or desired by a user may be captured.

Additional aspects will be set forth in part in the description which follows and, in part, will be apparent from the description, or may be learned by practice of the presented embodiments.

In accordance with an aspect of the disclosure, a method for operating capturing by an electronic device is provided. The method includes capturing a screen displayed on a display, extracting at least one region and/or block region from the captured screen, determining whether a command to modify the captured screen has been received, when it is determined that a command to modify the captured screen has been received, determining whether there is a region of interest (ROI) in the captured screen, based on the extracted at least one region and/or block region, and when the region of interest (ROI) exists, displaying a user interface for suggesting the region of interest.

In accordance with another aspect of the disclosure, an electronic device is provided. The electronic device includes a display, a processor operatively connected to the display, and a memory operatively connected to the processor, wherein the memory stores instructions which, when executed, cause the processor to capture a screen displayed on a display, extract at least one region and/or block region from the captured screen, determine whether a command to modify the captured screen has been received, when it is determined that a command to modify the captured screen has been received, determine whether there is a region of interest (ROI) in the captured screen, based on the extracted at least one region and/or block region, and when the region of interest (ROI) exists, display a user interface for suggesting the region of interest.

In an electronic device and a method for operating screen capturing by an electronic device according to various embodiments of the disclosure, a user interface for capturing a screen intended or desired by a user may be provided to improve a user experience.

In an electronic device and a method for operating screen capturing by an electronic device according to various embodiments of the disclosure, a user interface for capturing a screen intended or desired by a user may be provided to reduce the inconvenience of the user who has to control the electronic device several times to capture the screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages, of certain embodiments of the disclosure will be more apparent from the following description taken in conjunction with the accompanying drawings, in which:

FIG. 2B illustrates a folded state of an electronic device illustrated in FIG. 2A according to an embodiment of the disclosure;

FIG. 30 illustrates a sequence of an editing operation of an electronic device according to a user input according to an embodiment of the disclosure;

FIG. 36 is a diagram illustrating capturing operated by an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
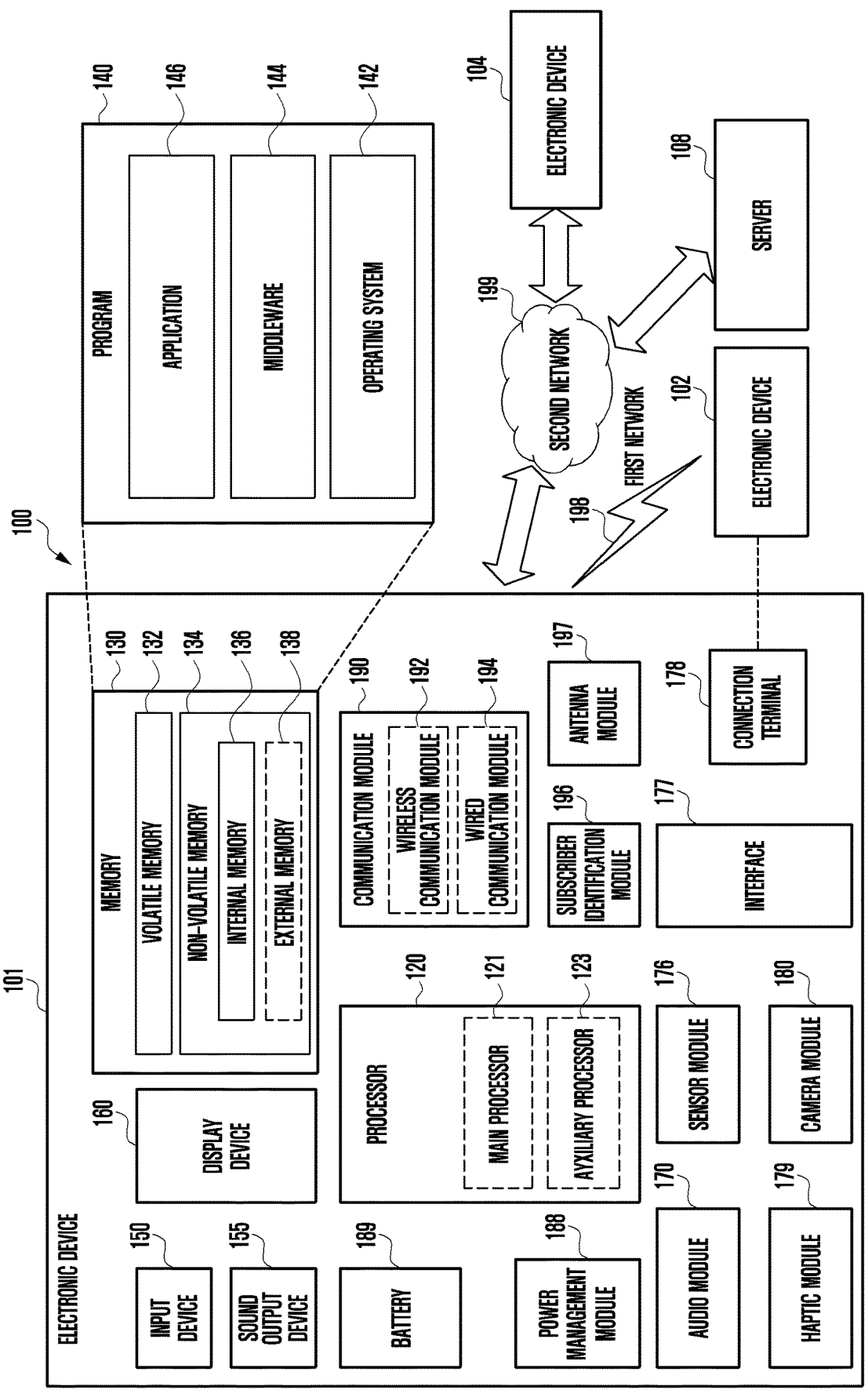
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

At least a part of the elements described above may be connected to each other through a communication scheme between surrounding devices (e.g., a bus, a general purpose input and output (GPIO), a serial peripheral interface (SPI), or a mobile industry processor interface (MIPI)), and may exchange a signal (e.g., a command or data) with each other.

According to an embodiment of the disclosure, a command or data may be transmitted or received between an electronic device 101 and the external electronic device 104 through the server 108 connected to the second network 199. Each of the electronic devices 102 and 104 may be a device that is of a type identical to or different from that of the electronic device 101. According to an embodiment of the disclosure, all or a part of the operations executed in the electronic device 101 may be executed in one or more external electronic devices among the external electronic devices 102, 104, or 108. For example, in a case where the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may process the result additionally or without change, and may provide the processed result as at least a part of a response for the request. To this end, for example, cloud computing, distributed computing, or client-server computing technologies may be used.

Figure 2A:
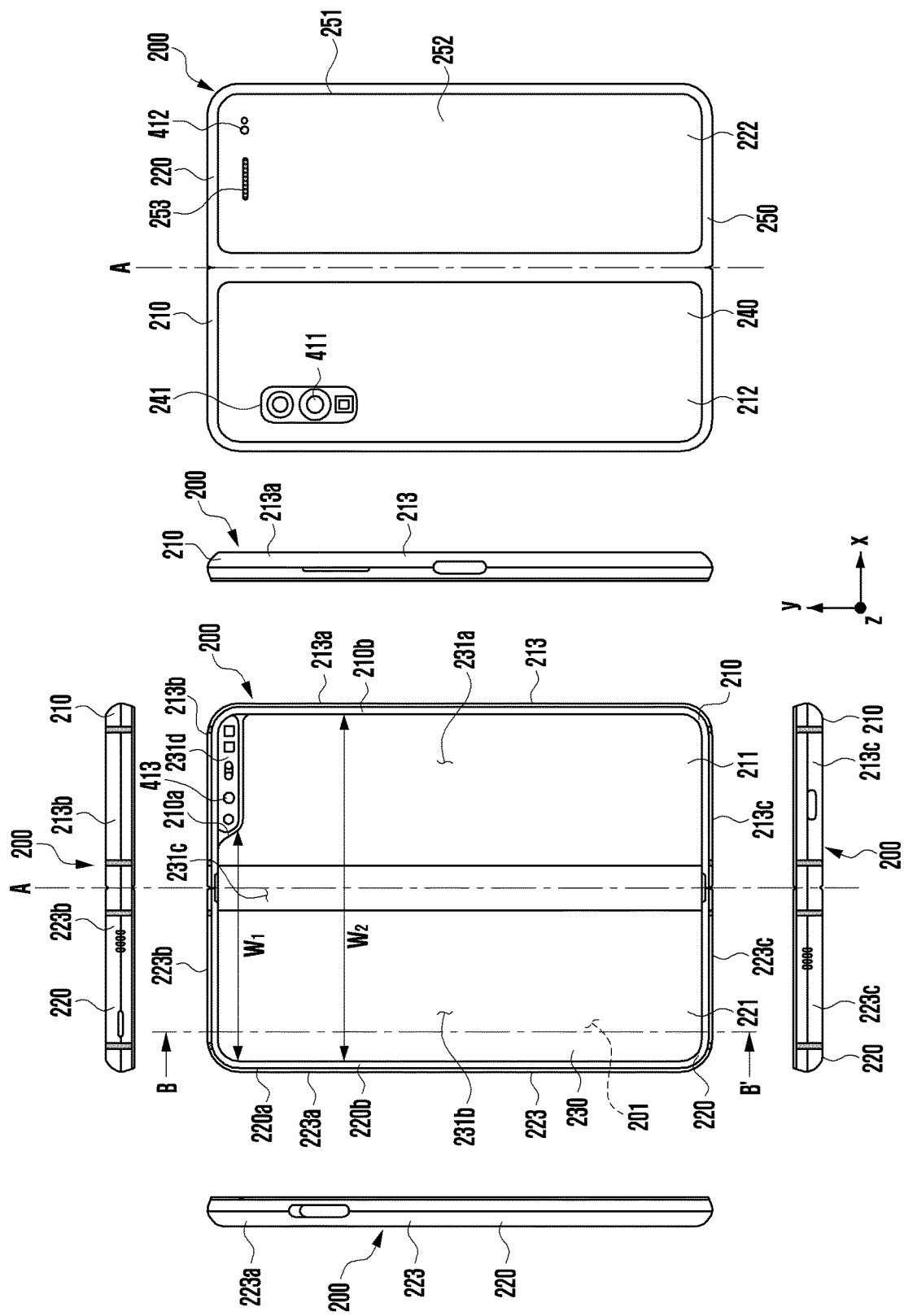
FIG. 2A illustrates an open state of an electronic device according to an embodiment of the disclosure.

FIG. 2A illustrates an open state of an electronic device according to an embodiment of the disclosure.

FIG. 2B illustrates a folded state of an electronic device illustrated in FIG. 2A according to an embodiment of the disclosure.

Referring to FIG. 2A, an electronic device 200 (e.g., the electronic device 101 in FIG. 1) may include a first housing structure 210 and a second housing structure 220 including at least one space in which at least one display can be disposed, at least one display 230 (e.g., a flexible display, a foldable display, or a first display) disposed in the at least one space, a second display (e.g., a sub-display) disposed on one surface of the second housing structure 220, a hinge structure (e.g., the hinge structure 265 in FIG. 2A) allowing the first housing structure 210 and the second housing structure 220 to be folded with each other, and a hinge cover (e.g., the hinge cover 265 in FIG. 2A) configured to cover a part allowing the first housing structure 210 and the second housing structure 220 to be foldable. In the specification, the surface on which the first display 230 is disposed may be defined as the front surface of the electronic device 200, and the opposite surface to the front surface may be defined as the rear surface of the electronic device 200. In addition, the surface surrounding a space between the front surface and the rear surface may be defined as the side surface of the electronic device 200.

In an embodiment of the disclosure, a pair of housing structures 210 and 220 may include the first housing structure 210 including a sensor region 231d, the second housing structure 220, a first rear surface cover 240, and a second rear surface cover 250. The pair of housing structures 210 and 220 of the electronic device 200 is not limited to the shape and coupling illustrated in FIGS. 2A and 2B, and may be implemented by a combination and/or coupling of different shapes or components. For example, in another embodiment of the disclosure, the first housing structure 210 and the first rear surface cover 240 may be integrally formed, and the second housing structure 220 and the second rear surface cover 250 may be integrally formed.

According to an embodiment of the disclosure, the first housing structure 210 and the second housing structure 220 may be configured to be a single housing (not illustrated), a folded part of the single housing may be made of a flexible material (not illustrated), and the hinge structure 265 may be not configured separately but replaced with a flexible material. According to an embodiment of the disclosure, the first housing structure 210 and the second housing structure 220 may be arranged at both sides with respect to a folding axis (A axis), and may be folded or unfolded with respect to the folding axis (A axis). According to an embodiment of the disclosure, the angle or distance between the first housing structure 210 and the second housing structure 220 may be different according to whether the electronic device 200 is in an open state (flat state), a folded state, or an intermediate state. At least a partial region of the first housing structure 210 or the second housing structure 220 may include the sensor region 231d in which various sensors are arranged. As another example, the sensor arrangement region 231d may additionally be disposed or replaced to be in at least a partial region of the second housing structure 220.

According to an embodiment of the disclosure, the angle between the first housing structure 210 and the second housing structure 220 may be adjusted by the hinge structure (e.g., the hinge structure 265 in FIG. 2A). According to an embodiment of the disclosure, when the first housing structure 210 and the second housing structure 220 are oriented toward the same surface (e.g., the front surface), or are parallel to the same axis (X axis), the electronic device 200 may be considered to be in an open state. According to an embodiment of the disclosure, in the electronic device 200, the first display 230 may be disposed in a space formed by the first housing structure 210 and the second housing structure 220. The first display 230 may include a first surface 211 and a third surface 221. A flexible region allowing the first display to be bent at a predetermined angle may be formed between the first surface 211 and the third surface 221. According to an embodiment of the disclosure, the first display 230, at least a partial region of which can be bent, may have a region which can be bent in various shapes in addition to the first surface 211 and the third surface 221, and the number of bendable regions is not limited to one. According to various embodiments of the disclosure, the hinge structure (e.g., the hinge structure 265 in FIG. 2A) may be disposed in a region in which the first display 230 can be bent. When the first display 230 is bent, the hinge structure may support the first display 230 to maintain an angle in the state where the first display is bent.

According to an embodiment of the disclosure, the first housing structure 210 may include a first surface 211 oriented toward the front surface, a second surface 212 oriented toward the opposite direction to the first surface 211, and a first side surface member 213 surrounding at least a part of a space between the first surface 211 and the second surface 212. In an embodiment of the disclosure, the first side surface member 213 may include a first side surface 213a disposed in parallel with a folding axis (A axis), a second side surface 213b extending from one end of the first side surface 213a in a direction perpendicular to the folding axis, and a third side surface 213c extending from the other end of the first side surface 213a in a direction perpendicular to the folding axis (A axis).

In an embodiment of the disclosure, at least a part of the second housing structure 220 may be connected to the hinge structure (e.g., the hinge structure 265 in FIG. 2A), and the second housing structure 220 may include a third surface 221 oriented toward the front surface of the electronic device 200, a fourth surface 222 oriented in the opposite direction to the third surface 221, and a second side surface member 223 surrounding at least a part of a space between the third surface 221 and the fourth surface 222. In an embodiment of the disclosure, the second side surface member 223 may include a fourth side surface 223a disposed in parallel with the folding axis (A axis), a fifth side surface 223b extending from one end of the fourth side surface 223a in a direction perpendicular to the folding axis, and a sixth side surface 223c extending from the other end of the fourth side surface 223a in a direction perpendicular to the folding axis (A axis). In an embodiment of the disclosure, the third surface 221 may face the first surface 211 to be opposite thereto in a folded state.

In an embodiment of the disclosure, the electronic device 200 may include a recess 201 that is configured to receive the first display 230, at least a part of which can be bent, and is formed through structural shape coupling between the first housing structure 210 and the second housing structure 220. According to an embodiment of the disclosure, the recess 201 may have substantially the same size as that of the first display 230. In an embodiment of the disclosure, the recess 201 may have two or more different widths in a direction perpendicular to the folding axis (A axis) due to the sensor region 231d. For example, the recess 201 may have a first width W1 between a first part 220a of the second housing structure 220 and a first part 210a disposed at the periphery of the sensor region 231d in the first housing structure 210. The recess may have a second width W2 by a second part 220b of the second housing structure 210 and a second part 210b that does not correspond to the sensor region 231d and is parallel to the folding axis (A axis) in the first housing structure 210. According to various embodiments of the disclosure, the width of the recess 201 may not be limited to the illustrated example. According to various embodiments of the disclosure, the recess 201 may have two or more different widths, or the same width.

In an embodiment of the disclosure, at least a part of the first housing structure 210 and the second housing structure 220 may be made of a metal or non-metal material having a selected rigidity to support the first display 230.

In an embodiment of the disclosure, the sensor region 231d may be adjacent to one corner of the first housing structure 210 and have a predetermined region. The arrangement, shape, or size of the sensor region 231d may not be limited to the illustrated example. According to various embodiments of the disclosure, at least one of a front camera device, a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an indicator may be disposed in at least a partial region of the sensor region 231d. In various embodiments of the disclosure, the components may be disposed in the electronic device without a separate sensor region. For example, at least a part of the components may be arranged under the first display 230, or may be seen through a partial region of the first display 230.

In an embodiment of the disclosure, the first rear surface cover 240 may be disposed on the second surface 212 of the first housing structure 210, and may have substantially a rectangular periphery. In an embodiment of the disclosure, at least a part of the periphery may be surrounded by the first housing structure 210. Similarly, the second rear surface cover 250 may be disposed on the fourth surface 222 of the second housing structure 220, and at least a part of the periphery of the second rear surface cover may be surrounded by the second housing structure 220.

In the illustrated embodiment of the disclosure, the first rear surface cover 240 and the second rear surface cover 250 may have substantially a symmetrical shape with respect to the folding axis (A axis). As another example, the first rear surface cover 240 and the second rear surface cover 250 may include various different shapes. As another example, the first rear surface cover 240 may be integrally formed with the first housing structure 210, and the second rear surface cover 250 may be integrally formed with the second housing structure 220.

In an embodiment of the disclosure, the first rear surface cover 240, the second rear surface cover 250, the first housing structure 210, and the second housing structure 220 may be coupled to each other, and a space in which various components (e.g., a printed circuit board, an antenna module, a sensor module, or a battery) of the electronic device 200 can be arranged may be provided through the coupling structure. In an embodiment of the disclosure, one or more components may be arranged on the rear surface of the electronic device 200, or may be visually seen through the rear surface. For example, one or more components or sensors may be visually seen through a first rear surface region 241 of the first rear surface cover 240. In various embodiments of the disclosure, the sensors may include a proximity sensor, a rear camera device, and/or a flash. In another embodiment of the disclosure, at least a part of a sub-display 252 (e.g., the second display) may be visually seen through a second rear surface region 251 of the second rear surface cover 250. In another embodiment of the disclosure, the electronic device 200 may include a speaker module 253 disposed through at least a partial region of the second rear surface cover 250.

The first display 230 may be disposed in a space formed by the first and second housing structures 210 and 220. For example, the first display 230 may be stably placed in the recess 201 formed by the first and second housing structures 210 and 220, and may be disposed to substantially cover most parts of the front surface of the electronic device 200. Therefore, the front surface of the electronic device 200 may include the first display 230, and a partial region (e.g., a periphery region) of the first housing structure 210 and a partial region (e.g., a periphery region) of the second housing structure 220, which are adjacent to the first display 230. In an embodiment of the disclosure, the rear surface of the electronic device 200 may include the first rear surface cover 240, a partial region (e.g., a periphery region) of the first housing structure 210, which is adjacent to the first rear surface cover 240, the second rear surface cover 250, and a partial region (e.g., a periphery region) of the second housing structure 220, which is adjacent to the second rear surface cover 250.

In an embodiment of the disclosure, the first display 230 may mean a display, at least a partial region of which is transformable into a flat surface or a curved surface. In an embodiment of the disclosure, the first display 230 may include a folding region 231c, a first region 231a disposed at one side (e.g., the right side region of the folding region 231c) with respect to the folding region 231c, and a second region 231b disposed at the other side (e.g., the left side region of the folding region 231c). For example, the first region 231a is disposed on the first surface 211 of the first housing structure 210, and the second region 231b may be disposed on the third surface 221 of the second housing structure 220. In an embodiment of the disclosure, the region division of the first display 230 corresponds to an example, and the first display 230 may be divided into multiple (e.g., four or more, or two) regions according to a structure or a function. For example, in the embodiment illustrated in FIG. 2A, the region of the first display 230 may be divided by the folding region 231c or the folding axis (A axis) extending in parallel with y axis. However, in another embodiment of the disclosure, the region of the first display 230 may be divided with reference to another folding region (e.g., a folding region parallel with x axis) or another folding axis (e.g., a folding region (e.g., a folding axis parallel with x axis). The display region division described above merely corresponds to a physical division by the pair of housing structures 210 and 220 and the hinge structure (e.g., the hinge structure 265 in FIG. 2A). Practically, the first display 230 may display a single entire screen through the pair of housing structures 210 and 220 and the hinge structure (e.g., the hinge structure 265 in FIG. 2A). In an embodiment of the disclosure, the first region 231a may include a notch region obtained through cutting according to the existence of the sensor region 231d unlike the second region 231b. In an embodiment of the disclosure, the first region 231a and the second region 231b may have a symmetrical part and an asymmetrical part.

Referring to FIG. 2B, the hinge cover 265 may be disposed between the first housing structure 210 and the second housing structure 220 to cover an internal component (e.g., the hinge structure 265 in FIG. 2A). In an embodiment of the disclosure, the hinge cover 265 may be hidden by a part of the first housing structure 210 and the second housing structure 220 or may be seen from the outside according to an operation state (e.g., an open state (a flat state) or a folded state) of the electronic device 200.

Hereinafter, the operations of the first housing structure 210 and the second housing structure 220 and each of the regions of the first display 230 will be described according to an operation state (e.g., an open state (a flat state) or a folded state) of the electronic device 200.

In an embodiment of the disclosure, if the electronic device 200 is in an open state (a flat state), the first housing structure 210 and the second housing structure 220 may make a straight angle (e.g., 180 degrees). In the open state (e.g., a first designated state), the first region (e.g., the region 231a in FIG. 2A) and the second region (e.g., the region 231b in FIG. 2A) of the display may be arranged in the same direction. In addition, if the electronic device is in the open state, the folding region (e.g., the region 231c in FIG. 2A) may be disposed on the same plane as that for the first region 231a and the second region 231b. As another example, if the electronic device 200 is in an open state (a flat state), the first housing structure 210 and the second housing structure 220 may be, for example, folded in the reverse direction such that the angle made by the second housing structure 220 with respect to the first housing structure 210 is changed to be 360 degrees through rotation to allow the second surface 212 to face the fourth surface 222.

In an embodiment of the disclosure, if the electronic device 200 is in an intermediate state (e.g., a second designated state), the first housing structure 210 and the second housing structure 220 may be arranged to make a predetermined angle (e.g., the angle between 10 to 90 degrees) therebetween. The first region (e.g., the region 231a in FIG. 2A) and the second region (e.g., the region 231b in FIG. 2A) of the first display 230 may make an angle larger than that in a folded state and smaller than that in an open state. At least a part of the folded region (e.g., the region 231c in FIG. 2A) may have a curved surface having a predetermined curvature, and the curvature may be smaller than that in a folded state.

In an embodiment of the disclosure, when the electronic device 200 is in a folded state (e.g., a third designated state), the first housing structure 210 and the second housing structure 220 may be arranged to face each other. The first region (e.g., the region 231a in FIG. 2A) and the second region (e.g., the region 231b in FIG. 2A) of the first display 230 may make an acute angle (e.g., the angle between 0 and 10 degrees), and may be arranged to face each other. At least a part of the folded region (e.g., the region 231c in FIG. 2A) may have a curved surface having a predetermined curvature.

Figure 3A:
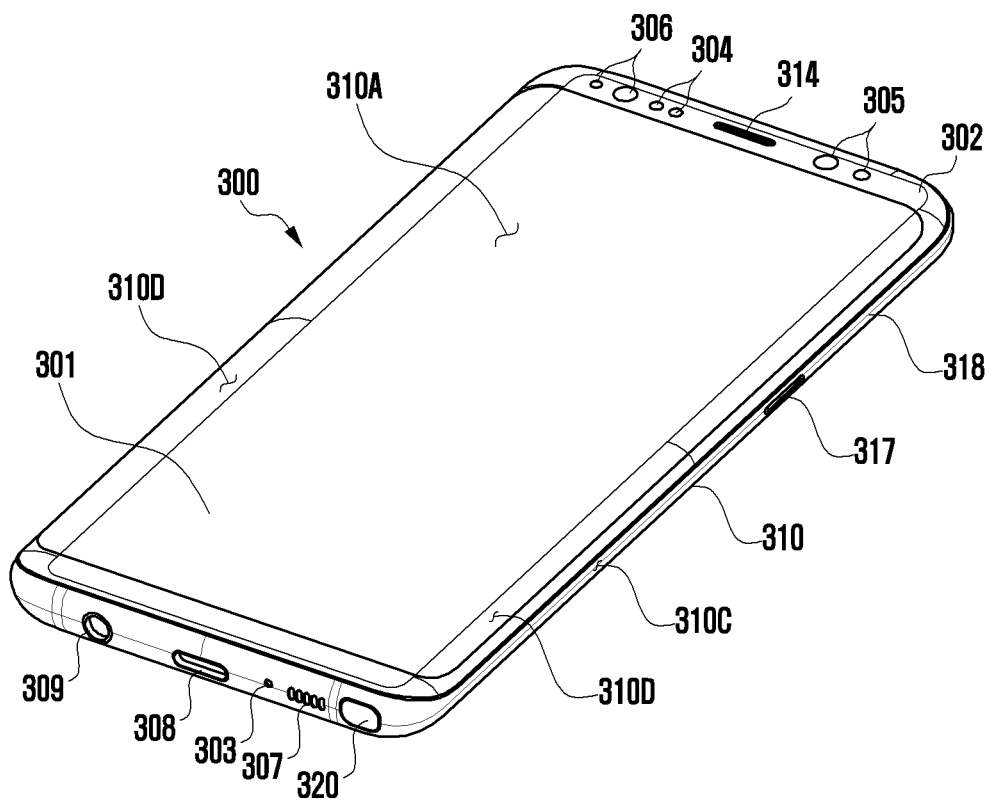
FIG. 3A is a perspective view of a front surface of a mobile electronic device according to an embodiment of the disclosure.

FIG. 3A is a perspective view of a front surface of a mobile electronic device according to an embodiment of the disclosure.

Figure 3B:
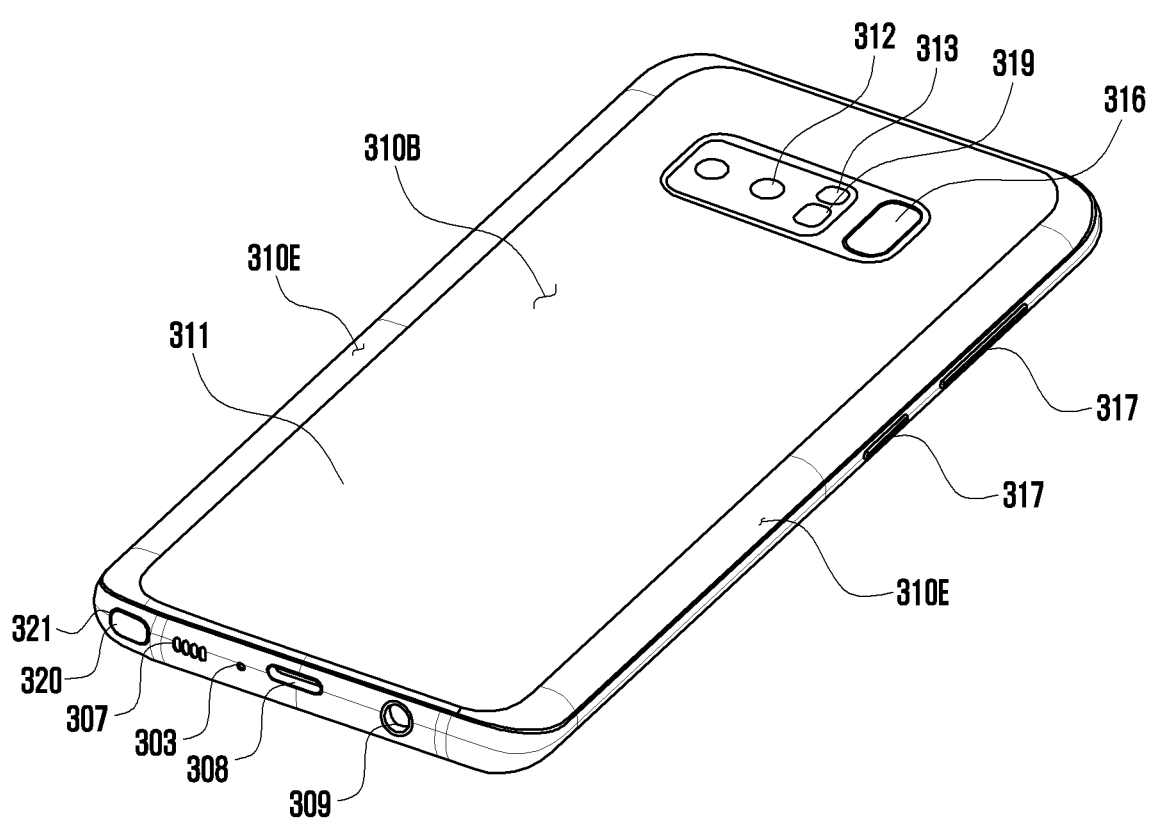
FIG. 3B is a perspective view of a rear surface of an electronic device illustrated in FIG. 3A according to an embodiment of the disclosure.

FIG. 3B is a perspective view of a rear surface of the electronic device illustrated in FIG. 3A according to an embodiment of the disclosure.

Referring to FIGS. 3A and 3B, an electronic device 300 (e.g., the electronic device 101 in FIG. 1) according to an embodiment may include a housing 310 including a first surface (or front surface) 310A, a second surface (or rear surface) 310B, and a side surface 310C surrounding a space between the first surface 310A and the second surface 310B. In another embodiment (not illustrated), the housing may indicate a structure configuring a part of the first surface 310A, the second surface 310B, and the side surface 310C illustrated in FIG. 1. According to an embodiment of the disclosure, the first surface 310A may be configured by a front surface plate 302 (e.g., a glass plate including various coating layers, or a polymer plate), at least a part of which is substantially transparent. The second surface 310B may be configured by a rear surface plate 311 that is substantially opaque. The rear surface plate 311 may be formed of, for example, coated or colored glass, ceramic, polymer, metal (e.g., aluminum, stainless steel (STS), or magnesium), or a combination of at least two of the materials. The side surface 310C may be configured by a side surface bezel structure (or a "side surface member") 318 that is coupled to the front surface plate 302 and the rear surface plate 311 and includes metal and/or polymer. In an embodiment of the disclosure, the rear surface plate 311 and the side surface bezel structure 318 may be integrally configured, and may include an identical material (e.g., a metal material, such as aluminum).

In the illustrated embodiment of the disclosure, the front surface plate 302 may include two first regions 310D seamlessly extending from the first surface 310A to be bent toward the rear surface plate 311 on both long edges of the front surface plate 302. In the illustrated embodiment (see FIG. 3B), the rear surface plate 311 may include two second regions 310E seamlessly extending from the second surface 310B to be bent toward the front surface plate 302 on both long edges of the rear surface plate. In an embodiment of the disclosure, the front surface plate 302 (or the rear surface plate 311) may include only one of the first regions 310D (or the second regions 310E). In another embodiment of the disclosure, a part of the first regions 310D or the second regions 310E may not be included. In the embodiments of the disclosure, when viewed in the side surface of the electronic device 300, the side surface bezel structure 318 may have a first thickness (or width) in the side surface at which the first regions 310D or the second regions 310E are not included, and may have a second thickness smaller than the first thickness in the side surface at which the first regions 310D or the second regions 310E are included.

According to an embodiment of the disclosure, the electronic device 300 (e.g., the electronic device 101 in FIG. 1) may include at least one of a display 301, audio modules 303, 307, and 314, sensor modules 304, 316, and 119, camera modules 305, 312, and 313, a key input device 317, a light emitting element 306, a pen input device 320, and connector holes 308 and 309. In an embodiment of the disclosure, the electronic device 300 (e.g., the electronic device 101 in FIG. 1) may omit at least one (e.g., the key input device 317 or the light emitting element 306) of the elements or additionally include another element.

The display 301 may be, for example, exposed through a considerable portion of the front surface plate 302. In an embodiment of the disclosure, at least a part of the display 301 may be exposed through the front plate 302 configuring the first surface 310A and the first regions 310D positioned at the side surface 310C. In an embodiment of the disclosure, an edge of the display 301 may be configured to be substantially identical to the shape of an outer portion of the front surface plate 302 adjacent to the edge. In another embodiment (not illustrated), in order to extend the area by which the display 301 is exposed, an interval between an outer portion of the display 301 and an outer portion of the front surface plate 302 may be configured to be substantially identical to each other.

In another embodiment (not illustrated), a recess or an opening may be disposed at a part of a screen display region of the display 301, and at least one of the audio module 314, the sensor module 304, the camera module 305, and the light emitting element 306 may be included to be aligned with the recess or the opening. In another embodiment (not illustrated), at least one of the audio module 314, the sensor module 304, the camera module 305, a fingerprint sensor 316, and the light emitting element 306 may be included on a rear surface of the screen display region of the display 301. In another embodiment (not illustrated), the display 301 may be coupled to or disposed to be adjacent to a touch detection circuit, a pressure sensor capable of measuring the strength (pressure) of a touch, and/or a digitizer that detects a stylus pen using a magnetic field. In an embodiment of the disclosure, at least a part of the sensor module 304 and 319 and/or at least a part of the key input device 317 may be disposed in the first regions 310D and/or the second regions 310E.

The audio modules 303, 307, and 314 may include a microphone hole 303 and speaker holes 307 and 314. A microphone configured to obtain external sound may be disposed in the microphone hole 303, and in an embodiment of the disclosure, a plurality of microphones may be arranged therein to detect the direction of sound. The speaker holes 307 and 314 may include the external speaker hole 307 and the call receiver hole 314. In an embodiment of the disclosure, the speaker holes 307 and 314 and the microphone hole 303 may be implemented as a single hole, or a speaker may be included without the speaker holes 307 and 314 (e.g., a piezoelectric speaker).

The sensor modules 304, 316, and 319 may generate an electrical signal or a data value corresponding to an internal operation state or an external environment state of the electronic device 300 (e.g., the electronic device 101 in FIG. 1). The sensor modules 304, 316, and 319 may include, for example, a first sensor module 304 (e.g., a proximity sensor) and/or a second sensor module (not illustrated) (e.g., a fingerprint sensor) disposed on the first surface 310A of the housing 310, and/or a third sensor module 319 (e.g., a heart rate monitor (HRM) sensor) and/or a fourth sensor module 316 (e.g., a fingerprint sensor) disposed on the second surface 310B of the housing 310. The fingerprint sensor may be disposed on the second surface 310B of the housing 310 as well as the first surface 310A (e.g., the display 301). The electronic device 300 (e.g., the electronic device 101 in FIG. 1) may further include a sensor module which is not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

The camera modules 305, 312, and 313 may include a first camera device 305 disposed on the first surface 310A of the electronic device 300 (e.g., the electronic device 101 in FIG. 1) and a second camera device 312 and/or a flash 313 disposed on the second surface 310B. The camera devices 305 and 312 may include one or a plurality of lenses, an image sensor, and/or an image signal processor. The flash 313 may include, for example, a light emitting diode or a xenon lamp. In an embodiment of the disclosure, two or more lenses (an infrared camera, and wide-angle and telephoto lenses) and image sensors may be arranged on one surface of the electronic device 300 (e.g., the electronic device 101 in FIG. 1).

The key input device 317 may be disposed on the side surface 310C of the housing 310. In another embodiment of the disclosure, the electronic device 300 may not include a part or the entirety of key input device 317, and a key input device 317 that is not included may be implemented in a different type, such as a soft key on the display 301. In an embodiment of the disclosure, the key input device may include the sensor module 316 disposed on the second surface 310B of the housing 310.

The light emitting element 306 may be, for example, disposed on the first surface 310A of the housing 310. The light emitting element 306 may provide, for example, state information of the electronic device 300 (e.g., the electronic device 101 in FIG. 1) by using light. In another embodiment of the disclosure, the light emitting element 306 may provide, for example, a light source interworking with an operation of the camera module 305. The light emitting element 306 may include a light emitting diode (LED), an IR LED, and a xenon lamp, for example.

The connector holes 308 and 309 may include a first connector hole 308 capable of receiving a connector (e.g., a USB connector) configured to transmit or receive power and/or data to or from an external electronic device, and/or a second connector hole (e.g., an earphone jack) 309 capable of receiving a connector configured to transmit or receive an audio signal to or from an external electronic device.

The pen input device (320 (e.g., a stylus pen) may be guided and inserted inside the housing 310 through a hole 321 formed on the side surface of the housing 310, or may be detachably attached to the housing, and may include a button making attachment and detachment easy. A separate resonance circuit may be embedded in the pen input device 320, so that the pen input device may be linked to an electromagnetic induction panel (e.g., a digitizer) included in the electronic device 300. The pen input device 320 may employ an electro-magnetic resonance (EMR) scheme, an active electrical stylus (AES) scheme, and an electric coupled resonance (ECR) scheme.

Figure 4:
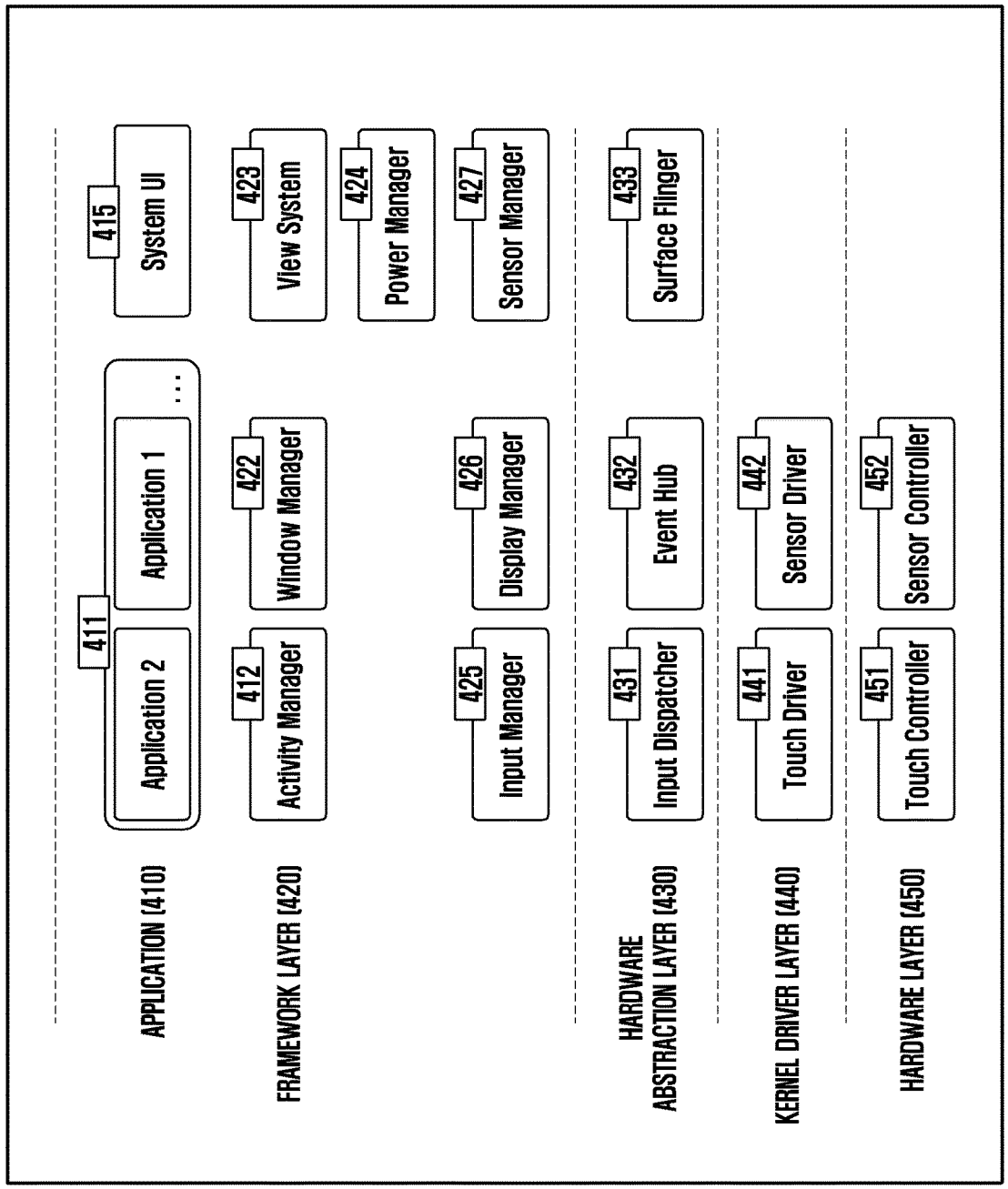
FIG. 4 illustrates a software structure of an electronic device according to an embodiment of the disclosure.

FIG. 4 illustrates a software structure 400 of an electronic device (e.g., the electronic device 101 in FIG. 1, the electronic device 200 in FIG. 2A, or the electronic device 300 in FIG. 3A) according to an embodiment of the disclosure.

According to various embodiments of the disclosure, at least a part of the illustrated configuration may be changed according to a platform included in the electronic device (e.g., the electronic device 101 in FIG. 1, the electronic device 200 in FIG. 2A, or the electronic device 300 in FIG. 3A).

Referring to FIG. 4, an application layer 410 may include at least one application 411 (e.g., the application 146 in FIG. 1) and a system user interface (UI) 415 which are stored in a memory (e.g., the memory 130 in FIG. 1) and can be executed by a processor. The application 411 may include an Internet browser, a video application, and a game, and the type of the application may not be limited thereto. The system UI 415 may indicate an application configuring various graphical user interface (GUI) screens implemented on a system of the electronic device, such as a notification bar, or a quick view.

A framework layer 420 may provide various functions to the application 411 so that a function or information provided from at least one resource of the electronic device (e.g., the electronic device 101 in FIG. 1, the electronic device 200 in FIG. 2A, or the electronic device 300 in FIG. 3A) can be used by the application 411.

The framework layer 420 may include an activity manager 412, a window manager 422, a view system 423, a power manager 424, an input manager 425, a display manager 426, and a sensor manager 427.

The activity manager 412 may control a life cycle and an activity stack of an application.

The window manager 422 may manage one or more GUI resources that are used in a screen of the electronic device (e.g., the electronic device 101 in FIG. 1, the electronic device 200 in FIG. 2A, or the electronic device 300 in FIG. 3A).

The view system 423 may be a set of extensible views used to create an application user interface.

The power manager 424 may manage the capacity, temperature, or power of a battery of the electronic device (e.g., the electronic device 101 in FIG. 1, the electronic device 200 in FIG. 2A, or the electronic device 300 in FIG. 3A), and may use corresponding information among the managed capacity, temperature, or power to determine or provide relevant information required for an operation of the electronic device (e.g., the electronic device 101 in FIG. 1, the electronic device 200 in FIG. 2A, or the electronic device 300 in FIG. 3A).

The input manager 425 may be a module (a key layout, etc.) configured to provide information of an input device (the input device 150 in FIG. 1) provided in the electronic device (e.g., the electronic device 101 in FIG. 1, the electronic device 200 in FIG. 2A, or the electronic device 300 in FIG. 3A).

The display manager 426 may manage a lifecycle (connection, attribute change/removal) of a display device (e.g., the display device 160 in FIG. 1), and may manage hardware (H/W) display mapping to output a screen GUI element (window). The display manager may function to change an output display device (e.g., the display device 160 in FIG. 1) by a system event, such as a folding state change.

The sensor manager 427 may control an operation of a sensor module (the sensor module 176 in FIG. 1), based on usability, such as an application of a sensor.

A hardware abstraction layer (HAL) 430 may indicate an abstracted layer between software of the electronic device and a plurality of hardware modules included in a hardware layer. The hardware abstraction layer 430 may include an input dispatcher 431, an event hub 432 that provides an interface that standardizes an event occurring in a sensor, or a surface flinger 433. The input dispatcher 431 may perform a function of determining an application 411 to which an occurred event is to be provided. The surface flinger 433 may perform a function of providing an execution screen to be displayed in a display device (e.g., the display device 160 in FIG. 1) among execution screens generated in several applications 411. When a configuration of a display (e.g., the display device 160 in FIG. 1) is changed, the surface flinger may request the application 411 to process a change of resolution and density according to the changed configuration of the display (e.g., the display device 160 in FIG. 1). The event hub 432 may be an interface module in which events occurring in a touch module and a sensor module (the sensor module 176 in FIG. 1) are standardized. The input dispatcher 431 may be a module which transfers an input event to an input target window process.

A kernel driver layer 440 may include various drivers which control various hardware modules included in the electronic device (e.g., the electronic device 101 in FIG. 1, the electronic device 200 in FIG. 2A, or the electronic device 300 in FIG. 3A). The kernel driver layer 440 may include a touch driver 441 including an interface module which controls a touch controller 451, and a sensor driver 442 including an interface module which controls a sensor controller 452 connected to a sensor. The touch driver 441 may be an interface module which controls the touch controller 451. The sensor driver 442 may be an interface module which controls the sensor controller 452.

A hardware layer 450 may include the touch controller 451 and the sensor controller 452.

The touch controller 451 may be a module which controls a touch circuit configured on a display (e.g., the display device 160 in FIG. 1) to receive a touch input.

The sensor controller 452 may include a hall sensor which detects a folding state of a foldable electronic device (e.g., the electronic device 200 in FIGS. 2A and 2B).

Figure 5:
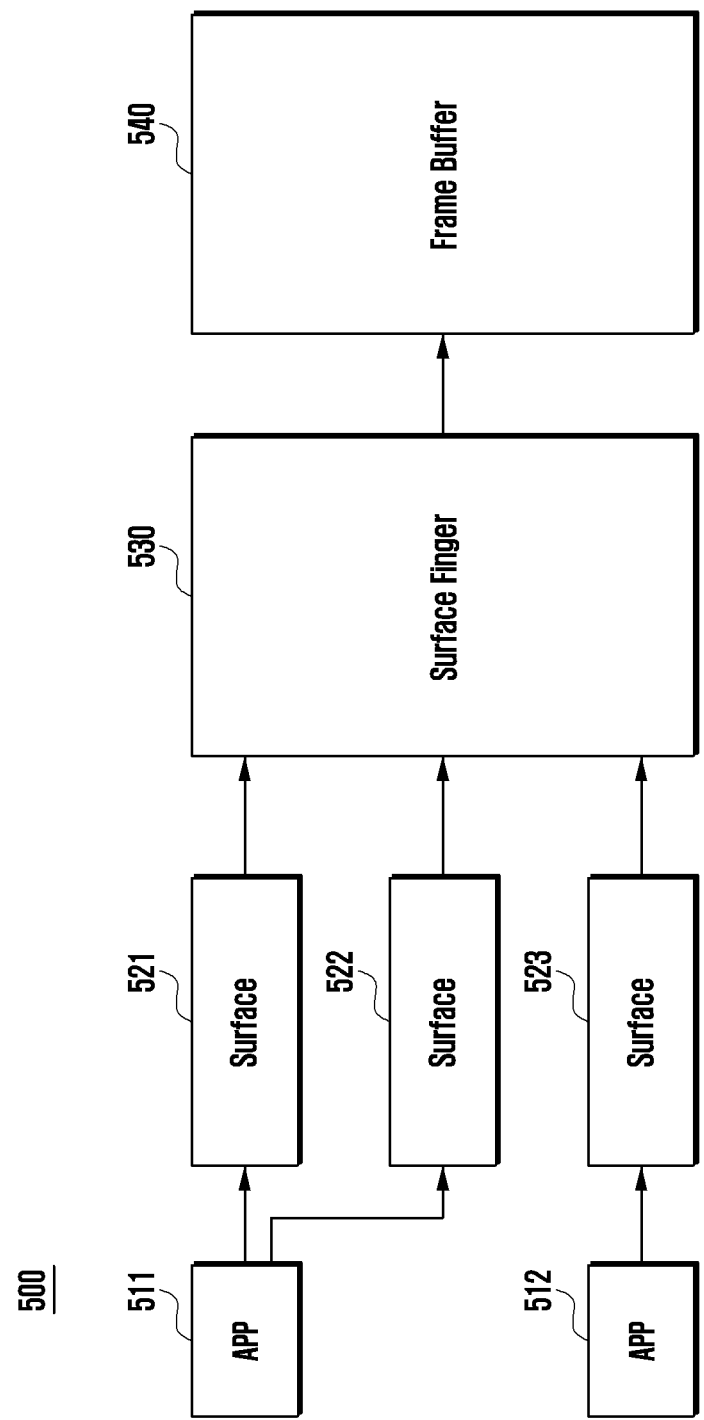
FIG. 5 is a block diagram illustrating a drawing engine of an electronic device according to an embodiment of the disclosure.

FIG. 5 is a block diagram illustrating a drawing engine 500 of an electronic device (e.g., the electronic device 101 in FIG. 1, the electronic device 200 in FIG. 2A, or the electronic device 300 in FIG. 3A) according to an embodiment of the disclosure.

Referring to FIG. 5, the electronic device (e.g., the electronic device 101 in FIG. 1, the electronic device 200 in FIG. 2A, or the electronic device 300 in FIG. 3A) may designate a partial region of a memory (the memory 130 in FIG. 1) to be surfaces 521, 522, and 523 for recording an execution state of applications 511 and 512 (e.g., the application 411 in FIG. 4).

A surface flinger 530 (e.g., the surface flinger 433 in FIG. 4) may determine whether to display, on a screen, an execution screen of an application recorded in the surfaces 521, 522, and 523, and may request the applications 511 and 512 to process a change of resolution and density when the configuration of a display is changed.

An execution screen corresponding to display resolution and density created by each of the applications 511 and 512 may be stored in a frame buffer 540.

The surface flinger 530 may store, in the frame buffer 540, an execution screen corresponding to display resolution and density created by each of the applications 511 and 512 and recorded in the surfaces 521, 522, and 523.

Figure 6:
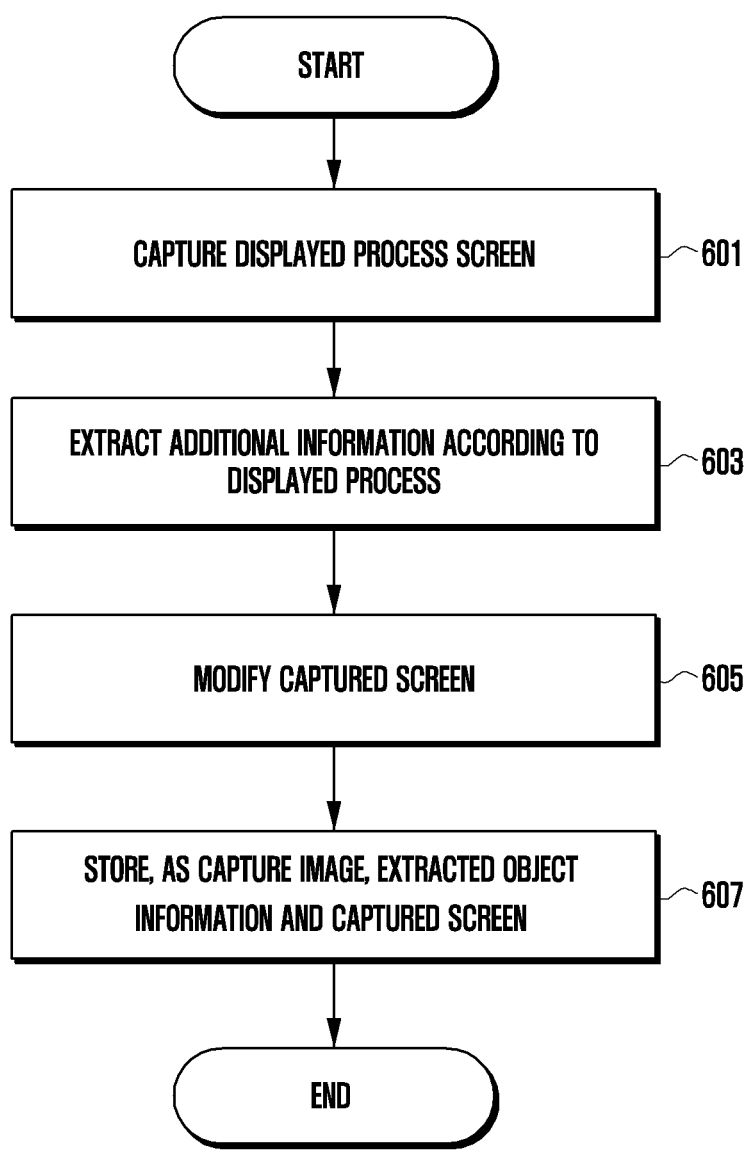
FIG. 6 is a flowchart illustrating a method for operating capturing by an electronic device according to an embodiment of the disclosure.

FIG. 6 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 6, an electronic device (e.g., the electronic device 101 in FIG. 1, the electronic device 200 in FIG. 2A, or the electronic device 300 in FIG. 3A) according to various embodiments may capture a process screen displayed on a display (e.g., the display device 160 in FIG. 1, the display 230 in FIG. 2A, or the display 301 in FIG. 3A) under control of a processor (e.g., the processor 120 in FIG. 1), in operation 601.

According to various embodiments of the disclosure, the displayed process screen may be a screen in which image or video information is displayed in a window and/or layout activated on the display (e.g., the display device 160 in FIG. 1, the display 230 in FIG. 2A, or the display 301 in FIG. 3A).

According to various embodiments of the disclosure, the displayed process screen may include a user interface of a running application. The application may correspond to a running application stored in a single window frame buffer screen or multiple window frame buffers. According to various embodiments of the disclosure, the capturing operation may include an operation of obtaining and/or generating a still picture image of a screen displayed on the display (e.g., the display device 160 in FIG. 1, the display 230 in FIG. 2A, or the display 301 in FIG. 3A).

The electronic device (e.g., the electronic device 101 in FIG. 1, the electronic device 200 in FIG. 2A, or the electronic device 300 in FIG. 3A) according to various embodiments may request rendering information from the display (e.g., the display device 160 in FIG. 1, the display 230 in FIG. 2A, or the display 301 in FIG. 3A) or the application in order to obtain a still picture image under control of the processor (e.g., the processor 120 in FIG. 1), in operation 601. The rendering information may be required for the display (e.g., the display device 160 in FIG. 1, the display 230 in FIG. 2A, or the display 301 in FIG. 3A) to display a graphic object. For example, the electronic device (e.g., the electronic device 101 in FIG. 1, the electronic device 200 in FIG. 2A, or the electronic device 300 in FIG.

3A) may request and obtain rendering information from a driver circuit of the display (e.g., the display device 160 in FIG. 1, the display 230 in FIG. 2A, or the display 301 in FIG. 3A) to create a still picture image under control of the processor (e.g., the processor 120 in FIG. 1). The electronic device (e.g., the electronic device 101 in FIG. 1, the electronic device 200 in FIG. 2A, or the electronic device 300 in FIG. 3A) may request and obtain rendering information from the application to create a still picture image under control of the processor (e.g., the processor 120 in FIG. 1).

According to various embodiments of the disclosure, the electronic device (e.g., the electronic device 101 in FIG. 1, the electronic device 200 in FIG. 2A, or the electronic device 300 in FIG. 3A) according to various embodiments may obtain an image including a still picture of an image displayed on the display (e.g., the display device 160 in FIG. 1, the display 230 in FIG. 2A, or the display 301 in FIG. 3A), based on the obtained rendering information under control of the processor (e.g., the processor 120 in FIG. 1), in operation 601.

According to various embodiments of the disclosure, a command to capture a screen of the electronic device (e.g., the electronic device 101 in FIG. 1, the electronic device 200 in FIG. 2A, or the electronic device 300 in FIG. 3A) may include a command to select an object region to capture a screen and/or a command to capture the entire screen.

According to various embodiments of the disclosure, a command to capture a screen of the electronic device (e.g., the electronic device 101 in FIG. 1, the electronic device 200 in FIG. 2A, or the electronic device 300 in FIG. 3A) may be performed, for example, by a key input, a touch input, a voice input, and a stylus input.

According to various embodiments of the disclosure, when an input by a combination of multiple button keys (e.g., the input device 150 in FIG. 1, and the key input device 317 in FIGS. 3A and 3B) is received, the electronic device (e.g., the electronic device 101 in FIG. 1, the electronic device 200 in FIG. 2A, or the electronic device 300 in FIG. 3A) may capture a displayed screen.

According to various embodiments of the disclosure, when a particular gesture by a touch input is received, the electronic device (e.g., the electronic device 101 in FIG. 1, the electronic device 200 in FIG. 2A, or the electronic device 300 in FIG. 3A) may capture a displayed screen. For example, the particular gesture by a touch input may be a gesture in which a user swipes the display (or a touch screen) with the edge or palm of his/her hand in a particular direction.

According to various embodiments of the disclosure, when a voice input is received, the electronic device (e.g., the electronic device 101 in FIG. 1, the electronic device 200 in FIG. 2A, or the electronic device 300 in FIG. 3A) may capture a displayed screen. For example, the voice input may be a user voice including a particular word and/or an instruction. The electronic device (e.g., the electronic device 101 in FIG. 1, the electronic device 200 in FIG. 2A, or the electronic device 300 in FIG. 3A) may receive and recognize the voice input through a voice recognition platform (e.g., Bixby).

According to various embodiments of the disclosure, when a stylus input is received, the electronic device (e.g., the electronic device 101 in FIG. 1, the electronic device 200 in FIG. 2A, or the electronic device 300 in FIG. 3A) may capture a displayed screen.

According to various embodiments of the disclosure, when the electronic device (e.g., the electronic device 101 in FIG. 1, the electronic device 200 in FIG. 2A, or the electronic device 300 in FIG. 3A) receives an input of selecting an object region according to a touch input of a stylus pen, the electronic device may determine the input as a command to select an object region to capture a screen, under control of the processor (e.g., the processor 120 in FIG. 1).

According to various embodiments of the disclosure, when the electronic device (e.g., the electronic device 101 in FIG. 1, the electronic device 200 in FIG. 2A, or the electronic device 300 in FIG. 3A) receives an input of executing an object region selection function and selecting an object region according to a touch input (e.g., a touch by a stylus pen or a hand), the electronic device may determine the input as a command to select an object region to capture a screen, under control of the processor (e.g., the processor 120 in FIG. 1).

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 603.

The operation of extracting the additional information according to the displayed process according to various embodiments may be an operation of providing a screen and/or function allowing the captured screen to be edited, under control of the processor (e.g., the processor 120 in FIG. 1). For example, the function for editing the captured screen may include Crop image, Reduce/Enlarge image, Rotate image, image effect, image color temperature, image color correction, or the like. An icon, an image, or a text corresponding to the function for editing the captured screen may be provided as a user interface in a tool bar type. The screen and/or function allowing the captured screen to be edited may correspond to a screenshot toolbar.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from a frame buffer under control of the processor (e.g., the processor 120 in FIG. 1), in operation 603.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from the application under control of the processor (e.g., the processor 120 in FIG. 1), in operation 603. For example, if the application is an Internet browser, the operation of extracting the additional information from the application may be an operation of parsing hypertext markup language (HTML) information.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from the rendering information obtained from the application or the display (e.g., the display device 160 in FIG. 1, the display 230 in FIG. 2A, or the display 301 in FIG. 3A) under control of a processor (e.g., the processor 120 in FIG. 1), in operation 603.

The operation of extracting the additional information according to the displayed process according to various embodiments may be an operation of extracting a region and/or a block region of the still picture of the displayed process, under control of the processor (e.g., the processor 120 in FIG. 1), in operation 603.

The operation of extracting the additional information according to the displayed process according to various embodiments may be an operation of segmenting the still picture of the displayed process into regions and/or block regions under control of the processor (e.g., the processor 120 in FIG. 1), in operation 603.

In the electronic device (e.g., the electronic device 101 in FIG. 1, the electronic device 200 in FIG. 2A, or the electronic device 300 in FIG. 3A) according to various embodiments of the disclosure, the operation of extracting a region and/or a block region of the still picture of the displayed process, under control of the processor (e.g., the processor 120 in FIG. 1), in operation 603, may be an operation of extracting an image region and/or a text region in the still picture in units of blocks.

In the electronic device (e.g., the electronic device 101 in FIG. 1, the electronic device 200 in FIG. 2A, or the electronic device 300 in FIG. 3A) according to various embodiments of the disclosure, the operation of segmenting the still picture of the displayed process into regions and/or block regions under control of the processor (e.g., the processor 120 in FIG. 1), in operation 603, may be an operation of segmenting an image region and/or a text region in the still picture in units of blocks.

The electronic device (e.g., the electronic device 101 in FIG. 1, the electronic device 200 in FIG. 2A, or the electronic device 300 in FIG. 3A) according to various embodiments may modify the captured screen under control of the processor (e.g., the processor 120 in FIG. 1), in operation 605.

The electronic device (e.g., the electronic device 101 in FIG. 1, the electronic device 200 in FIG. 2A, or the electronic device 300 in FIG. 3A) according to various embodiments may modify an object screen captured in the frame buffer and/or the application under control of the processor (e.g., the processor 120 in FIG. 1), in operation 605.

The operation of modifying the captured screen according to various embodiments may be an operation of revising the captured screen by a user input and/or a predetermined image editing process.

For example, in the operation of modifying the captured screen, a "Crop image" operation may be performed by a user input. For example, in the operation of modifying the captured screen, a "Crop image" operation may be performed by the predetermined image editing process.

The electronic device (e.g., the electronic device 101 in FIG. 1, the electronic device 200 in FIG. 2A, or the electronic device 300 in FIG. 3A) according to various embodiments may store, as a capture image, extracted object information and the captured screen under control of the processor (e.g., the processor 120 in FIG. 1), in operation 607. According to various embodiments of the disclosure, the operation of storing the captured screen as a capture image may also include an operation of storing a screen in which an image is not modified by a user.

Figure 7:
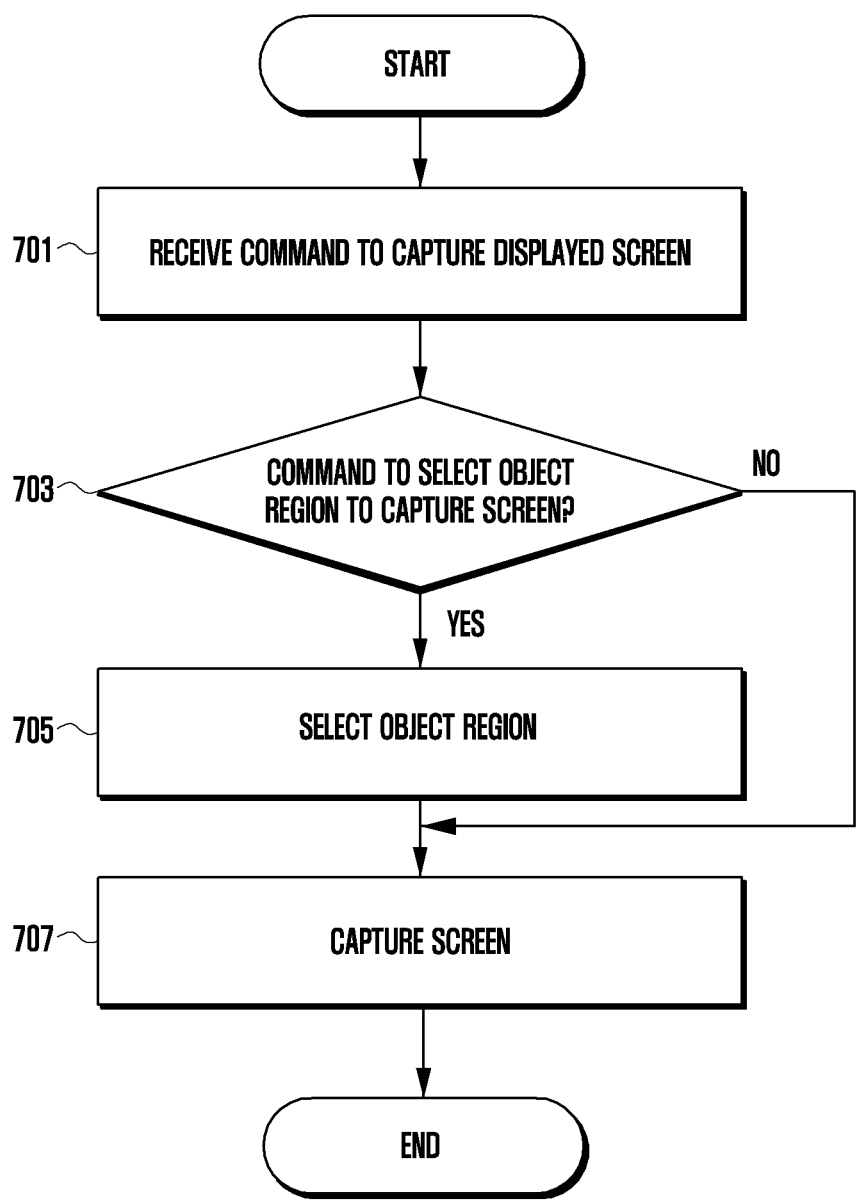
FIG. 7 is a flowchart illustrating an operation of capturing a displayed process screen by an electronic device according to an embodiment of the disclosure.

FIG. 7 is a flowchart illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 7, an electronic device (e.g., the electronic device 101 in FIG. 1, the electronic device 200 in FIG. 2A, or the electronic device 300 in FIG. 3A) according to various embodiments may receive a command to capture a displayed screen under control of a processor (e.g., the processor 120 in FIG. 1), in operation 701.

The electronic device (e.g., the electronic device 101 in FIG. 1, the electronic device 200 in FIG. 2A, or the electronic device 300 in FIG. 3A) according to various embodiments may determine whether the received command is a command to select an object region to capture a screen under control of the processor (e.g., the processor 120 in FIG. 1), in operation 703.

If it is determined that the received command is a command to select an object region to capture a screen, the electronic device (e.g., the electronic device 101 in FIG. 1, the electronic device 200 in FIG. 2A, or the electronic device 300 in FIG. 3A) according to various embodiments may enter into operation 705, under control of the processor (e.g., the processor 120 in FIG. 1), in operation 703.

If it is determined that the received command is not a command to select an object region to capture a screen, the electronic device (e.g., the electronic device 101 in FIG. 1, the electronic device 200 in FIG. 2A, or the electronic device 300 in FIG. 3A) according to various embodiments may determine that the received command is a command to capture the entire screen, and may enter into operation 707, under control of the processor (e.g., the processor 120 in FIG. 1), in operation 703.

The electronic device (e.g., the electronic device 101 in FIG. 1, the electronic device 200 in FIG. 2A, or the electronic device 300 in FIG. 3A) according to various embodiments may select an object region selected according to a user input under control of the processor (e.g., the processor 120 in FIG. 1), in operation 705.

If the received command is a command to select an object region to capture a screen, the electronic device (e.g., the electronic device 101 in FIG. 1, the electronic device 200 in FIG. 2A, or the electronic device 300 in FIG. 3A) according to various embodiments may capture an object region screen selected according to a user input under control of the processor (e.g., the processor 120 in FIG. 1), in operation 707.

If the received command is a command to capture the entire screen, the electronic device (e.g., the electronic device 101 in FIG. 1, the electronic device 200 in FIG. 2A, or the electronic device 300 in FIG. 3A) according to various embodiments may capture the entire screen under control of the processor (e.g., the processor 120 in FIG. 1), in operation 707.

Figure 8:
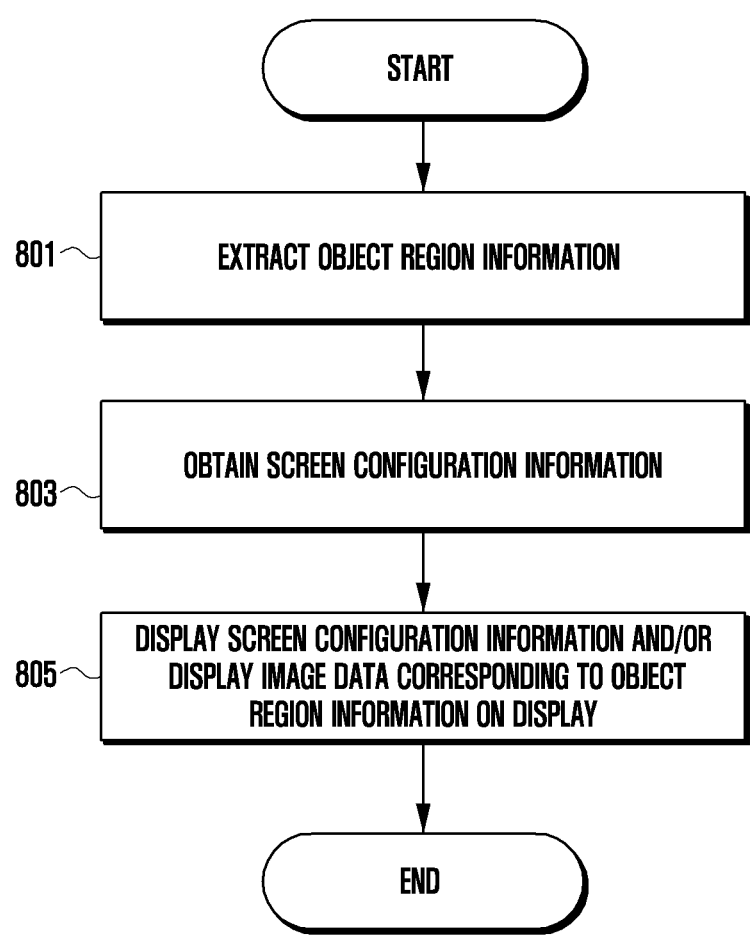
FIG. 8 is a flowchart illustrating an operation of extracting additional information according to a displayed process in an electronic device according to an embodiment of the disclosure.

FIG. 8 is a flowchart illustrating an operation of extracting additional information according to a displayed process in an electronic device (e.g., the electronic device 101 in FIG. 1, the electronic device 200 in FIG. 2A, or the electronic device 300 in FIG. 3A) according to an embodiment of the disclosure.

Referring to FIG. 8, an electronic device (e.g., the electronic device 101 in FIG. 1, the electronic device 200 in FIG. 2A, or the electronic device 300 in FIG. 3A) according to various embodiments may extract object region information from a frame buffer and/or a running application under control of a processor (e.g., the processor 120 in FIG. 1), in operation 801.

According to various embodiments of the disclosure, the object region information may be information relating to an image region or a text region, window information, and/or layout information in the frame buffer and/or the running application.

The electronic device (e.g., the electronic device 101 in FIG. 1, the electronic device 200 in FIG. 2A, or the electronic device 300 in FIG. 3A) according to various embodiments may obtain screen configuration information, based on the object region information under control of the processor (e.g., the processor 120 in FIG. 1), in operation 803.

According to various embodiments of the disclosure, the screen configuration information may be information relating to the position and/or the size of an object region in the frame buffer and/or the running application.

The electronic device (e.g., the electronic device 101 in FIG. 1, the electronic device 200 in FIG. 2A, or the electronic device 300 in FIG. 3A) according to various embodiments may display the screen configuration information and/or display image data corresponding to the object region information on a display (e.g., the display device 160 in FIG. 1, the display 230 in FIG. 2A, or the display 301 in FIG. 3A) under control of the processor (e.g., the processor 120 in FIG. 1), in operation 805.

According to various embodiments of the disclosure, the operation of displaying the display image data corresponding to the object region information may be an operation of displaying information for screen editing, screen configuration information, and/or a user interface.

Figure 9:
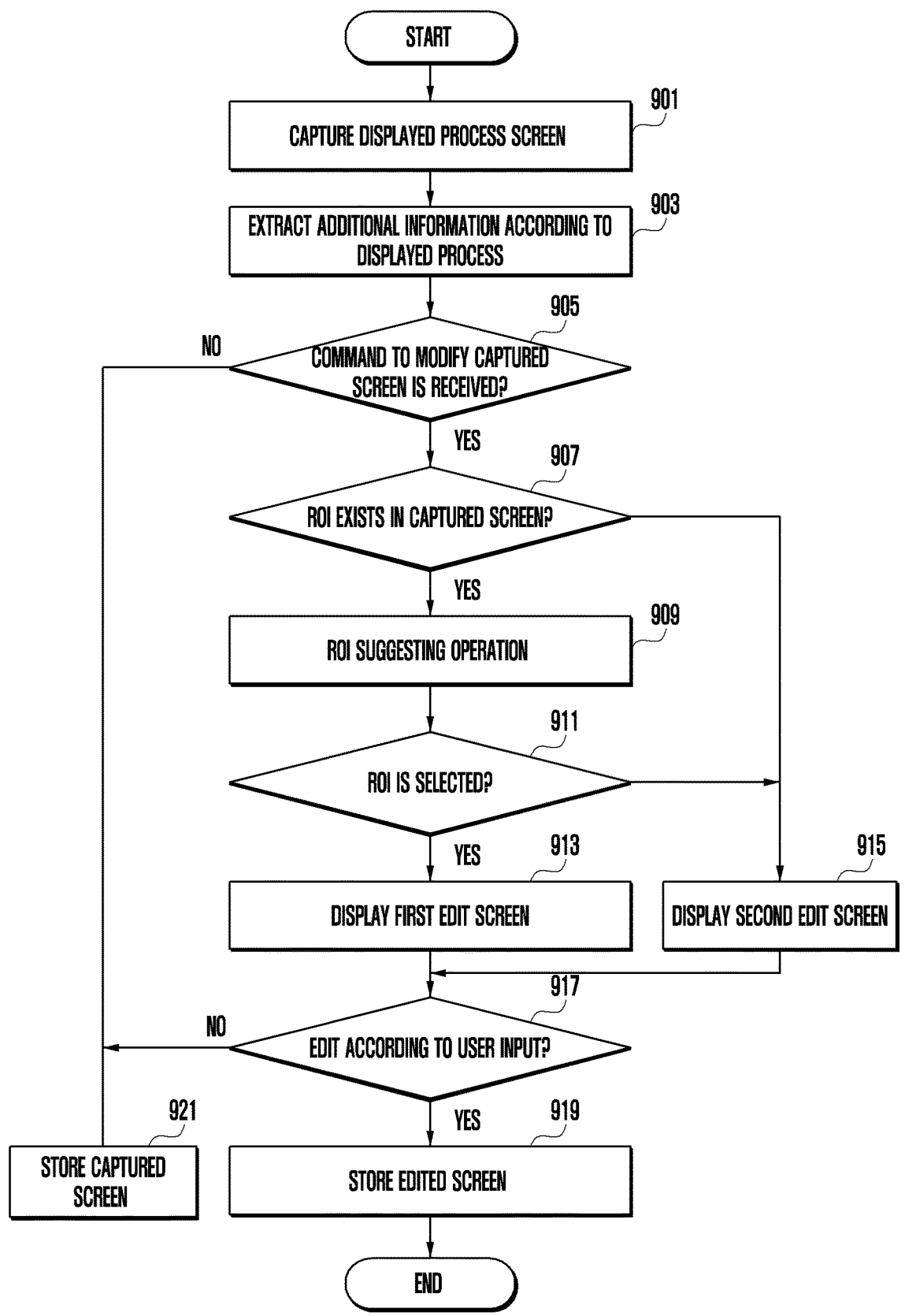
FIG. 9 is a flowchart illustrating a method for operating capturing by an electronic device according to an embodiment of the disclosure.

FIG. 9 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 9, an electronic device (e.g., the electronic device 101 in FIG. 1, the electronic device 200 in FIG. 2A, or the electronic device 300 in FIG. 3A) according to various embodiments may capture a process screen displayed on a display (e.g., the display device 160 in FIG. 1, the display 230 in FIG. 2A, or the display 301 in FIG. 3A) under control of a processor (e.g., the processor 120 in FIG. 1), in operation 901.

According to various embodiments of the disclosure, the displayed process screen may be a screen in which image or video information is displayed in a window and/or layout activated on the display (e.g., the display device 160 in FIG. 1, the display 230 in FIG. 2A, or the display 301 in FIG. 3A).

According to various embodiments of the disclosure, the displayed process screen may include a user interface of a running application. The application may correspond to a running application stored in a single window frame buffer screen or multiple window frame buffers. According to various embodiments of the disclosure, the capturing operation may include an operation of obtaining and/or generating a still picture image of a screen displayed on the display (e.g., the display device 160 in FIG. 1, the display 230 in FIG. 2A, or the display 301 in FIG. 3A).

According to various embodiments of the disclosure, the electronic device (e.g., the electronic device 101 in FIG. 1, the electronic device 200 in FIG. 2A, or the electronic device 300 in FIG. 3A) may obtain an image including a still picture of an image displayed on the display (e.g., the display device 160 in FIG. 1, the display 230 in FIG. 2A, or the display 301 in FIG. 3A), based on obtained rendering information under control of the processor (e.g., the processor 120 in FIG. 1), in operation 901.

According to various embodiments of the disclosure, a command to capture a screen of the electronic device (e.g., the electronic device 101 in FIG. 1, the electronic device 200 in FIG. 2A, or the electronic device 300 in FIG. 3A) may include a command to select an object region to capture a screen and/or a command to capture the entire screen.

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 903.

The operation of extracting the additional information according to the displayed process according to various embodiments may be an operation of providing a screen and/or function allowing the captured screen to be edited, under control of the processor (e.g., the processor 120 in FIG. 1).

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from a frame buffer or the application under control of the processor (e.g., the processor 120 in FIG. 1), in operation 903.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from rendering information obtained from the application or the display (e.g., the display device 160 in FIG. 1, the display 230 in FIG. 2A, or the display 301 in FIG. 3A) under control of a processor (e.g., the processor 120 in FIG. 1), in operation 903.

In the electronic device (e.g., the electronic device 101 in FIG. 1, the electronic device 200 in FIG. 2A, or the electronic device 300 in FIG. 3A) according to various embodiments of the disclosure, the operation of extracting a region and/or a block region of the still picture of the displayed process, under control of the processor (e.g., the processor 120 in FIG. 1), in operation 903, may be an operation of extracting an image region and/or a text region in the still picture in units of blocks.

In the electronic device (e.g., the electronic device 101 in FIG. 1, the electronic device 200 in FIG. 2A, or the electronic device 300 in FIG. 3A) according to various embodiments of the disclosure, the operation of segmenting the still picture of the displayed process into a region and/or a block region under control of the processor (e.g., the processor 120 in FIG. 1), in operation 903, may be an operation of segmenting an image region and/or a text region in the still picture in units of blocks.

The electronic device (e.g., the electronic device 101 in FIG. 1, the electronic device 200 in FIG. 2A, or the electronic device 300 in FIG. 3A) according to various embodiments may determine whether a command to modify the captured screen has been received, under control of the processor (e.g., the processor 120 in FIG. 1), in operation 905.

According to various embodiments of the disclosure, if an image editing and/or modifying command is selected on a screenshot toolbar including a screen and/or a function allowing the captured screen to be edited, the electronic device (e.g., the electronic device 101 in FIG. 1, the electronic device 200 in FIG. 2A, or the electronic device 300 in FIG. 3A) may determine that a command to modify the captured screen has been received, under control of the processor (e.g., the processor 120 in FIG. 1), in operation 905.

If the reception of a command to modify the captured screen fails, the electronic device (e.g., the electronic device 101 in FIG. 1, the electronic device 200 in FIG. 2A, or the electronic device 300 in FIG. 3A) according to various embodiments may enter into operation 921, under control of the processor (e.g., the processor 120 in FIG. 1), in operation 905.

The electronic device (e.g., the electronic device 101 in FIG. 1, the electronic device 200 in FIG. 2A, or the electronic device 300 in FIG. 3A) according to various embodiments may store, as an image, the captured screen created at a capture command time point under control of the processor (e.g., the processor 120 in FIG. 1), in operation 921.

If a command to modify the captured screen is received, the electronic device (e.g., the electronic device 101 in FIG. 1, the electronic device 200 in FIG. 2A, or the electronic device 300 in FIG. 3A) according to various embodiments may enter into operation 907, under control of the processor (e.g., the processor 120 in FIG. 1), in operation 905.

The electronic device (e.g., the electronic device 101 in FIG. 1, the electronic device 200 in FIG. 2A, or the electronic device 300 in FIG. 3A) according to various embodiments may determine whether a region of interest (ROI) exists in the captured screen, under control of the processor (e.g., the processor 120 in FIG. 1), in operation 907.

According to various embodiments of the disclosure, under control of the processor (e.g., the processor 120 in FIG. 1), in operation 907, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if a particular region is included in the captured screen, the electronic device may determine the particular region as a region of interest (ROI). For example, the particular region may be an image region. Under control of the processor (e.g., the processor 120 in FIG. 1), in operation 907, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if a particular region is not included in the captured screen, the electronic device may determine that there is no region of interest (ROI).

According to various embodiments of the disclosure, under control of the processor (e.g., the processor 120 in FIG. 1), in operation 907, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if the ratio of a particular region in the capture screen is equal to or larger than a pre-configured ratio, the electronic device may determine the particular region as a region of interest (ROI). For example, the pre-configured ratio may be about 12%. If the ratio of the particular region in the capture screen is smaller than the pre-configured ratio, the electronic device (e.g., the electronic device 101 in FIG. 1, the electronic device 200 in FIG. 2A, or the electronic device 300 in FIG. 3A) may determine that there is no region of interest (ROI), under control of the processor (e.g., the processor 120 in FIG. 1), in operation 907.

Under control of the processor (e.g., the processor 120 in FIG. 1), in operation 907, the electronic device (e.g., the electronic device 101 in FIG. 1, the electronic device 200 in FIG. 2A, or the electronic device 300 in FIG. 3A) according to various embodiments may separate an image region and/or a text region by using region information, block region information, or the like, extracted from the captured screen as additional information, and if the ratio of a plurality of particular regions in the capture screen is equal to or larger than a pre-configured ratio, the electronic device may determine the largest region as a region of interest (ROI). If the ratio of the plurality of particular regions in the capture screen is smaller than the pre-configured ratio, the electronic device (e.g., the electronic device 101 in FIG. 1, the electronic device 200 in FIG. 2A, or the electronic device 300 in FIG. 3A) may determine that there is no region of interest (ROI), under control of the processor (e.g., the processor 120 in FIG. 1), in operation 907. For example, if the ratio of a plurality of image regions in the capture screen is equal to or larger than the pre-configured ratio, the electronic device (e.g., the electronic device 101 in FIG. 1, the electronic device 200 in FIG. 2A, or the electronic device 300 in FIG. 3A) may determine the largest image region among the plurality of image regions as a region of interest (ROI) under control of the processor (e.g., the processor 120 in FIG. 1).

If it is determined that a region of interest (ROI) exists in the captured screen, the electronic device (e.g., the electronic device 101 in FIG. 1, the electronic device 200 in FIG. 2A, or the electronic device 300 in FIG. 3A) according to various embodiments may enter into operation 909 under control of the processor (e.g., the processor 120 in FIG. 1), in operation 907.

If it is determined that there is no region of interest (ROI) in the captured screen, the electronic device (e.g., the electronic device 101 in FIG. 1, the electronic device 200 in FIG. 2A, or the electronic device 300 in FIG. 3A) according to various embodiments may enter into operation 915 under control of the processor (e.g., the processor 120 in FIG. 1), in operation 907.

The electronic device (e.g., the electronic device 101 in FIG. 1, the electronic device 200 in FIG. 2A, or the electronic device 300 in FIG. 3A) according to various embodiments may perform an operation of suggesting the region of interest (ROI) under control of the processor (e.g., the processor 120 in FIG. 1), in operation 909.

According to various embodiments of the disclosure, the operation of suggesting the region of interest (ROI) may be an operation of displaying an image (e.g., a GUI element related to highlight, inversion, a box, and/or an icon) indicating a region of interest (ROI), during a pre-configured time interval. If the pre-configured time interval has passed, the image (e.g., a GUI element related to highlight, inversion, a box, and/or an icon) indicating the region of interest (ROI) may disappear. The electronic device (e.g., the electronic device 101 in FIG. 1, the electronic device 200 in FIG. 2A, or the electronic device 300 in FIG. 3A) according to various embodiments may maintain a view layout of the captured screen while displaying an image (e.g., a GUI element related to highlight, inversion, a box, and/or an icon) indicating a region of interest (ROI), during a pre-configured time interval, under control of the processor (e.g., the processor 120 in FIG. 1), in operation 909.

The electronic device (e.g., the electronic device 101 in FIG. 1, the electronic device 200 in FIG. 2A, or the electronic device 300 in FIG. 3A) according to various embodiments may determine whether the region of interest (ROI) is selected, under control of the processor (e.g., the processor 120 in FIG. 1), in operation 911.

According to various embodiments of the disclosure, if a command or an input of selecting the region of interest (ROI) by a user input is received, the electronic device (e.g., the electronic device 101 in FIG. 1, the electronic device 200 in FIG. 2A, or the electronic device 300 in FIG. 3A) may determine that the region of interest (ROI) is selected, under control of the processor (e.g., the processor 120 in FIG. 1).

According to various embodiments of the disclosure, if it is determined that a command or an input of selecting the region of interest (ROI) by a user input is not received, and a region other than the region of interest (ROI) is selected, the electronic device (e.g., the electronic device 101 in FIG. 1, the electronic device 200 in FIG. 2A, or the electronic device 300 in FIG. 3A) may determine that the region of interest (ROI) is not selected, under control of the processor (e.g., the processor 120 in FIG. 1).

If it is determined that the region of interest (ROI) is selected, the electronic device (e.g., the electronic device 101 in FIG. 1, the electronic device 200 in FIG. 2A, or the electronic device 300 in FIG. 3A) according to various embodiments may enter into operation 913, under control of the processor (e.g., the processor 120 in FIG. 1), in operation 911.

If it is determined that the region of interest (ROI) is not selected, the electronic device (e.g., the electronic device 101 in FIG. 1, the electronic device 200 in FIG. 2A, or the electronic device 300 in FIG. 3A) according to various embodiments may enter into operation 915, under control of the processor (e.g., the processor 120 in FIG. 1), in operation 911.

If the region of interest (ROI) is selected, the electronic device (e.g., the electronic device 101 in FIG. 1, the electronic device 200 in FIG. 2A, or the electronic device 300 in FIG. 3A) according to various embodiments may display a first edit screen, under control of the processor (e.g., the processor 120 in FIG. 1), in operation 913.

According to various embodiments of the disclosure, the first edit screen may be an edit screen in which a view layout of the captured screen is maintained while an editing tool user interface (e.g., a "Crop image" user interface) is placed to center on the region of interest (ROI). The region other than the region of interest (ROI) in the captured screen may be processed to be darker than the region of interest (ROI), or discriminable from the region of interest (ROI), so as to be displayed.

If the region of interest (ROI) is not selected, the electronic device (e.g., the electronic device 101 in FIG. 1, the electronic device 200 in FIG. 2A, or the electronic device 300 in FIG. 3A) according to various embodiments may display a second edit screen, under control of the processor (e.g., the processor 120 in FIG. 1), in operation 915.

According to various embodiments of the disclosure, the second edit screen may be an edit screen in which a view layout of the captured screen is maintained while an editing tool user interface (e.g., a "Crop image" user interface) is placed to center on the entire screen.

The electronic device (e.g., the electronic device 101 in FIG. 1, the electronic device 200 in FIG. 2A, or the electronic device 300 in FIG. 3A) according to various embodiments may determine whether there is an editing operation according to a user input, under control of the processor (e.g., the processor 120 in FIG. 1), in operation 917.

According to various embodiments of the disclosure, the editing operation according to the user input may be an operation in which the editing tool user interface (e.g., a "Crop image" user interface) is moved by the user input to select a screen desired by the user in the captured screen. In the editing operation according to the user input, a time point at which the editing tool user interface (e.g., a "Crop image" user interface) is moved by the user input and the user input is released may be determined as a time point at which the image editing operation is complete. If the user input is released, the electronic device (e.g., the electronic device 101 in FIG. 1, the electronic device 200 in FIG. 2A, or the electronic device 300 in FIG. 3A) may change the view layout of the captured screen to center on an image and/or a screen edited according to the user input under control of the processor (e.g., the processor 120 in FIG. 1).

If there is an editing operation according to a user input, the electronic device (e.g., the electronic device 101 in FIG. 1, the electronic device 200 in FIG. 2A, or the electronic device 300 in FIG. 3A) according to various embodiments may enter into operation 919 under control of the processor (e.g., the processor 120 in FIG. 1), in operation 917.

If there is no editing operation according to a user input, the electronic device (e.g., the electronic device 101 in FIG. 1, the electronic device 200 in FIG. 2A, or the electronic device 300 in FIG. 3A) according to various embodiments may enter into operation 921 under control of the processor (e.g., the processor 120 in FIG. 1), in operation 917.

The electronic device (e.g., the electronic device 101 in FIG. 1, the electronic device 200 in FIG. 2A, or the electronic device 300 in FIG. 3A) according to various embodiments may store, as an image, a screen edited according to the user input under control of the processor (e.g., the processor 120 in FIG. 1), in operation 919.

Figure 10:
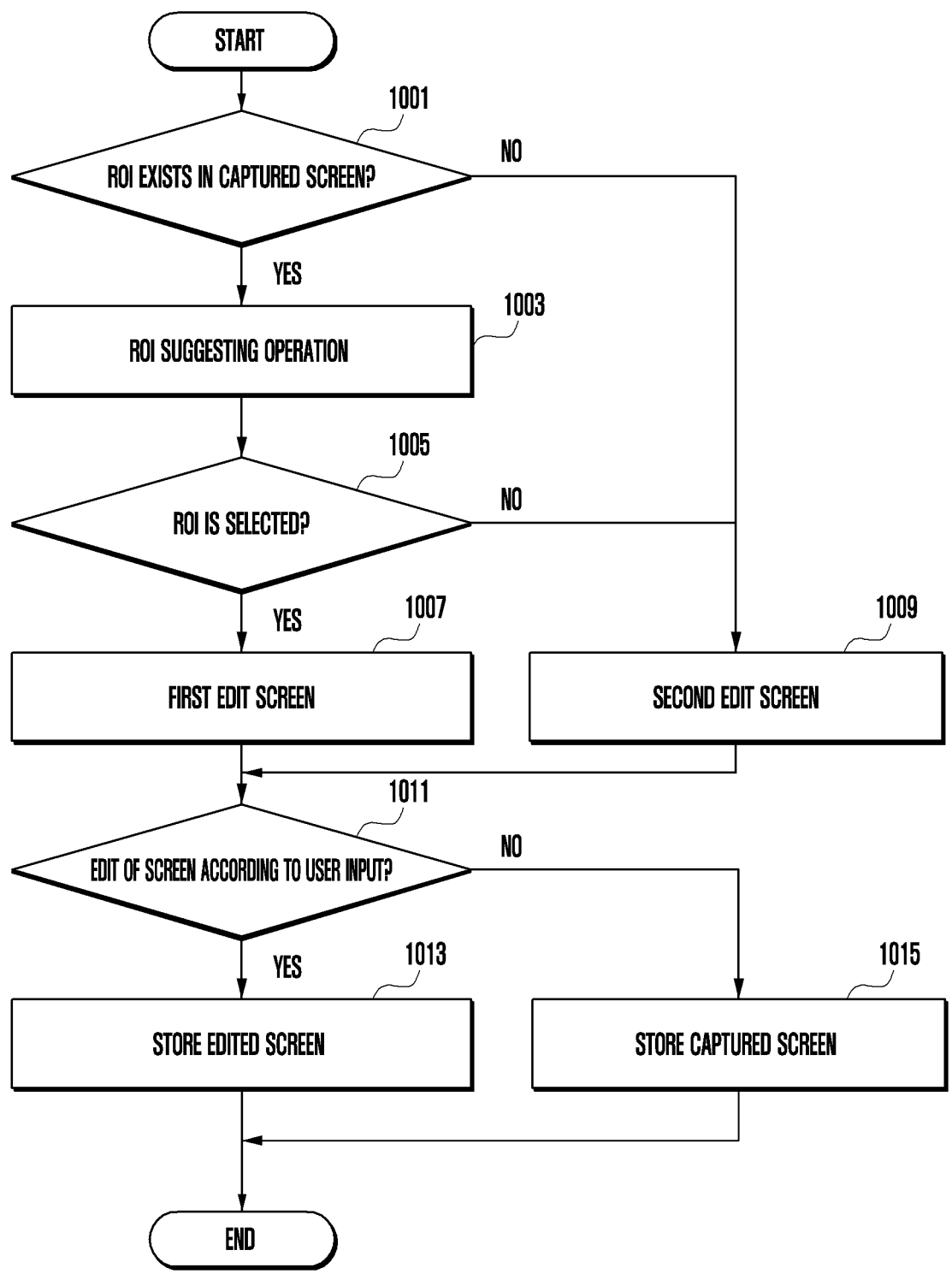
FIG. 10 is a flowchart illustrating an operation of modifying a captured screen by an electronic device according to an embodiment of the disclosure.

FIG. 10 is a flowchart illustrating an operation of modifying a captured screen by an electronic device (e.g., the electronic device 101 in FIG. 1, the electronic device 200 in FIG. 2A, or the electronic device 300 in FIG. 3A) according to an embodiment of the disclosure.

Referring to FIG. 10, an electronic device (e.g., the electronic device 101 in FIG. 1, the electronic device 200 in FIG. 2A, or the electronic device 300 in FIG. 3A) according to various embodiments may determine whether a region of interest (ROI) exists in a captured screen, under control of a processor (e.g., the processor 120 in FIG. 1), in operation 1001.

According to various embodiments of the disclosure, under control of the processor (e.g., the processor 120 in FIG. 1), in operation 1001, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if a particular region is included in the captured screen, the electronic device may determine the particular region as a region of interest (ROI). For example, the particular region may be an image region. Under control of the processor (e.g., the processor 120 in FIG. 1), in operation 1001, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if a particular region is not included in the captured screen, the electronic device may determine that there is no region of interest (ROI).

According to various embodiments of the disclosure, under control of the processor (e.g., the processor 120 in FIG. 1), in operation 1001, the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen as additional information, and if the ratio of a particular region in the capture screen is equal to or larger than a pre-configured ratio, the electronic device may determine the particular region as a region of interest (ROI). For example, the pre-configured ratio may be 12%. If the ratio of the particular region in the capture screen is smaller than the pre-configured ratio, the electronic device (e.g., the electronic device 101 in FIG. 1, the electronic device 200 in FIG. 2A, or the electronic device 300 in FIG. 3A) may determine that there is no region of interest (ROI), under control of the processor (e.g., the processor 120 in FIG. 1), in operation 1001.

Under control of the processor (e.g., the processor 120 in FIG. 1), in operation 1001, the electronic device (e.g., the electronic device 101 in FIG. 1, the electronic device 200 in FIG. 2A, or the electronic device 300 in FIG. 3A) according to various embodiments may separate an image region and/or a text region by using region information, block region information, or the like, extracted from the captured screen as additional information, and if the ratio of a plurality of particular regions in the capture screen is equal to or larger than a pre-configured ratio, the electronic device may determine the largest region as a region of interest (ROI). If the ratio of the plurality of particular regions in the capture screen is smaller than the pre-configured ratio, the electronic device (e.g., the electronic device 101 in FIG. 1, the electronic device 200 in FIG. 2A, or the electronic device 300 in FIG. 3A) may determine that there is no region of interest (ROI), under control of the processor (e.g., the processor 120 in FIG. 1), in operation 1001. For example, if the ratio of a plurality of image regions in the capture screen is equal to or larger than the pre-configured ratio, the electronic device (e.g., the electronic device 101 in FIG. 1, the electronic device 200 in FIG. 2A, or the electronic device 300 in FIG. 3A) may determine the largest image region among the plurality of image regions as a region of interest (ROI) under control of the processor (e.g., the processor 120 in FIG. 1).

If it is determined that a region of interest (ROI) exists in the captured screen, the electronic device (e.g., the electronic device 101 in FIG. 1, the electronic device 200 in FIG. 2A, or the electronic device 300 in FIG. 3A) according to various embodiments may enter into operation 1003 under control of the processor (e.g., the processor 120 in FIG. 1), in operation 1001.

If it is determined that there is no region of interest (ROI) in the captured screen, the electronic device (e.g., the electronic device 101 in FIG. 1, the electronic device 200 in FIG. 2A, or the electronic device 300 in FIG. 3A) according to various embodiments may enter into operation 1009 under control of the processor (e.g., the processor 120 in FIG. 1), in operation 1001.

The electronic device (e.g., the electronic device 101 in FIG. 1, the electronic device 200 in FIG. 2A, or the electronic device 300 in FIG. 3A) according to various embodiments may perform an operation of suggesting the region of interest (ROI) under control of a processor (e.g., the processor 120 in FIG. 1), in operation 1003.

According to various embodiments of the disclosure, the operation of suggesting the region of interest (ROI) may be an operation of displaying an image (e.g., a GUI element related to highlight, inversion, a box, and/or an icon) indicating the region of interest (ROI), during a pre-configured time interval. If the pre-configured time interval has passed, the image (e.g., a GUI element related to highlight, inversion, a box, and/or an icon) indicating the region of interest (ROI) may disappear. The electronic device (e.g., the electronic device 101 in FIG. 1, the electronic device 200 in FIG. 2A, or the electronic device 300 in FIG. 3A) according to various embodiments may maintain a view layout of the captured screen while displaying an image (e.g., a GUI element related to highlight, inversion, a box, and/or an icon) indicating a region of interest (ROI), during a pre-configured time interval, under control of the processor (e.g., the processor 120 in FIG. 1), in operation 1003.

The electronic device (e.g., the electronic device 101 in FIG. 1, the electronic device 200 in FIG. 2A, or the electronic device 300 in FIG. 3A) according to various embodiments may determine whether the region of interest (ROI) is selected, under control of the processor (e.g., the processor 120 in FIG. 1), in operation 1005.

According to various embodiments of the disclosure, if a command or an input of selecting the region of interest (ROI) by a user input is received, the electronic device (e.g., the electronic device 101 in FIG. 1, the electronic device 200 in FIG. 2A, or the electronic device 300 in FIG. 3A) may determine that the region of interest (ROI) is selected, under control of the processor (e.g., the processor 120 in FIG. 1).

According to various embodiments of the disclosure, if it is determined that a command or an input of selecting the region of interest (ROI) by a user input is not received, and a region other than the region of interest (ROI) is selected, the electronic device (e.g., the electronic device 101 in FIG. 1, the electronic device 200 in FIG. 2A, or the electronic device 300 in FIG. 3A) may determine that the region of interest (ROI) is not selected, under control of the processor (e.g., the processor 120 in FIG. 1).

If it is determined that the region of interest (ROI) is selected, the electronic device (e.g., the electronic device 101 in FIG. 1, the electronic device 200 in FIG. 2A, or the electronic device 300 in FIG. 3A) according to various embodiments may enter into operation 1007, under control of the processor (e.g., the processor 120 in FIG. 1), in operation 1005.

If it is determined that the region of interest (ROI) is not selected, the electronic device (e.g., the electronic device 101 in FIG. 1, the electronic device 200 in FIG. 2A, or the electronic device 300 in FIG. 3A) according to various embodiments may enter into operation 1009, under control of the processor (e.g., the processor 120 in FIG. 1), in operation 1005.

If the region of interest (ROI) is selected, the electronic device (e.g., the electronic device 101 in FIG. 1, the electronic device 200 in FIG. 2A, or the electronic device 300 in FIG. 3A) according to various embodiments may display a first edit screen, under control of the processor (e.g., the processor 120 in FIG. 1), in operation 1007.

According to various embodiments of the disclosure, the first edit screen may be an edit screen in which a view layout of the captured screen is maintained while an editing tool user interface (e.g., a "Crop image" user interface) is placed to center on the region of interest (ROI). The region other than the region of interest (ROI) in the captured screen may be processed to be darker than the region of interest (ROI), so as to be displayed.

If the region of interest (ROI) is selected, the electronic device (e.g., the electronic device 101 in FIG. 1, the electronic device 200 in FIG. 2A, or the electronic device 300 in FIG. 3A) according to various embodiments may display a second edit screen, under control of the processor (e.g., the processor 120 in FIG. 1), in operation 1009.

According to various embodiments of the disclosure, the second edit screen may be an edit screen in which a view layout of the captured screen is maintained while an editing tool user interface (e.g., a "Crop image" user interface) is placed to center on the entire screen.

The electronic device (e.g., the electronic device 101 in FIG. 1, the electronic device 200 in FIG. 2A, or the electronic device 300 in FIG. 3A) according to various embodiments may determine whether there is an editing operation according to a user input, under control of the processor (e.g., the processor 120 in FIG. 1), in operation 1011.

According to various embodiments of the disclosure, the editing operation according to the user input may be an operation in which the editing tool user interface (e.g., a "Crop image" user interface) is moved by the user input to select a screen desired by the user in the captured screen. In the editing operation according to the user input, a time point at which the editing tool user interface (e.g., a "Crop image" user interface) is moved by the user input and the user input is released may be determined as a time point at which the image editing operation is complete. If the user input is released, the electronic device (e.g., the electronic device 101 in FIG. 1, the electronic device 200 in FIG. 2A, or the electronic device 300 in FIG. 3A) may change the view layout of the captured screen to center on an image and/or a screen edited according to the user input under control of the processor (e.g., the processor 120 in FIG. 1).

If there is an editing operation according to a user input, the electronic device (e.g., the electronic device 101 in FIG. 1, the electronic device 200 in FIG. 2A, or the electronic device 300 in FIG. 3A) according to various embodiments may enter into operation 1013 under control of the processor (e.g., the processor 120 in FIG. 1), in operation 1011.

If there is no editing operation according to a user input, the electronic device (e.g., the electronic device 101 in FIG. 1, the electronic device 200 in FIG. 2A, or the electronic device 300 in FIG. 3A) according to various embodiments may enter into operation 1015 under control of the processor (e.g., the processor 120 in FIG. 1), in operation 1011.

The electronic device (e.g., the electronic device 101 in FIG. 1, the electronic device 200 in FIG. 2A, or the electronic device 300 in FIG. 3A) according to various embodiments may store, as an image, a screen edited according to the user input under control of the processor (e.g., the processor 120 in FIG. 1), in operation 1013.

The electronic device (e.g., the electronic device 101 in FIG. 1, the electronic device 200 in FIG. 2A, or the electronic device 300 in FIG. 3A) according to various embodiments may store, as an image, the captured screen created at a capture command time point under control of the processor (e.g., the processor 120 in FIG. 1), in operation 1015.

Figure 11:
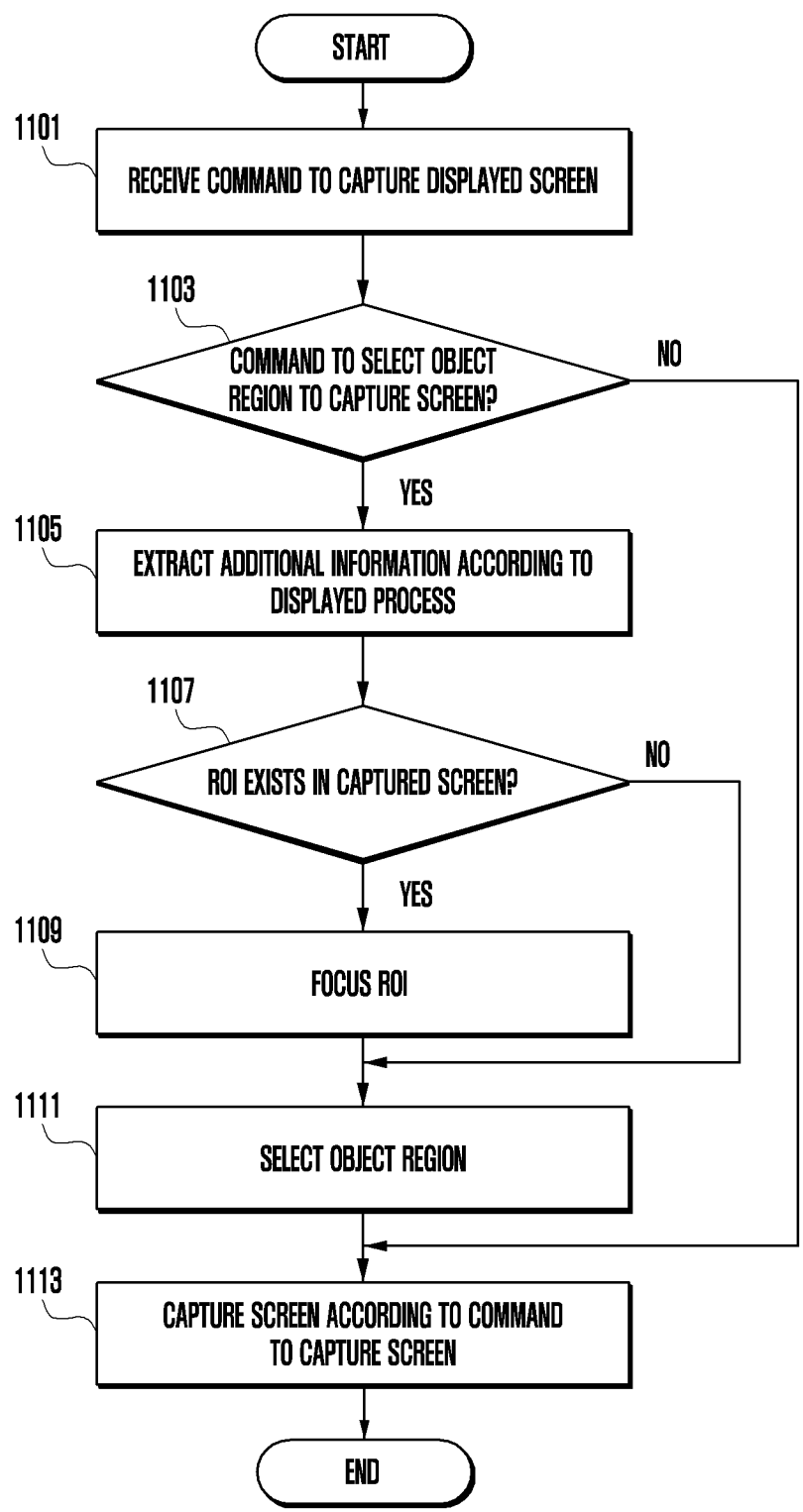
FIG. 11 is a flowchart illustrating an operation of capturing a displayed process screen by an electronic device according to an embodiment of the disclosure.

FIG. 11 is a flowchart illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 11, an electronic device (e.g., the electronic device 101 in FIG. 1, the electronic device 200 in FIG. 2A, or the electronic device 300 in FIG. 3A) according to various embodiments may receive a command to capture a displayed screen under control of a processor (e.g., the processor 120 in FIG. 1), in operation 1101.

The electronic device (e.g., the electronic device 101 in FIG. 1, the electronic device 200 in FIG. 2A, or the electronic device 300 in FIG. 3A) according to various embodiments may determine whether the received command is a command to select an object region to capture a screen under control of the processor (e.g., the processor 120 in FIG. 1), in operation 1103.

If it is determined that the received command is a command to select an object region to capture a screen, the electronic device (e.g., the electronic device 101 in FIG. 1, the electronic device 200 in FIG. 2A, or the electronic device 300 in FIG. 3A) according to various embodiments may enter into operation 1105, under control of the processor (e.g., the processor 120 in FIG. 1), in operation 1103.

If it is determined that the received command is not a command to select an object region to capture a screen, the electronic device (e.g., the electronic device 101 in FIG. 1, the electronic device 200 in FIG. 2A, or the electronic device 300 in FIG. 3A) according to various embodiments may determine that the received command is a command to capture the entire screen, and may enter into operation 1113, under control of the processor (e.g., the processor 120 in FIG. 1), in operation 1103.

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 1105.

The electronic device (e.g., the electronic device 101 in FIG. 1, the electronic device 200 in FIG. 2A, or the electronic device 300 in FIG. 3A) according to various embodiments may determine whether a region of interest (ROI) exists in a captured screen, under control of the processor (e.g., the processor 120 in FIG. 1), in operation 1107.

If it is determines that a region of interest (ROI) exists in the captured screen, the electronic device (e.g., the electronic device 101 in FIG. 1, the electronic device 200 in FIG. 2A, or the electronic device 300 in FIG. 3A) according to various embodiments may enter into operation 1109 under control of the processor (e.g., the processor 120 in FIG. 1), in operation 1107.

If it is determined that there is no region of interest (ROI) in the captured screen, the electronic device (e.g., the electronic device 101 in FIG. 1, the electronic device 200 in FIG. 2A, or the electronic device 300 in FIG. 3A) according to various embodiments may enter into operation 1111 under control of the processor (e.g., the processor 120 in FIG. 1), in operation 1107.

The electronic device (e.g., the electronic device 101 in FIG. 1, the electronic device 200 in FIG. 2A, or the electronic device 300 in FIG. 3A) according to various embodiments may focus the region of interest (ROI) under control of a processor (e.g., the processor 120 in FIG. 1), in operation 1109.

According to various embodiments of the disclosure, the operation of focusing the region of interest (ROI) may correspond to a view layout in which a region around the region of interest (ROI) is processed to be brightened, and the region other than the region of interest (ROI) is processed to be darkened.

According to various embodiments of the disclosure, the operation of focusing the region of interest (ROI) may be an operation of displaying an image (e.g., a GUI element related to highlight, inversion, a box, an oval, animation, pin to screen, and/or an icon) indicating the region of interest (ROI).

The electronic device (e.g., the electronic device 101 in FIG. 1, the electronic device 200 in FIG. 2A, or the electronic device 300 in FIG. 3A) according to various embodiments may maintain a view layout of the captured screen while displaying an image (e.g., a GUI element related to highlight, inversion, a box, an oval, animation, pin to screen, and/or an icon) indicating the region of interest (ROI), under control of the processor (e.g., the processor 120 in FIG. 1), in operation 1109. According to various embodiments of the disclosure, the operation of focusing the region of interest (ROI) may be an operation of placing an editing tool user interface (e.g., a "Crop image" user interface) to center on the region of interest (ROI) while displaying an image (e.g., a GUI element related to highlight, inversion, a box, an oval, and/or an icon) indicating the region of interest (ROI).

The electronic device (e.g., the electronic device 101 in FIG. 1, the electronic device 200 in FIG. 2A, or the electronic device 300 in FIG. 3A) according to various embodiments may select an object region selected according to a user input under control of the processor (e.g., the processor 120 in FIG. 1), in operation 1111.

The electronic device (e.g., the electronic device 101 in FIG. 1, the electronic device 200 in FIG. 2A, or the electronic device 300 in FIG. 3A) according to various embodiments may select an object region selected according to a user input in a state where the region of interest (ROI) is focused, under control of the processor (e.g., the processor 120 in FIG. 1), in operation 1111. For example, a user interface focused on the region of interest (ROI) may be moved according to the user input.

The electronic device (e.g., the electronic device 101 in FIG. 1, the electronic device 200 in FIG. 2A, or the electronic device 300 in FIG. 3A) according to various embodiments may capture a screen of the selected object region according to the command to capture the screen, under control of the processor (e.g., the processor 120 in FIG. 1), in operation 1113.

If the received command is a command to select an object region to capture a screen, the electronic device (e.g., the electronic device 101 in FIG. 1, the electronic device 200 in FIG. 2A, or the electronic device 300 in FIG. 3A) according to various embodiments may capture the object region screen selected according to the user input under control of the processor (e.g., the processor 120 in FIG. 1), in operation 1113.

If the received command is a command to capture the entire screen, the electronic device (e.g., the electronic device 101 in FIG. 1, the electronic device 200 in FIG. 2A, or the electronic device 300 in FIG. 3A) according to various embodiments may capture the entire screen under control of the processor (e.g., the processor 120 in FIG. 1), in operation 1113.

Figure 12:
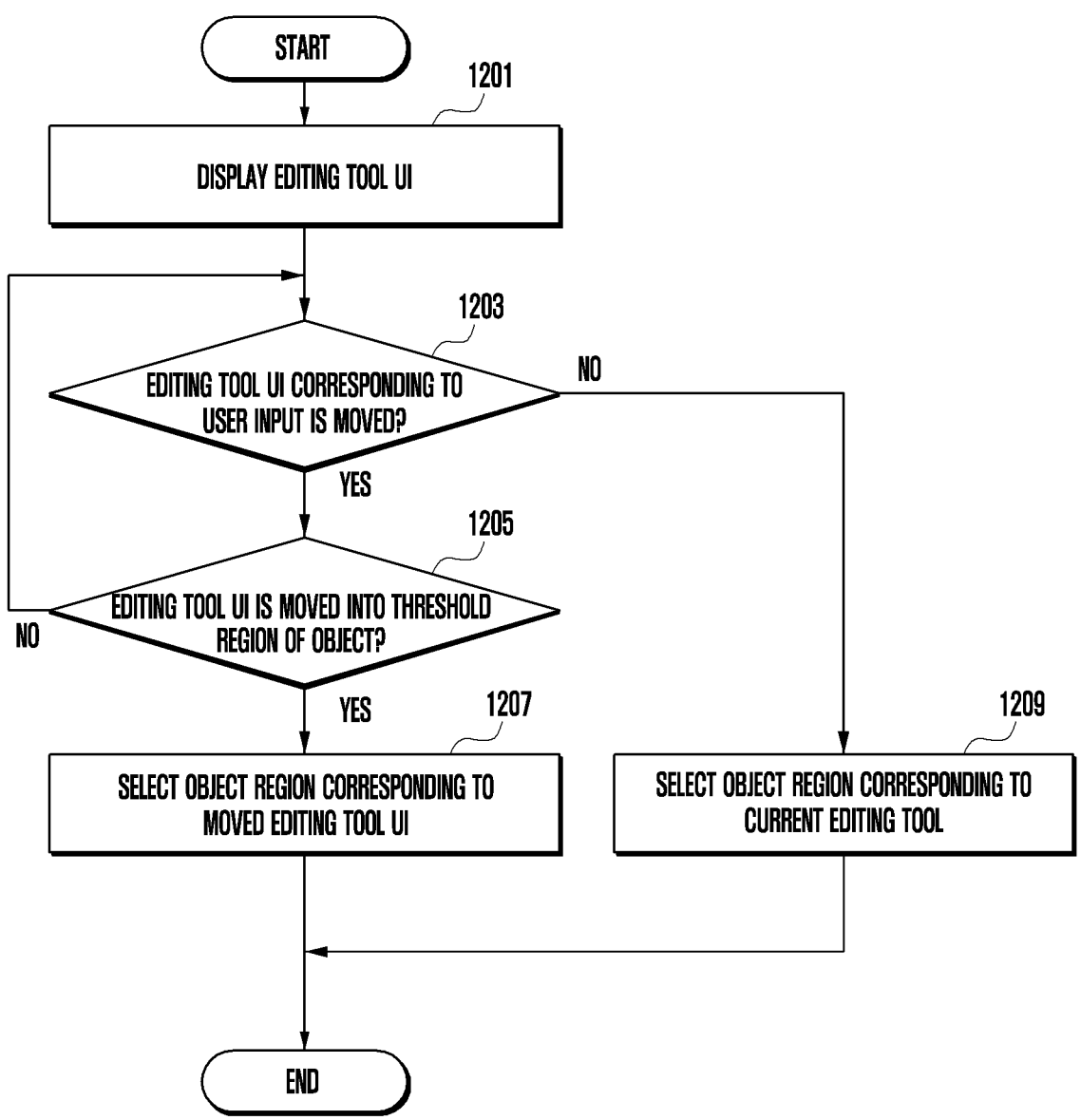
FIG. 12 is a flowchart illustrating an editing operation of an electronic device according to a user input according to an embodiment of the disclosure.

FIG. 12 is a flowchart illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 12, if a command to modify a captured screen is received, an electronic device (e.g., the electronic device 101 in FIG. 1, the electronic device 200 in FIG. 2A, or the electronic device 300 in FIG. 3A) according to various embodiments may display an editing tool user interface in at least a partial region of the captured screen under control of a processor (e.g., the processor 120 in FIG. 1), in operation 1201.

According to various embodiments of the disclosure, the editing tool user interface may be a "Crop image" user interface. The "Crop image" user interface may be substantially rectangular and/or square, and may include at least one of a rectangular and/or square edge and/or a square or L-shaped bracket image neighboring a vertex. According to various embodiments of the disclosure, the user input may be an input of moving a substantially rectangular and/or square end line, or the square or L-shaped bracket image of the "Crop image" user interface.

The electronic device (e.g., the electronic device 101 in FIG. 1, the electronic device 200 in FIG. 2A, or the electronic device 300 in FIG. 3A) according to various embodiments may determine whether an editing tool user interface corresponding to a user input has been moved, under control of the processor (e.g., the processor 120 in FIG. 1), in operation 1203.

If it is determined that the editing tool user interface corresponding to the user input is moved, the electronic device (e.g., the electronic device 101 in FIG. 1, the electronic device 200 in FIG. 2A, or the electronic device 300 in FIG. 3A) according to various embodiments may enter into operation 1205, under control of the processor (e.g., the processor 120 in FIG. 1), in operation 1203.

If it is determined that the editing tool user interface corresponding to the user input is not moved, the electronic device (e.g., the electronic device 101 in FIG. 1, the electronic device 200 in FIG. 2A, or the electronic device 300 in FIG. 3A) according to various embodiments may enter into operation 1209, under control of the processor (e.g., the processor 120 in FIG. 1), in operation 1203.

The electronic device (e.g., the electronic device 101 in FIG. 1, the electronic device 200 in FIG. 2A, or the electronic device 300 in FIG. 3A) according to various embodiments may determine whether the editing tool user interface has been moved into a threshold region of an object, under control of the processor (e.g., the processor 120 in FIG. 1), in operation 1205.

According to various embodiments of the disclosure, the threshold region of the object may be a region configured, as the periphery of an object region, to extend inside and outside the object region by a predetermined section (or length) with respect to the object region. According to various embodiments of the disclosure, the threshold region of the object may not be displayed to be seen on the display.

According to various embodiments of the disclosure, the electronic device (e.g., the electronic device 101 in FIG. 1, the electronic device 200 in FIG. 2A, or the electronic device 300 in FIG. 3A) may determine whether the substantially rectangular and/or square end line, or the square or L-shaped bracket image of the "Crop image" user interface has been moved into the threshold region of the object, under control of the processor (e.g., the processor 120 in FIG. 1), in operation 1205. According to various embodiments of the disclosure, if it is determined that the substantially rectangular and/or square end line, or the square or L-shaped bracket image of the "Crop image" user interface has been moved into the threshold region of the object, the electronic device (e.g., the electronic device 101 in FIG. 1, the electronic device 200 in FIG. 2A, or the electronic device 300 in FIG. 3A) may stop the movement and perform an operation of snapping to the object region, under control of the processor (e.g., the processor 120 in FIG. 1), in operation 1205.

If it is determined that the editing tool user interface has been moved in to the threshold region of the object, the electronic device (e.g., the electronic device 101 in FIG. 1, the electronic device 200 in FIG. 2A, or the electronic device 300 in FIG. 3A) according to various embodiments may enter operation 1207 under control of the processor (e.g., the processor 120 in FIG. 1), in operation 1205.

If it is determined that the editing tool user interface is not moved in to the threshold region of the object, the electronic device (e.g., the electronic device 101 in FIG. 1, the electronic device 200 in FIG. 2A, or the electronic device 300 in FIG. 3A) according to various embodiments may enter operation 1203 under control of the processor (e.g., the processor 120 in FIG. 1), in operation 1205.

The electronic device (e.g., the electronic device 101 in FIG. 1, the electronic device 200 in FIG. 2A, or the electronic device 300 in FIG. 3A) according to various embodiments may select the object region corresponding to the editing tool user interface having been moved according to the user input, under control of the processor (e.g., the processor 120 in FIG. 1), in operation 1207.

The electronic device (e.g., the electronic device 101 in FIG. 1, the electronic device 200 in FIG. 2A, or the electronic device 300 in FIG. 3A) according to various embodiments may select an object region corresponding to the current editing tool user interface, under control of the processor (e.g., the processor 120 in FIG. 1), in operation 1209.

Figure 13:
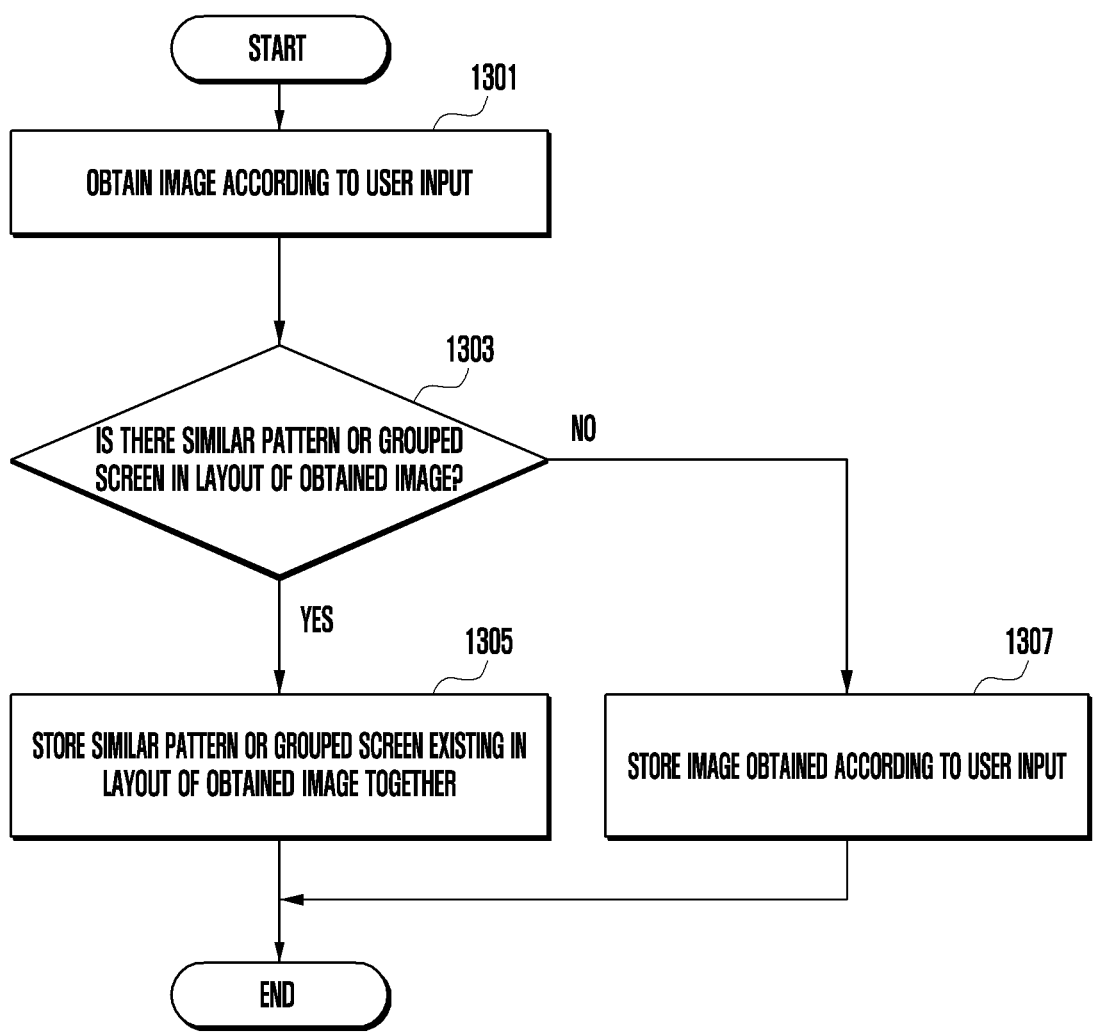
FIG. 13 is a flowchart illustrating an editing operation of an electronic device according to a user input according to an embodiment of the disclosure.

FIG. 13 is a flowchart illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 13, an electronic device (e.g., the electronic device 101 in FIG. 1, the electronic device 200 in FIG. 2A, or the electronic device 300 in FIG. 3A) according to various embodiments may obtain an image according to a user input, under control of a processor (e.g., the processor 120 in FIG. 1), in operation 1301.

According to various embodiments of the disclosure, the operation of obtaining the image according to the user input may be an operation of obtaining the image by moving a substantially rectangular and/or square end line, or a square or L-shaped bracket image of a "Crop image" user interface into a threshold region of an object, and selecting an object region corresponding to the editing tool user interface having been moved according to the user input.

The electronic device (e.g., the electronic device 101 in FIG. 1, the electronic device 200 in FIG. 2A, or the electronic device 300 in FIG. 3A) according to various embodiments may determine whether there is a similar pattern or a grouped screen in a layout of the obtained image, under control of the processor (e.g., the processor 120 in FIG. 1), in operation 1303.

If there is a similar pattern or a grouped screen in the layout of the obtained image, the electronic device (e.g., the electronic device 101 in FIG. 1, the electronic device 200 in FIG. 2A, or the electronic device 300 in FIG. 3A) according to various embodiments may enter into operation 1305, under control of the processor (e.g., the processor 120 in FIG. 1), in operation 1303.

If there is no similar pattern or grouped screen in the layout of the obtained image, the electronic device (e.g., the electronic device 101 in FIG. 1, the electronic device 200 in FIG. 2A, or the electronic device 300 in FIG. 3A) according to various embodiments may enter into operation 1307, under control of the processor (e.g., the processor 120 in FIG. 1), in operation 1303.

The electronic device (e.g., the electronic device 101 in FIG. 1, the electronic device 200 in FIG. 2A, or the electronic device 300 in FIG. 3A) according to various embodiments may store the obtained image together with the similar pattern or grouped screen existing in the layout of the obtained image, under control of the processor (e.g., the processor 120 in FIG. 1), in operation 1305.

The electronic device (e.g., the electronic device 101 in FIG. 1, the electronic device 200 in FIG. 2A, or the electronic device 300 in FIG. 3A) according to various embodiments may store the image obtained according to the user input under control of the processor (e.g., the processor 120 in FIG. 1), in operation 1307.

Figure 14:
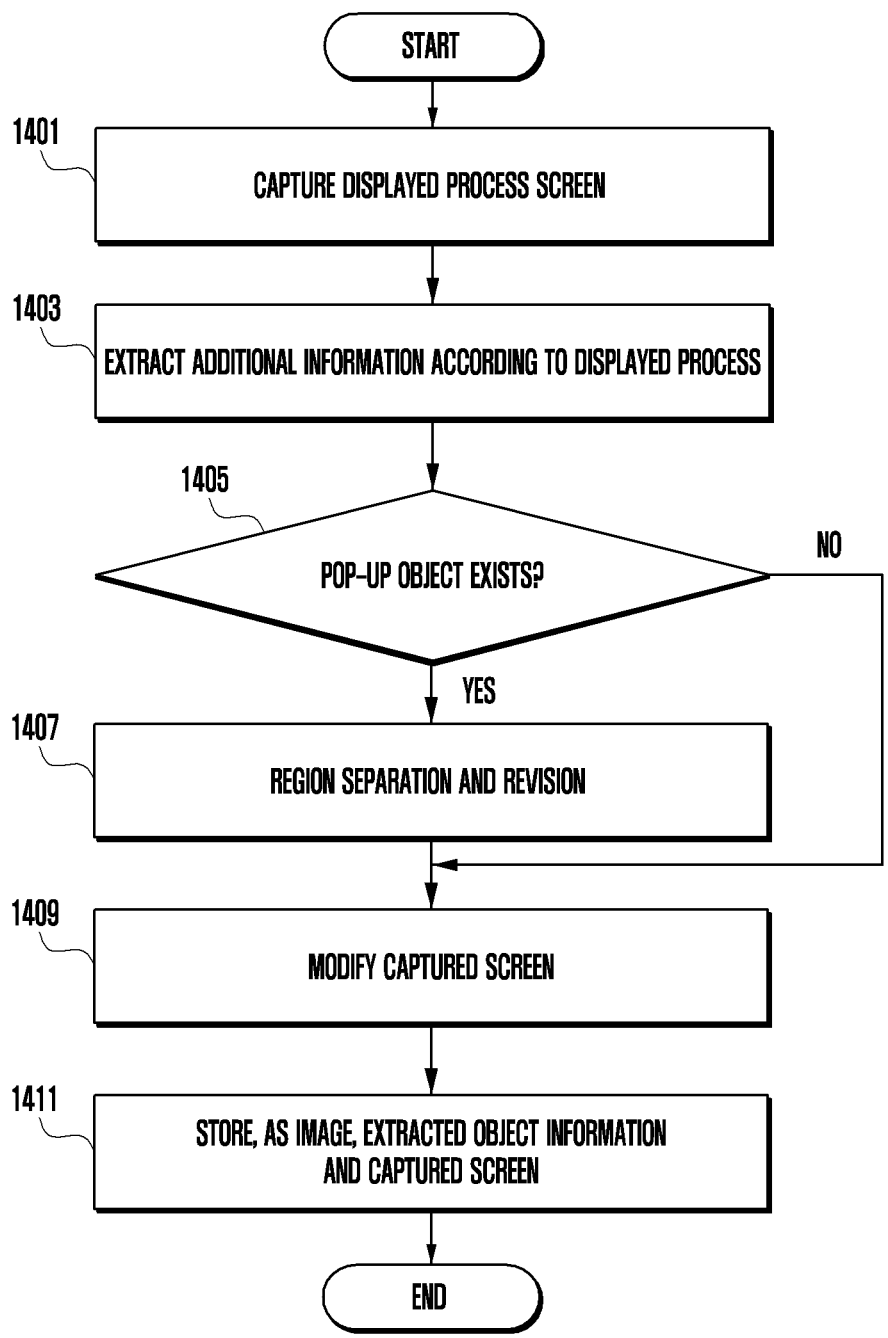
FIG. 14 is a flowchart illustrating a method for operating capturing by an electronic device according to an embodiment of the disclosure.

FIG. 14 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 14, an electronic device (e.g., the electronic device 101 in FIG. 1, the electronic device 200 in FIG. 2A, or the electronic device 300 in FIG. 3A) according to various embodiments may capture a process screen displayed on a display (e.g., the display device 160 in FIG. 1, the display 230 in FIG. 2A, or the display 301 in FIG. 3A) under control of a processor (e.g., the processor 120 in FIG. 1), in operation 1401.

According to various embodiments of the disclosure, the displayed process screen may be a screen in which image or video information is displayed in a window and/or layout activated on the display (e.g., the display device 160 in FIG. 1, the display 230 in FIG. 2A, or the display 301 in FIG. 3A).

According to various embodiments of the disclosure, the displayed process screen may include a user interface of a running application. The application may correspond to an application being executed in a single window frame buffer screen or multiple window frame buffers. According to various embodiments of the disclosure, the capturing operation may include an operation of obtaining and/or generating a still picture image of a screen displayed on the display (e.g., the display device 160 in FIG. 1, the display 230 in FIG. 2A, or the display 301 in FIG. 3A).

According to various embodiments of the disclosure, the electronic device (e.g., the electronic device 101 in FIG. 1, the electronic device 200 in FIG. 2A, or the electronic device 300 in FIG. 3A) may obtain an image including a still picture of an image displayed on the display (e.g., the display device 160 in FIG. 1, the display 230 in FIG. 2A, or the display 301 in FIG. 3A), based on obtained rendering information under control of the processor (e.g., the processor 120 in FIG. 1), in operation 1401.

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 1403.

The operation of extracting the additional information according to the displayed process according to various embodiments may be an operation of providing a screen and/or function allowing the captured screen to be edited, under control of the processor (e.g., the processor 120 in FIG. 1).

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from a frame buffer or the application under control of the processor (e.g., the processor 120 in FIG. 1), in operation 1403.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from rendering information obtained from the application or the display (e.g., the display device 160 in FIG. 1, the display 230 in FIG. 2A, or the display 301 in FIG. 3A) under control of a processor (e.g., the processor 120 in FIG. 1), in operation 1403.

In the electronic device (e.g., the electronic device 101 in FIG. 1, the electronic device 200 in FIG. 2A, or the electronic device 300 in FIG. 3A) according to various embodiments of the disclosure, the operation of extracting a region and/or a block region of the still picture of the displayed process, under control of the processor (e.g., the processor 120 in FIG. 1), in operation 1403, may be an operation of extracting an image region and/or a text region in the still picture in units of blocks.

In the electronic device (e.g., the electronic device 101 in FIG. 1, the electronic device 200 in FIG. 2A, or the electronic device 300 in FIG. 3A) according to various embodiments of the disclosure, the operation of segmenting the still picture of the displayed process into a region and/or a block region under control of the processor (e.g., the processor 120 in FIG. 1), in operation 1403, may be an operation of segmenting an image region and/or a text region in the still picture in units of blocks.

The electronic device (e.g., the electronic device 101 in FIG. 1, the electronic device 200 in FIG. 2A, or the electronic device 300 in FIG. 3A) according to various embodiments may determine whether a pop-up object exists in the captured screen, under control of the processor (e.g., the processor 120 in FIG. 1), in operation 1405.

If it is determined that there is a pop-up object in the captured screen, the electronic device (e.g., the electronic device 101 in FIG. 1, the electronic device 200 in FIG. 2A, or the electronic device 300 in FIG. 3A) according to various embodiments may enter into operation 1407 under control of the processor (e.g., the processor 120 in FIG. 1), in operation 1405.

If it is determined that there is no pop-up object in the captured screen, the electronic device (e.g., the electronic device 101 in FIG. 1, the electronic device 200 in FIG. 2A, or the electronic device 300 in FIG. 3A) according to various embodiments may enter into operation 1409 under control of the processor (e.g., the processor 120 in FIG. 1), in operation 1405.

According to various embodiments of the disclosure, the pop-up object may be a pop-up window, and/or an Internet advertisement view.

The electronic device (e.g., the electronic device 101 in FIG. 1, the electronic device 200 in FIG. 2A, or the electronic device 300 in FIG. 3A) according to various embodiments may separate a region of the pop-up object from the captured screen and revise the captured screen under control of the processor (e.g., the processor 120 in FIG. 1), in operation 1407. The operation of revising the captured screen may be performed by compensating for a data loss of an image region corresponding to a region from which the pop-up object region is removed, by using rendering information or additional information.

The electronic device (e.g., the electronic device 101 in FIG. 1, the electronic device 200 in FIG. 2A, or the electronic device 300 in FIG. 3A) according to various embodiments may separate and remove the pop-up object region from the captured screen and may revise a captured screen positioned below the pop-up object region, under control of the processor (e.g., the processor 120 in FIG. 1), in operation 1407. The operation of revising the captured screen positioned below the pop-up object region may be performed by compensating for a data loss of an image region corresponding to a region from which the pop-up object region is removed, by using rendering information or additional information.

In the electronic device (e.g., the electronic device 101 in FIG. 1, the electronic device 200 in FIG. 2A, or the electronic device 300 in FIG. 3A) according to various embodiments of the disclosure, the operation of separating the region of the pop-up object from the captured screen and revising the captured screen under control of the processor (e.g., the processor 120 in FIG. 1), in operation 1407, may be performed by removing the pop-up object and revising an image to be a region of interest (ROI).

The electronic device (e.g., the electronic device 101 in FIG. 1, the electronic device 200 in FIG. 2A, or the electronic device 300 in FIG. 3A) according to various embodiments may modify the captured screen under control of the processor (e.g., the processor 120 in FIG. 1), in operation 1409.

The electronic device (e.g., the electronic device 101 in FIG. 1, the electronic device 200 in FIG. 2A, or the electronic device 300 in FIG. 3A) according to various embodiments may modify an object screen captured in the frame buffer and/or the application under control of the processor (e.g., the processor 120 in FIG. 1), in operation 1409.

The operation of modifying the captured screen according to various embodiments may be an operation of modifying the captured screen by a user input and/or a predetermined image editing process.

For example, in the operation of modifying the captured screen, a "Crop image" operation may be performed by a user input. In the operation of modifying the captured screen, a "Crop image" operation may be performed by the predetermined image editing process.

The electronic device (e.g., the electronic device 101 in FIG. 1, the electronic device 200 in FIG. 2A, or the electronic device 300 in FIG. 3A) according to various embodiments may store, as a capture image, extracted object information and the captured screen under control of the processor (e.g., the processor 120 in FIG. 1), in operation 1411. According to various embodiments of the disclosure, the operation of storing the captured screen as a capture image may also include an operation of storing a screen in which an image is not modified by a user.

Figure 15:
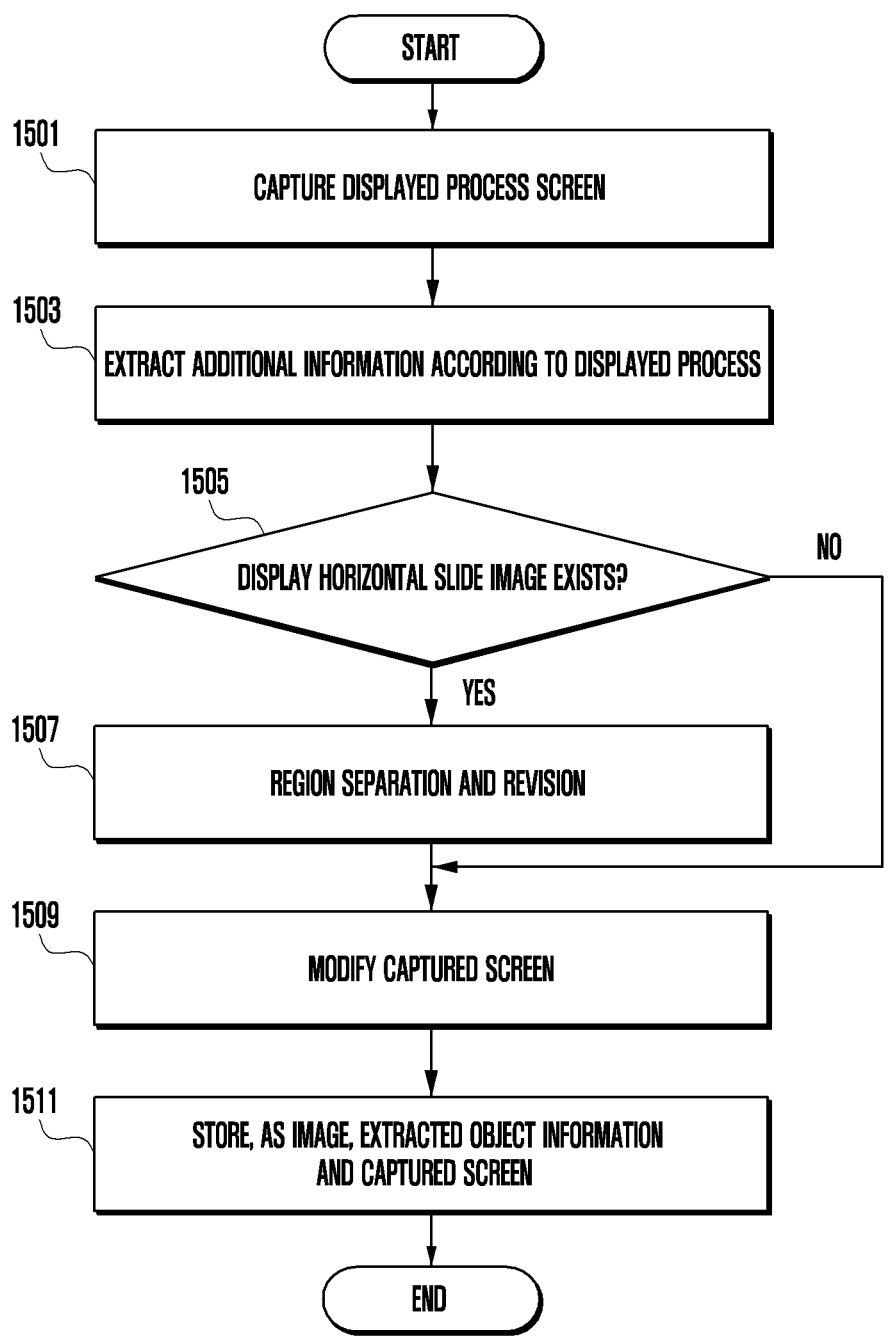
FIG. 15 is a flowchart illustrating a method for operating capturing by an electronic device according to an embodiment of the disclosure.

FIG. 15 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 15, an electronic device (e.g., the electronic device 101 in FIG. 1, the electronic device 200 in FIG. 2A, or the electronic device 300 in FIG. 3A) according to various embodiments may capture a process screen displayed on a display (e.g., the display device 160 in FIG. 1, the display 230 in FIG. 2A, or the display 301 in FIG. 3A) under control of a processor (e.g., the processor 120 in FIG. 1), in operation 1501.

According to various embodiments of the disclosure, the displayed process screen may be a screen in which image or video information is displayed in a window and/or layout activated on the display (e.g., the display device 160 in FIG. 1, the display 230 in FIG. 2A, or the display 301 in FIG. 3A).

According to various embodiments of the disclosure, the displayed process screen may include a user interface of a running application. The application may correspond to an application being executed in a single window frame buffer screen or multiple window frame buffers. According to various embodiments of the disclosure, the capturing operation may include an operation of obtaining and/or generating a still picture image of a screen displayed on the display (e.g., the display device 160 in FIG. 1, the display 230 in FIG. 2A, or the display 301 in FIG. 3A).

According to various embodiments of the disclosure, the electronic device (e.g., the electronic device 101 in FIG. 1, the electronic device 200 in FIG. 2A, or the electronic device 300 in FIG. 3A) may obtain an image including a still picture of an image displayed on the display (e.g., the display device 160 in FIG. 1, the display 230 in FIG. 2A, or the display 301 in FIG. 3A), based on obtained rendering information under control of the processor (e.g., the processor 120 in FIG. 1), in operation 1501.

According to various embodiments of the disclosure, a command to capture a screen of the electronic device (e.g., the electronic device 101 in FIG. 1, the electronic device 200 in FIG. 2A, or the electronic device 300 in FIG. 3A) may include a command to select an object region to capture a screen and/or a command to capture the entire screen.

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 1503.

The operation of extracting the additional information according to the displayed process according to various embodiments may be an operation of providing a screen and/or function allowing the captured screen to be edited, under control of the processor (e.g., the processor 120 in FIG. 1).

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from a frame buffer or the application under control of the processor (e.g., the processor 120 in FIG. 1), in operation 1503.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from rendering information obtained from the application or the display (e.g., the display device 160 in FIG. 1, the display 230 in FIG. 2A, or the display 301 in FIG. 3A) under control of the processor (e.g., the processor 120 in FIG. 1), in operation 1503.

In the electronic device (e.g., the electronic device 101 in FIG. 1, the electronic device 200 in FIG. 2A, or the electronic device 300 in FIG. 3A) according to various embodiments of the disclosure, the operation of extracting a region and/or a block region of the still picture of the displayed process, under control of the processor (e.g., the processor 120 in FIG. 1), in operation 1503, may be an operation of extracting an image region and/or a text region in the still picture in units of blocks.

In the electronic device (e.g., the electronic device 101 in FIG. 1, the electronic device 200 in FIG. 2A, or the electronic device 300 in FIG. 3A) according to various embodiments of the disclosure, the operation of segmenting the still picture of the displayed process into a region and/or a block region under control of the processor (e.g., the processor 120 in FIG. 1), in operation 1503, may be an operation of segmenting an image region and/or a text region in the still picture in units of blocks.

The electronic device (e.g., the electronic device 101 in FIG. 1, the electronic device 200 in FIG. 2A, or the electronic device 300 in FIG. 3A) according to various embodiments may determine whether there is a displayed horizontal slide image, under control of the processor (e.g., the processor 120 in FIG. 1), in operation 1505.

If it is determined that there is a displayed horizontal slide image, the electronic device (e.g., the electronic device 101 in FIG. 1, the electronic device 200 in FIG. 2A, or the electronic device 300 in FIG. 3A) according to various embodiments may enter into operation 1507 under control of the processor (e.g., the processor 120 in FIG. 1), in operation 1505.

If it is determined that there is no displayed horizontal slide image, the electronic device (e.g., the electronic device 101 in FIG. 1, the electronic device 200 in FIG. 2A, or the electronic device 300 in FIG. 3A) according to various embodiments may enter into operation 1509 under control of the processor (e.g., the processor 120 in FIG. 1), in operation 1505.

According to various embodiments of the disclosure, the horizontal slide image may be an image configured in the horizontal scroll direction in the currently displayed screen, rather than the vertical scroll direction.

The electronic device (e.g., the electronic device 101 in FIG. 1, the electronic device 200 in FIG. 2A, or the electronic device 300 in FIG. 3A) according to various embodiments may separate the horizontal slide image and revise the captured screen under control of the processor (e.g., the processor 120 in FIG. 1), in operation 1507.

The electronic device (e.g., the electronic device 101 in FIG. 1, the electronic device 200 in FIG. 2A, or the electronic device 300 in FIG. 3A) according to various embodiments may merge images included in the horizontal slides in the captured image to revise the captured screen under control of the processor (e.g., the processor 120 in FIG. 1), in operation 1507.

The electronic device (e.g., the electronic device 101 in FIG. 1, the electronic device 200 in FIG. 2A, or the electronic device 300 in FIG. 3A) according to various embodiments may modify the captured screen under control of the processor (e.g., the processor 120 in FIG. 1), in operation 1509.

The electronic device (e.g., the electronic device 101 in FIG. 1, the electronic device 200 in FIG. 2A, or the electronic device 300 in FIG. 3A) according to various embodiments may modify an object screen captured in the frame buffer and/or the application under control of the processor (e.g., the processor 120 in FIG. 1), in operation 1509.

The operation of modifying the captured screen according to various embodiments may be an operation of modifying the captured screen by a user input and/or a predetermined image editing process.

For example, in the operation of modifying the captured screen, a "Crop image" operation may be performed by a user input. In the operation of modifying the captured screen, a "Crop image" operation may be performed by the predetermined image editing process.

The electronic device (e.g., the electronic device 101 in FIG. 1, the electronic device 200 in FIG. 2A, or the electronic device 300 in FIG. 3A) according to various embodiments may store, as a capture image, extracted object information and the captured screen under control of the processor (e.g., the processor 120 in FIG. 1), in operation 1511. According to various embodiments of the disclosure, the operation of storing the captured screen as a capture image may also include an operation of storing a screen in which an image is not modified by a user.

Figure 16:
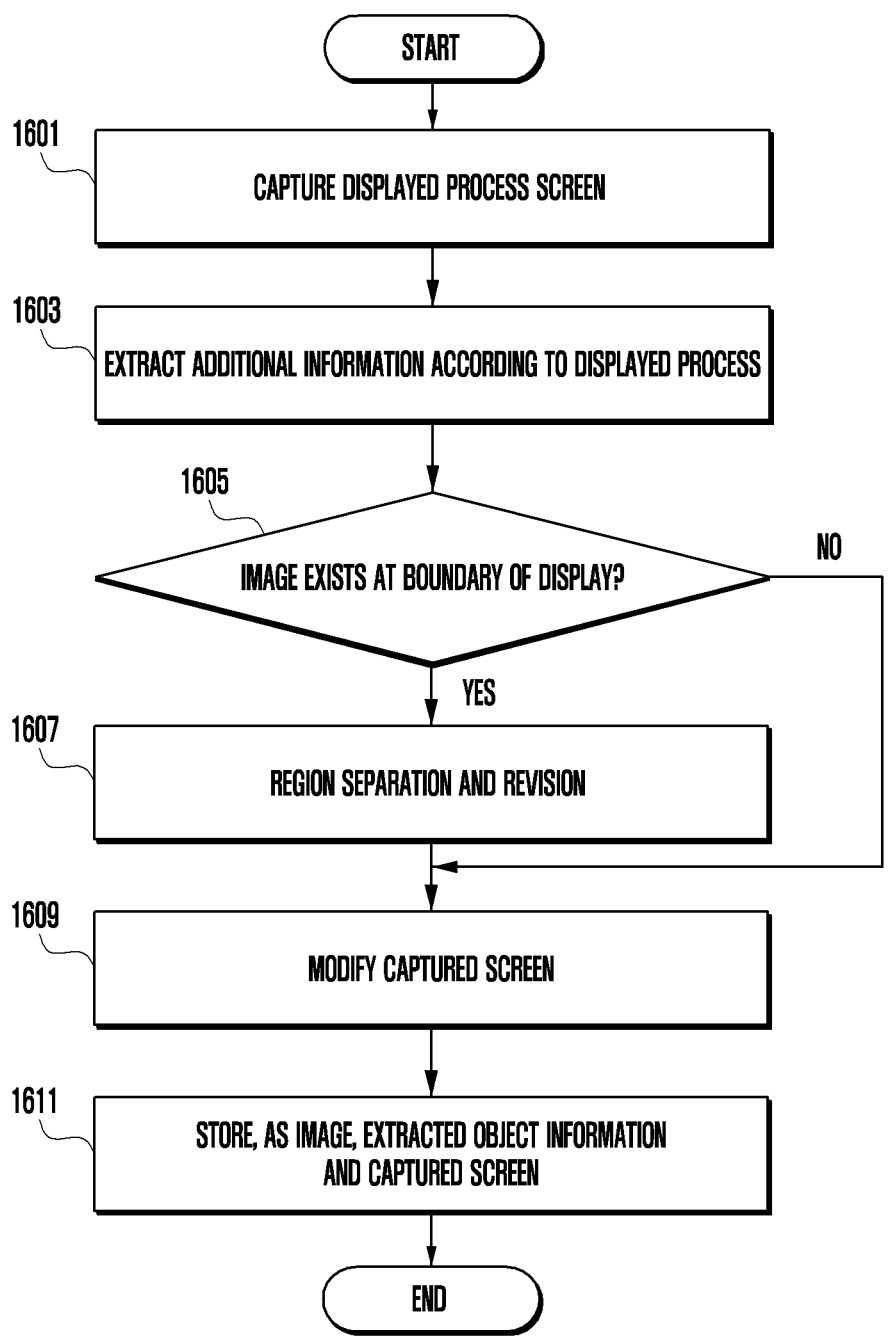
FIG. 16 is a flowchart illustrating a method for operating capturing by an electronic device according to an embodiment of the disclosure.

FIG. 16 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 16, an electronic device (e.g., the electronic device 101 in FIG. 1, the electronic device 200 in FIG. 2A, or the electronic device 300 in FIG. 3A) according to various embodiments may capture a process screen displayed on a display (e.g., the display device 160 in FIG. 1, the display 230 in FIG. 2A, or the display 301 in FIG. 3A) under control of a processor (e.g., the processor 120 in FIG. 1), in operation 1601.

According to various embodiments of the disclosure, the displayed process screen may be a screen in which image or video information is displayed in a window and/or layout activated on the display (e.g., the display device 160 in FIG. 1, the display 230 in FIG. 2A, or the display 301 in FIG. 3A).

According to various embodiments of the disclosure, the displayed process screen may include a user interface of a running application. The application may correspond to an application being executed in a single window frame buffer screen or multiple window frame buffers. According to various embodiments of the disclosure, the capturing operation may include an operation of obtaining and/or generating a still picture image of a screen displayed on the display (e.g., the display device 160 in FIG. 1, the display 230 in FIG. 2A, or the display 301 in FIG. 3A).

According to various embodiments of the disclosure, the electronic device (e.g., the electronic device 101 in FIG. 1, the electronic device 200 in FIG. 2A, or the electronic device 300 in FIG. 3A) may obtain an image including a still picture of an image displayed on the display (e.g., the display device 160 in FIG. 1, the display 230 in FIG. 2A, or the display 301 in FIG. 3A), based on obtained rendering information under control of the processor (e.g., the processor 120 in FIG. 1), in operation 1601.

The electronic device (e.g., the electronic device 101 in FIG. 1, the electronic device 200 in FIG. 2A, or the electronic device 300 in FIG. 3A) according to various embodiments may extract additional information according to a displayed process under control of the processor (e.g., the processor 120 in FIG. 1), in operation 1603.

The operation of extracting the additional information according to the displayed process according to various embodiments may be an operation of providing a screen and/or function allowing the captured screen to be edited, under control of the processor (e.g., the processor 120 in FIG. 1).

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from a frame buffer or the application under control of the processor (e.g., the processor 120 in FIG. 1), in operation 1603.

The operation of extracting the additional information according to the displayed process according to various embodiments may be an operation in which the electronic device (e.g., the electronic device 101 in FIG. 1, the electronic device 200 in FIG. 2A, or the electronic device 300 in FIG. 3A) extracts the additional information from rendering information obtained from the application or the display (e.g., the display device 160 in FIG. 1, the display 230 in FIG. 2A, or the display 301 in FIG. 3A) under control of the processor (e.g., the processor 120 in FIG. 1), in operation 1603.

In the electronic device (e.g., the electronic device 101 in FIG. 1, the electronic device 200 in FIG. 2A, or the electronic device 300 in FIG. 3A) according to various embodiments of the disclosure, the operation of extracting a region and/or a block region of the still picture of the displayed process, under control of the processor (e.g., the processor 120 in FIG. 1), in operation 1603, may be an operation of extracting an image region and/or a text region in the still picture in units of blocks.

In the electronic device (e.g., the electronic device 101 in FIG. 1, the electronic device 200 in FIG. 2A, or the electronic device 300 in FIG. 3A) according to various embodiments of the disclosure, the operation of segmenting the still picture of the displayed process into a region and/or a block region under control of the processor (e.g., the processor 120 in FIG. 1), in operation 1603, may be an operation of segmenting an image region and/or a text region in the still picture in units of blocks.

The electronic device (e.g., the electronic device 101 in FIG. 1, the electronic device 200 in FIG. 2A, or the electronic device 300 in FIG. 3A) according to various embodiments may determine whether there is an image at a boundary of the display, under control of the processor (e.g., the processor 120 in FIG. 1), in operation 1605.

If it is determined that there is an image at the boundary of the display, the electronic device (e.g., the electronic device 101 in FIG. 1, the electronic device 200 in FIG. 2A, or the electronic device 300 in FIG. 3A) according to various embodiments may enter into operation 1607 under control of the processor (e.g., the processor 120 in FIG. 1), in operation 1605.

If it is determined that there is no image at the boundary of the display, the electronic device (e.g., the electronic device 101 in FIG. 1, the electronic device 200 in FIG. 2A, or the electronic device 300 in FIG. 3A) according to various embodiments may enter into operation 1609 under control of the processor (e.g., the processor 120 in FIG. 1), in operation 1605.

The electronic device (e.g., the electronic device 101 in FIG. 1, the electronic device 200 in FIG. 2A, or the electronic device 300 in FIG. 3A) according to various embodiments may determine whether an image which failed to be captured exists at a boundary of a captured image, under control of the processor (e.g., the processor 120 in FIG. 1), in operation 1605.

If it is determined that an image which failed to be captured exists at the boundary of the captured image, the electronic device (e.g., the electronic device 101 in FIG. 1, the electronic device 200 in FIG. 2A, or the electronic device 300 in FIG. 3A) according to various embodiments may enter into operation 1607 under control of the processor (e.g., the processor 120 in FIG. 1), in operation 1605.

If it is determined that an image which failed to be captured does not exist at the boundary of the captured image, the electronic device (e.g., the electronic device 101 in FIG. 1, the electronic device 200 in FIG. 2A, or the electronic device 300 in FIG. 3A) according to various embodiments may enter into operation 1609 under control of the processor (e.g., the processor 120 in FIG. 1), in operation 1605.

If it is determined that an image which failed to be captured exists at the boundary of the captured image, the electronic device (e.g., the electronic device 101 in FIG. 1, the electronic device 200 in FIG. 2A, or the electronic device 300 in FIG. 3A) according to various embodiments may separate the image and revise the captured screen to be a continuous image under control of the processor (e.g., the processor 120 in FIG. 1), in operation 1607.

If it is determined that an image which failed to be captured exists at the boundary of the captured image, the electronic device (e.g., the electronic device 101 in FIG. 1, the electronic device 200 in FIG. 2A, or the electronic device 300 in FIG. 3A) according to various embodiments may separate the image and merge the captured image and the image which failed to be captured into a continuous image so as to revise the captured screen under control of the processor (e.g., the processor 120 in FIG. 1), in operation 1607. The operation of revising the captured screen may be performed by compensating for a data loss of an image corresponding to a region which failed to be captured by using rendering information or additional information, to make a continuous image.

The electronic device (e.g., the electronic device 101 in FIG. 1, the electronic device 200 in FIG. 2A, or the electronic device 300 in FIG. 3A) according to various embodiments may modify the captured screen under control of the processor (e.g., the processor 120 in FIG. 1), in operation 1609.

The electronic device (e.g., the electronic device 101 in FIG. 1, the electronic device 200 in FIG. 2A, or the electronic device 300 in FIG. 3A) according to various embodiments may modify an object screen captured in the frame buffer and/or the application under control of the processor (e.g., the processor 120 in FIG. 1), in operation 1609.

The operation of modifying the captured screen according to various embodiments may be an operation of modifying the captured screen by a user input and/or a predetermined image editing process.

For example, in the operation of modifying the captured screen, a "Crop image" operation may be performed by a user input. In the operation of modifying the captured screen, a "Crop image" operation may be performed by the predetermined image editing process.

The electronic device (e.g., the electronic device 101 in FIG. 1, the electronic device 200 in FIG. 2A, or the electronic device 300 in FIG. 3A) according to various embodiments may store, as a capture image, extracted object information and the captured screen under control of the processor (e.g., the processor 120 in FIG. 1), in operation 1611. According to various embodiments of the disclosure, the operation of storing the captured screen as a capture image may also include an operation of storing a screen in which an image is not modified by a user.

Figure 17A:
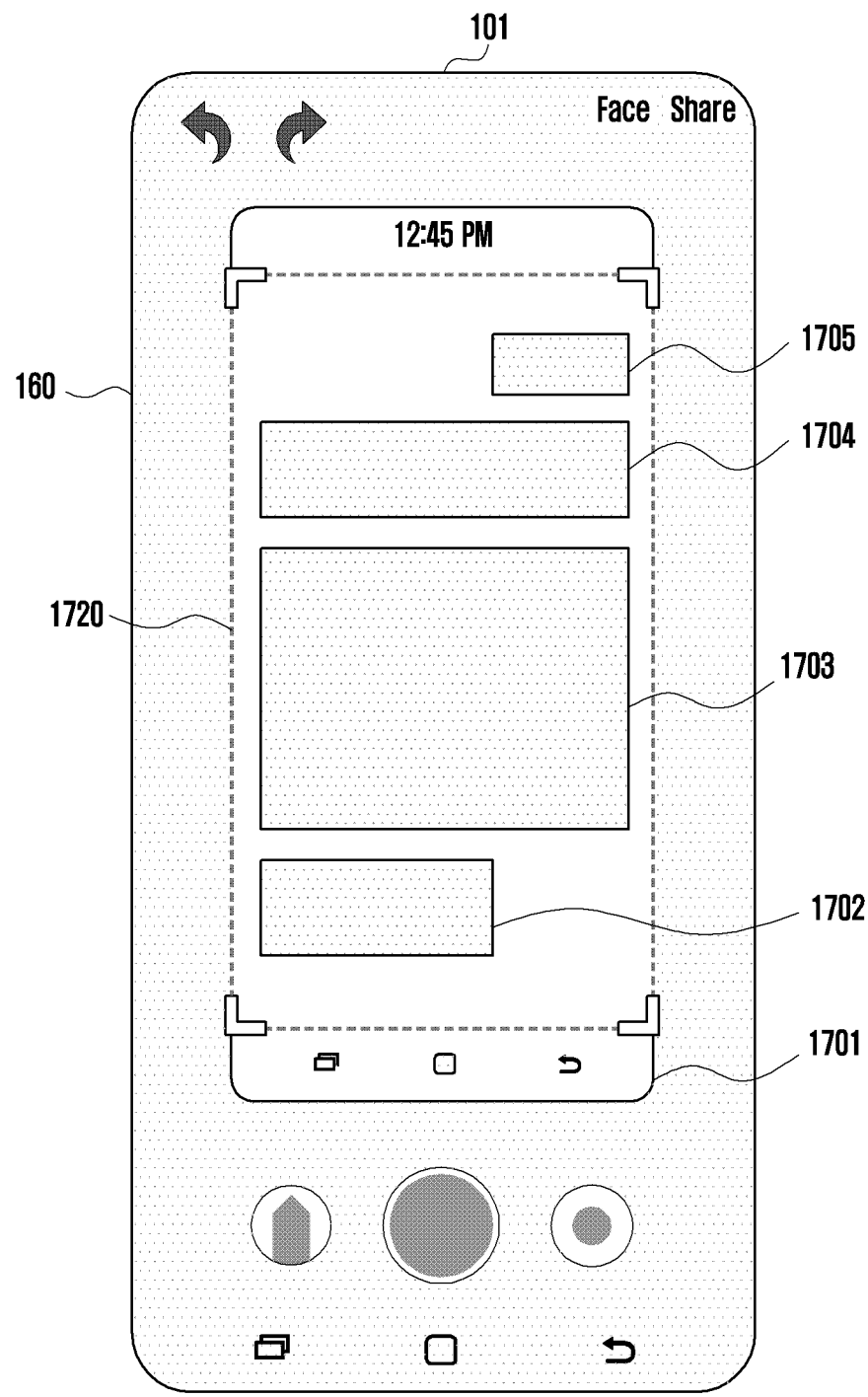
FIG. 17A is a diagram illustrating an operation of extracting additional information according to a displayed process by an electronic device according to an embodiment of the disclosure.

FIG. 17A is a diagram illustrating an operation of extracting additional information according to a displayed process by an electronic device (e.g., the electronic device 101 in FIG. 1, the electronic device 200 in FIG. 2A, or the electronic device 300 in FIG. 3A) according to an embodiment of the disclosure.

Figure 17B:
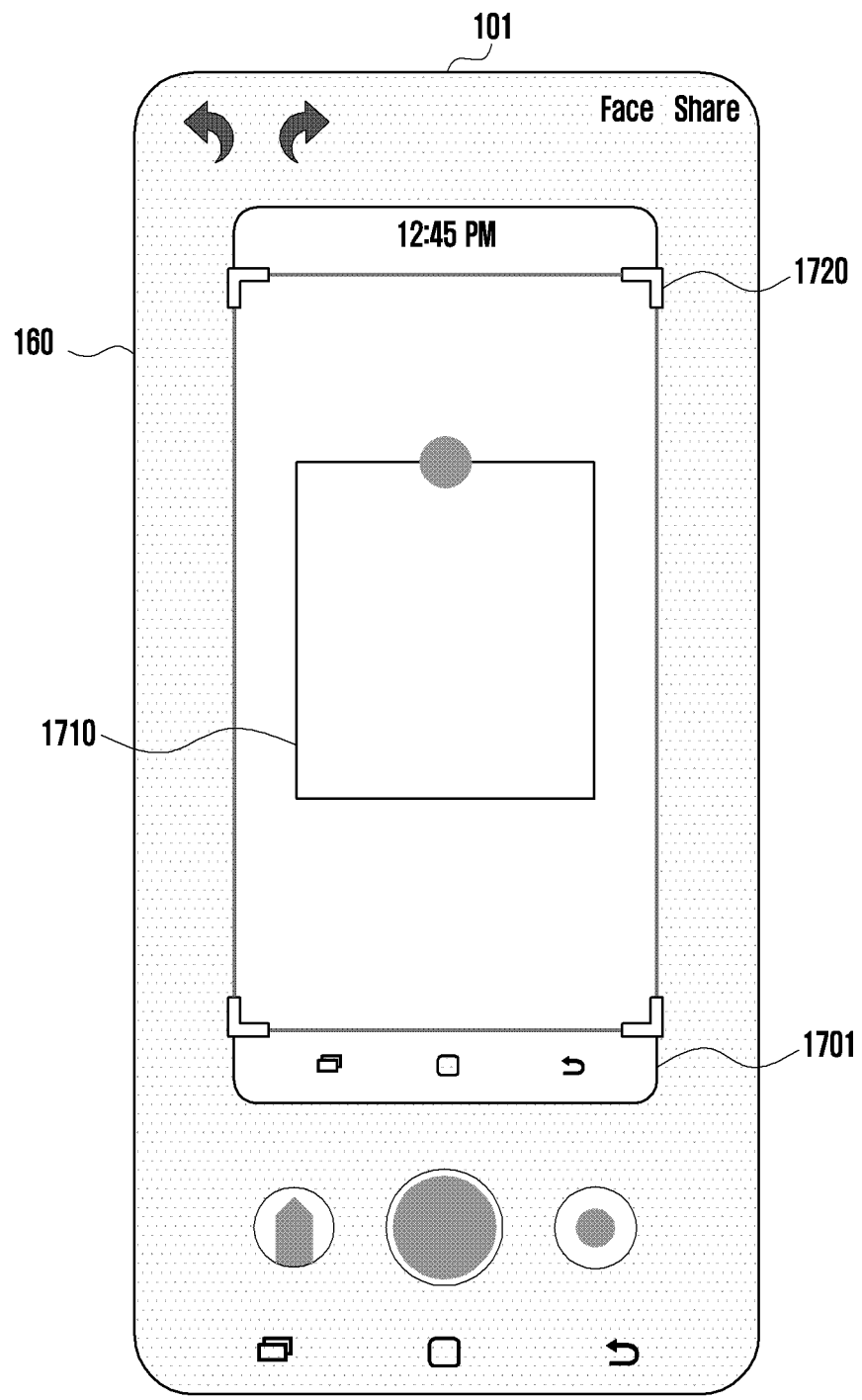
FIG. 17B is a diagram illustrating an operation of suggesting a region of interest (ROI) by an electronic device according to an embodiment of the disclosure.

FIG. 17B is a diagram illustrating an operation of suggesting a region of interest (ROI) by an electronic device (e.g., the electronic device 101 in FIG. 1, the electronic device 200 in FIG. 2A, or the electronic device 300 in FIG. 3A) according to an embodiment of the disclosure.

Referring to FIGS. 9, 10, 17A, and 17B, the electronic device (e.g., the electronic device 101 in FIG. 1, the electronic device 200 in FIG. 2A, or the electronic device 300 in FIG. 3A) according to various embodiments may extract additional information according to a displayed process under control of a processor (e.g., the processor 120 in FIG. 1).

The operation of extracting the additional information according to the displayed process according to various embodiments may be an operation of extracting a region and/or a block region 1702, 1703, 1704, or 1705 of a still picture 1701 of a displayed process, under control of a processor (e.g., the processor 120 in FIG. 1).

Referring to FIG. 17A, the electronic device 101 may extract at least one block region 1702, 1703, 1704, or 1705 from the still picture 1701 of a process displayed on a display (e.g., the display device 160 in FIG. 1). The electronic device 101 may place an editing tool user interface (e.g., a "Crop image" user interface 1720) which is movable according to a user input, on the still picture 1701 of a process displayed on the display (e.g., the display device 160 in FIG. 1).

Referring to FIG. 17B, the electronic device 101 may suggest a region of interest (ROI) 1710 in the still picture 1701 of a process displayed on the display (e.g., the display device 160 in FIG. 1).

According to various embodiments of the disclosure, under control of the processor (e.g., the processor 120 in FIG. 1), the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen 1701 as additional information, and if a particular region is included in the captured screen 1701, the electronic device may determine the particular region as a region of interest (ROI) 1710. For example, the particular region may be an image region.

According to various embodiments of the disclosure, under control of the processor (e.g., the processor 120 in FIG. 1), the electronic device (e.g., the electronic device 101 in FIG. 1, the electronic device 200 in FIG. 2A, or the electronic device 300 in FIG. 3A) may separate an image region and/or a text region by using region information, block region information, or the like, extracted from the captured screen 1701 as additional information, and if the ratio of a particular region in the capture screen is equal to or larger than a pre-configured ratio, the electronic device may determine the particular region as the region of interest (ROI) 1710. For example, the pre-configured ratio may be 12%.

Under control of the processor (e.g., the processor 120 in FIG. 1), the electronic device (e.g., the electronic device 101 in FIG. 1, the electronic device 200 in FIG. 2A, or the electronic device 300 in FIG. 3A) according to various embodiments may separate an image region and/or a text region by using region information, block region information, or the like, extracted from the captured screen 1701 as additional information, and if the ratio of a plurality of particular regions in the capture screen 1701 is equal to or larger than the pre-configured ratio, the electronic device may determine the largest region as the region of interest (ROI) 1710.

According to various embodiments of the disclosure, the operation of suggesting the region of interest (ROI) 1710 may be an operation of displaying an image (e.g., a GUI element related to highlight, inversion, a box, and/or an icon) indicating the region of interest (ROI), during a pre-configured time interval. If the pre-configured time interval has passed, the image (e.g., a GUI element related to highlight, inversion, a box, and/or an icon) indicating the region of interest (ROI) 1710 may disappear.

The electronic device (e.g., the electronic device 101 in FIG. 1, the electronic device 200 in FIG. 2A, or the electronic device 300 in FIG. 3A) according to various embodiments may maintain a view layout of the captured screen while displaying an image 1710 (e.g., a GUI element related to highlight, inversion, a box, and/or an icon) indicating a region of interest (ROI), during a pre-configured time interval, under control of the processor (e.g., the processor 120 in FIG. 1).

Figure 18:
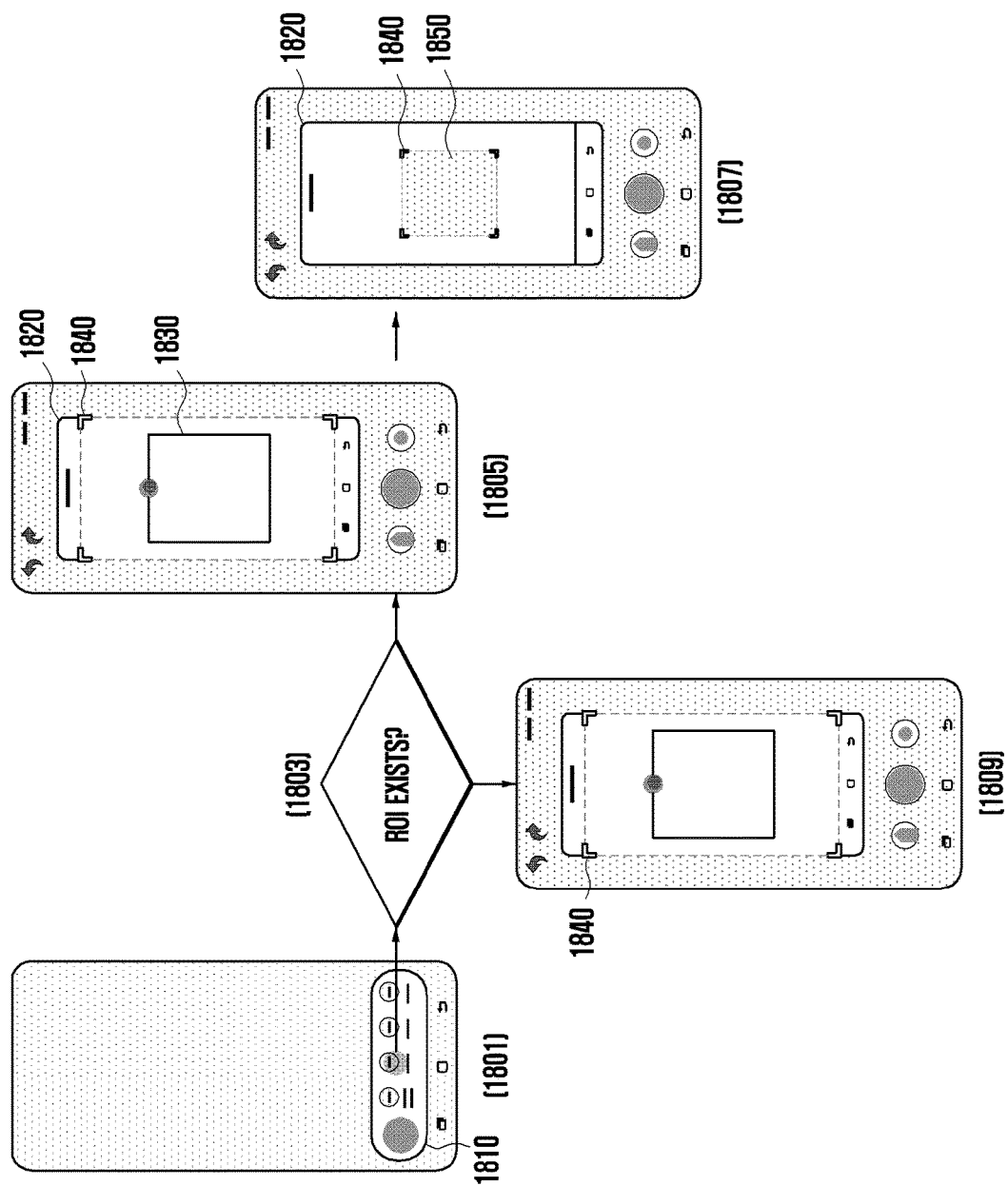
FIG. 18 is a diagram illustrating an operation of modifying a captured screen by an electronic device according to an embodiment of the disclosure.

FIG. 18 is a diagram illustrating an operation of modifying a captured screen by an electronic device (e.g., the electronic device 101 in FIG. 1, the electronic device 200 in FIG. 2A, or the electronic device 300 in FIG. 3A) according to an embodiment of the disclosure.

Referring to FIG. 18, in the stage indicated by reference numeral 1801, an electronic device (e.g., the electronic device 101 in FIG. 1, the electronic device 200 in FIG. 2A, or the electronic device 300 in FIG. 3A) may provide a screen and/or a function allowing a captured screen to be edited, under control of a processor (e.g., the processor 120 in FIG. 1). The function for editing the captured screen may include Crop image, Reduce/Enlarge image, Rotate image, image effect, image color temperature, image color correction, or the like. The electronic device (e.g., the electronic device 101 in FIG. 1, the electronic device 200 in FIG. 2A, or the electronic device 300 in FIG. 3A) may provide, as a user interface, an icon, an image, or a text corresponding to the function for editing the captured screen in a tool bar type on a display (e.g., the display device 160 in FIG. 1). The screen and/or function allowing the captured screen to be edited may correspond to a screenshot toolbar 1810.

In the stage 1803, the electronic device (e.g., the electronic device 101 in FIG. 1, the electronic device 200 in FIG. 2A, or the electronic device 300 in FIG. 3A) may determine whether a region of interest (ROI) exists in the captured screen, under control of the processor (e.g., the processor 120 in FIG. 1).

In the stage 1805, if a region of interest (ROI) exists in the captured screen 1820, the electronic device (e.g., the electronic device 101 in FIG. 1, the electronic device 200 in FIG. 2A, or the electronic device 300 in FIG. 3A) may perform an operation 1830 of suggesting the region of interest (ROI) under control of the processor (e.g., the processor 120 in FIG. 1).

According to various embodiments of the disclosure, the operation of suggesting the region of interest (ROI) may be an operation of displaying an image 1830 (e.g., a GUI element related to highlight, inversion, a box, and/or an icon) indicating the region of interest (ROI), during a pre-configured time interval. If the pre-configured time interval has passed, the image 1830 (e.g., a GUI element related to highlight, inversion, a box, and/or an icon) indicating the region of interest (ROI) may disappear.

The electronic device (e.g., the electronic device 101 in FIG. 1, the electronic device 200 in FIG. 2A, or the electronic device 300 in FIG. 3A) according to various embodiments may maintain the view layout 1820 of the captured screen while displaying the image 1830 (e.g., a GUI element related to highlight, inversion, a box, and/or an icon) indicating a region of interest (ROI), during a pre-configured time interval, under control of the processor (e.g., the processor 120 in FIG. 1).

The electronic device (e.g., the electronic device 101 in FIG. 1, the electronic device 200 in FIG. 2A, or the electronic device 300 in FIG. 3A) according to various embodiments may place an editing tool user interface 1840 (e.g., a "Crop image" user interface) which is movable according to a user input, while displaying the image 1830 (e.g., a GUI element related to highlight, inversion, a box, and/or an icon) indicating the region of interest (ROI), under control of the processor (e.g., the processor 120 in FIG. 1).

In the stage 1807, if a region of interest (ROI) 1850 is selected, the electronic device (e.g., the electronic device 101 in FIG. 1, the electronic device 200 in FIG. 2A, or the electronic device 300 in FIG. 3A) according to various embodiments may allow the editing tool user interface 1840 (e.g., a "Crop image" user interface) to snap to the selected region of interest (ROI) 1850 under control of the processor (e.g., the processor 120 in FIG. 1).

In the stage 1809, if a region of interest (ROI) does not exist, the electronic device (e.g., the electronic device 101 in FIG. 1, the electronic device 200 in FIG. 2A, or the electronic device 300 in FIG. 3A) according to various embodiments may display the editing tool user interface 1840 (e.g., a "Crop image" user interface) for the entire screen under control of the processor (e.g., the processor 120 in FIG. 1).

Figure 19:
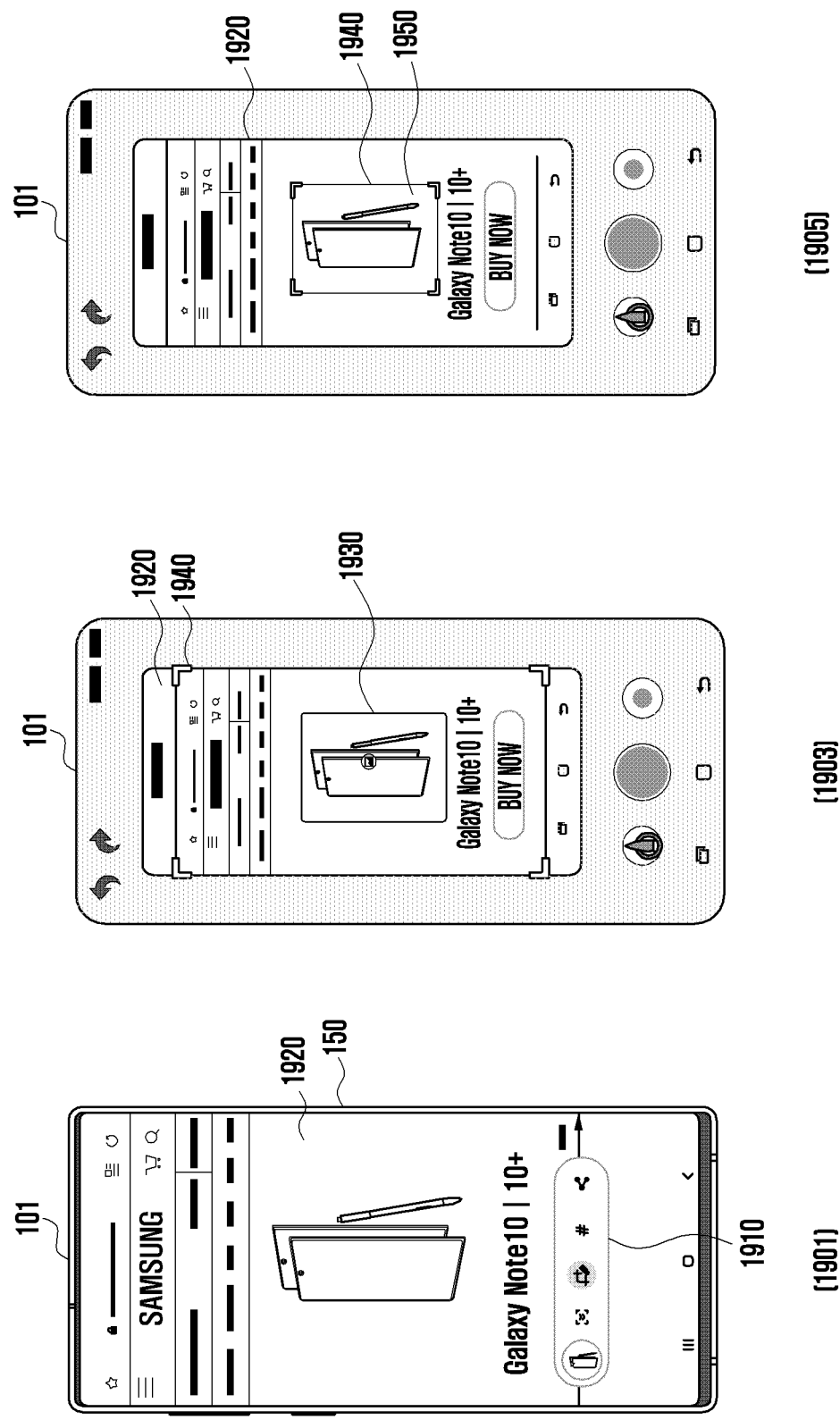
FIG. 19 is a diagram illustrating an operation of modifying a captured screen by an electronic device according to an embodiment of the disclosure.

FIG. 19 is a diagram illustrating an operation of modifying a captured screen by an electronic device (e.g., the electronic device 101 in FIG. 1, the electronic device 200 in FIG. 2A, or the electronic device 300 in FIG. 3A) according to an embodiment of the disclosure.

Referring to FIG. 19, in the stage 1901, an electronic device (e.g., the electronic device 101 in FIG. 1, the electronic device 200 in FIG. 2A, or the electronic device 300 in FIG. 3A) may provide a screen and/or a function 1910 allowing a captured screen 1920 to be edited, to a display (e.g., the display device 160 in FIG. 1), under control of a processor (e.g., the processor 120 in FIG. 1). The function 1910 for editing the captured screen may include Crop image, Reduce/Enlarge image, Rotate image, image effect, image color temperature, image color correction, or the like. The electronic device (e.g., the electronic device 101 in FIG. 1, the electronic device 200 in FIG. 2A, or the electronic device 300 in FIG. 3A) may provide an icon, an image, or a text corresponding to the function for editing the captured screen as a user interface, which is of a tool bar type, on the display (e.g., the display device 160 in FIG. 1). The screen and/or function allowing the captured screen 1920 to be edited may correspond to the screenshot toolbar 1910.

In the stage 1903, the electronic device (e.g., the electronic device 101 in FIG. 1, the electronic device 200 in FIG. 2A, or the electronic device 300 in FIG. 3A) may determine whether a region of interest (ROI) exists in the captured screen 1920, under control of the processor (e.g., the processor 120 in FIG. 1).

If there is a region of interest (ROI) in the captured screen 1920, the electronic device (e.g., the electronic device 101 in FIG. 1, the electronic device 200 in FIG. 2A, or the electronic device 300 in FIG. 3A) may perform an operation 1930 of suggesting the region of interest (ROI), under control of the processor (e.g., the processor 120 in FIG. 1).

According to various embodiments of the disclosure, the operation of suggesting the region of interest (ROI) may be an operation of displaying an image 1930 (e.g., a GUI element related to highlight, inversion, a box, and/or an icon) indicating the region of interest (ROI), during a pre-configured time interval. If the pre-configured time interval has passed, the image 1930 (e.g., a GUI element related to highlight, inversion, a box, and/or an icon) indicating the region of interest (ROI) may disappear.

The electronic device (e.g., the electronic device 101 in FIG. 1, the electronic device 200 in FIG. 2A, or the electronic device 300 in FIG. 3A) according to various embodiments may maintain the view layout 1920 of the captured screen while displaying the image 1930 (e.g., a GUI element related to highlight, inversion, a box, and/or an icon) indicating a region of interest (ROI), during a pre-configured time interval, under control of the processor (e.g., the processor 120 in FIG. 1).

The electronic device (e.g., the electronic device 101 in FIG. 1, the electronic device 200 in FIG. 2A, or the electronic device 300 in FIG. 3A) according to various embodiments may place an editing tool user interface 1940 (e.g., a "Crop image" user interface) which is movable according to a user input, while displaying the image 1930 (e.g., a GUI element related to highlight, inversion, a box, and/or an icon) indicating the region of interest (ROI), under control of the processor (e.g., the processor 120 in FIG. 1).

In the stage 1905, if the region of interest (ROI) 1950 is selected, the electronic device (e.g., the electronic device 101 in FIG. 1, the electronic device 200 in FIG. 2A, or the electronic device 300 in FIG. 3A) according to various embodiments may allow the editing tool user interface 1940 (e.g., a "Crop image" user interface) to snap to the selected region of interest (ROI) 1950 while maintaining the view layout 1920 of the captured screen, under control of the processor (e.g., the processor 120 in FIG. 1).

Figure 20:
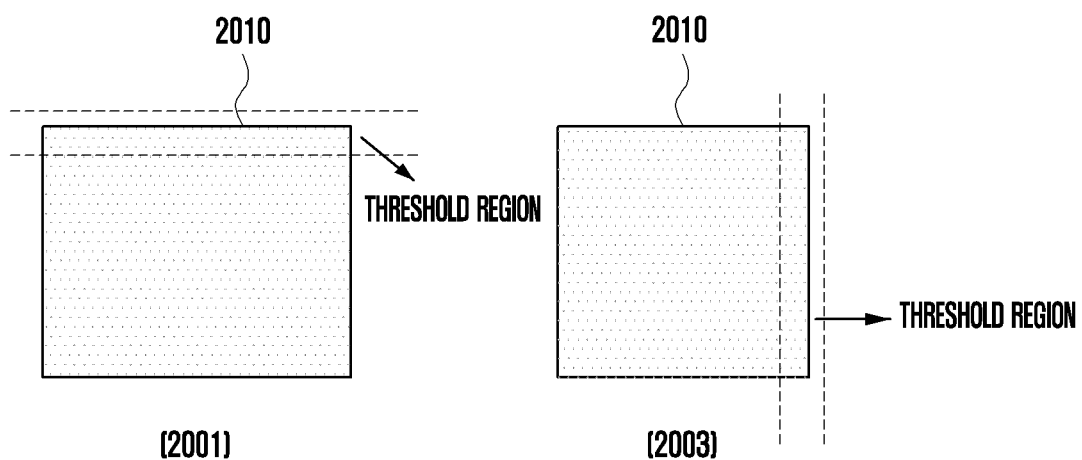
FIG. 20 is a diagram illustrating an editing operation of an electronic device according to a user input according to an embodiment of the disclosure.

FIG. 20 is a diagram illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 20, a threshold region of the object may be a region configured, as the periphery of an object region 2010, to extend inside and outside the object region 2010 by a predetermined section (or length) with respect to the object region. According to various embodiments of the disclosure, the threshold region of the object may not be displayed to be seen on a display.

As indicated by reference numeral 2001, the threshold region of the object may be a region configured to extend inside and outside the object region 2010 from the horizontal periphery of the object region 2010 by a predetermined section (or length).

As indicated by reference numeral 2003, the threshold region of the object may be a region configured to extend inside and outside the object region 2010 from the vertical periphery of the object region 2010 by a predetermined section (or length).

Figure 21:
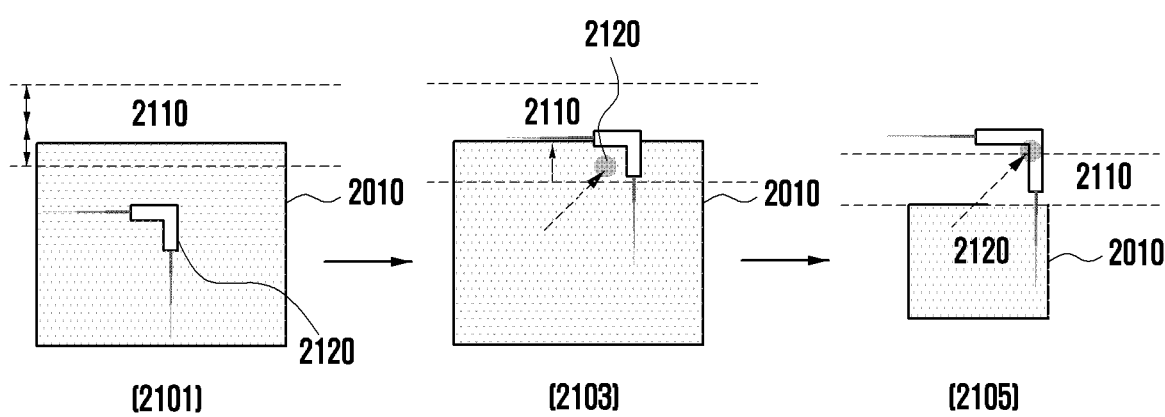
FIG. 21 is a diagram illustrating an editing operation of an electronic device according to a user input according to an embodiment of the disclosure.

FIG. 21 is a diagram illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 21, in the stage 2101, a threshold region 2110 of an object may be a region configured to extend inside and outside an object region 2010 from the horizontal periphery of the object region 2010 by a predetermined section (or length). A "Crop image" user interface 2120 may be displayed. The "Crop image" user interface 2120 may be substantially rectangular and/or square, and may include at least one of a rectangular and/or square edge and/or a square or L-shaped bracket image neighboring a vertex.

In the stage 2103, if a substantially rectangular and/or square end line, or the square or L-shaped bracket image of the "Crop image" user interface 2120 is moved into the threshold region 2110 of the object, an operation of selecting the object region 2010 may be performed. The operation of selecting the object region 2010 may be an operation of snapping to the object region 2010.

In the stage 2105, if a substantially rectangular and/or square end line, or the square or L-shaped bracket image of the "Crop image" user interface 2120 is moved out of the threshold region 2110 of the object, an operation of releasing the selection of the object region 2010 may be performed. The operation of releasing the selection of the object region 2010 may be an operation of releasing the snapping to the object region 2010.

Figure 22:
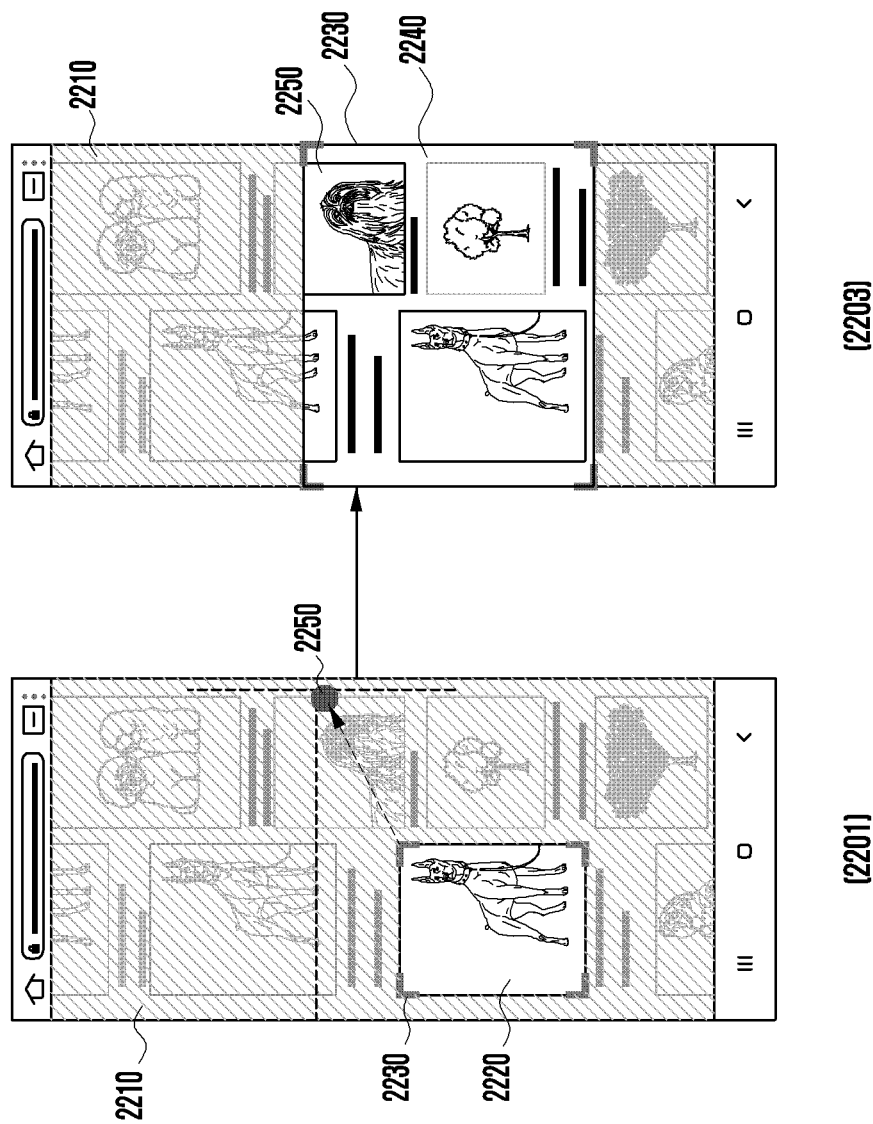
FIG. 22 is a diagram illustrating an editing operation of an electronic device according to a user input according to an embodiment of the disclosure.

FIG. 22 is a diagram illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 22, in the stage 2201, in an operation of modifying a captured screen, if a region of interest (ROI) 2220 is selected, a first edit screen may be displayed. The first edit screen may be an edit screen in which a view layout 2210 of the captured screen is maintained while an editing tool user interface (e.g., a "Crop image" user interface) 2230 is placed to center on the region of interest (ROI) 2220. The region other than the region of interest (ROI) 2220 in the captured screen may be processed to be darker than the region of interest (ROI) 2220, so as to be displayed. In the operation of modifying the captured screen, a substantially rectangular and/or square end line, or a square or L-shaped bracket image of the "Crop image" user interface 2230 may be moved into another region 2250.

In the stage 2203, in the operation of modifying the captured screen, the substantially rectangular and/or square end line, or the square or L-shaped bracket image of the "Crop image" user interface 2230 may be moved to modify the user interface to include the other region 2250 in addition to the region of interest (ROI) 2220.

In the stage 2203, the electronic device (e.g., the electronic device 101 in FIG. 1, the electronic device 200 in FIG. 2A, or the electronic device 300 in FIG. 3A) according to various embodiments may allow the "Crop image" user interface 2230 to snap to a new object region 2240 to include the additionally selected region 2250.

Figure 23:
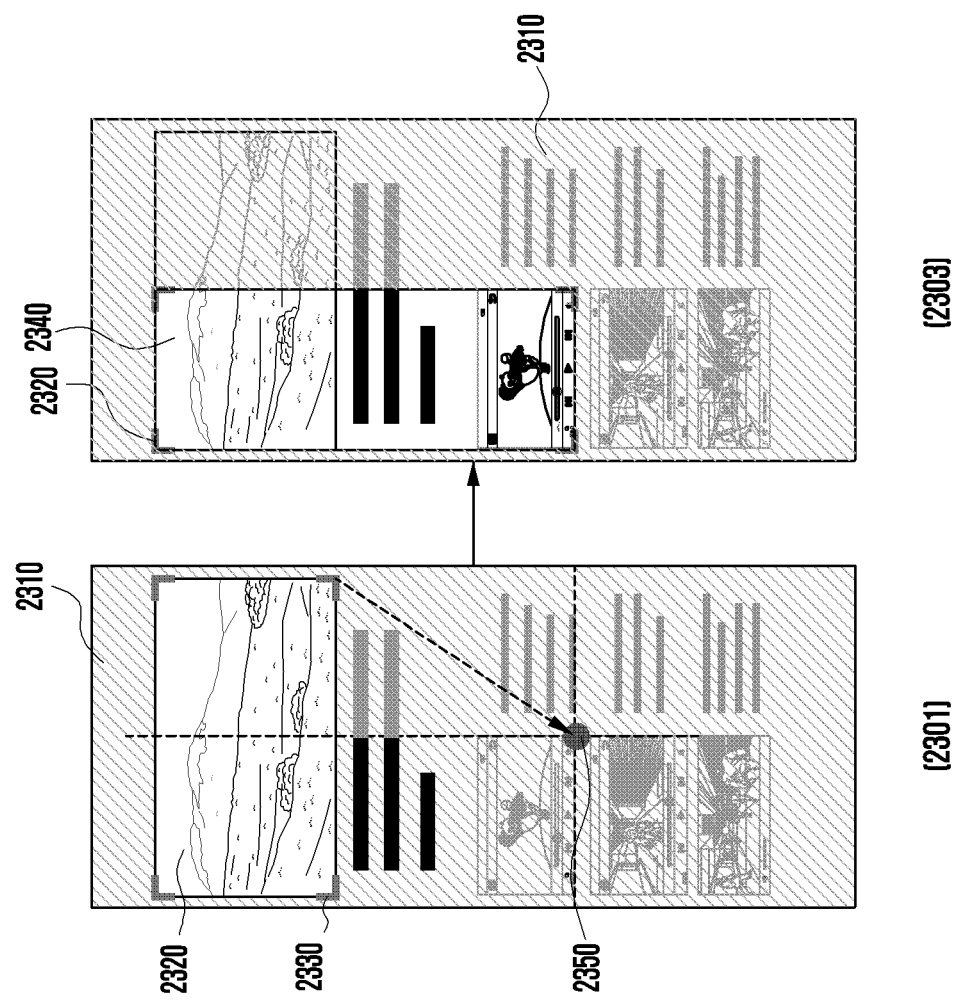
FIG. 23 is a diagram illustrating an editing operation of an electronic device according to a user input according to an embodiment of the disclosure.

FIG. 23 is a diagram illustrating an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 23, in the stage 2301, in an operation of modifying a captured screen, if a region of interest (ROI)

2320 is selected, a first edit screen may be displayed. The first edit screen may be an edit screen in which a view layout 2310 of the captured screen is maintained while an editing tool user interface (e.g., a "Crop image" user interface) 2330 is placed to center on the region of interest (ROI) 2320. The region other than the region of interest (ROI) 2320 in the captured screen may be processed to be darker than the region of interest (ROI), so as to be displayed. In the operation of modifying the captured screen, a substantially rectangular and/or square end line, or a square or L-shaped bracket image of the "Crop image" user interface 2330 may be moved into another region 2350.

In the stage 2303, in the operation of modifying the captured screen, the substantially rectangular and/or square end line, or the square or L-shaped bracket image of the "Crop image" user interface 2330 may be moved to modify the user interface to include the other region 2350 in addition to the region of interest (ROI) 2220.

In the stage 2303, the electronic device (e.g., the electronic device 101 in FIG. 1, the electronic device 200 in FIG. 2A, or the electronic device 300 in FIG. 3A) according to various embodiments may allow the "Crop image" user interface 2330 to snap to a new object region 2340 to include the selected other region 2350.

Figure 24:
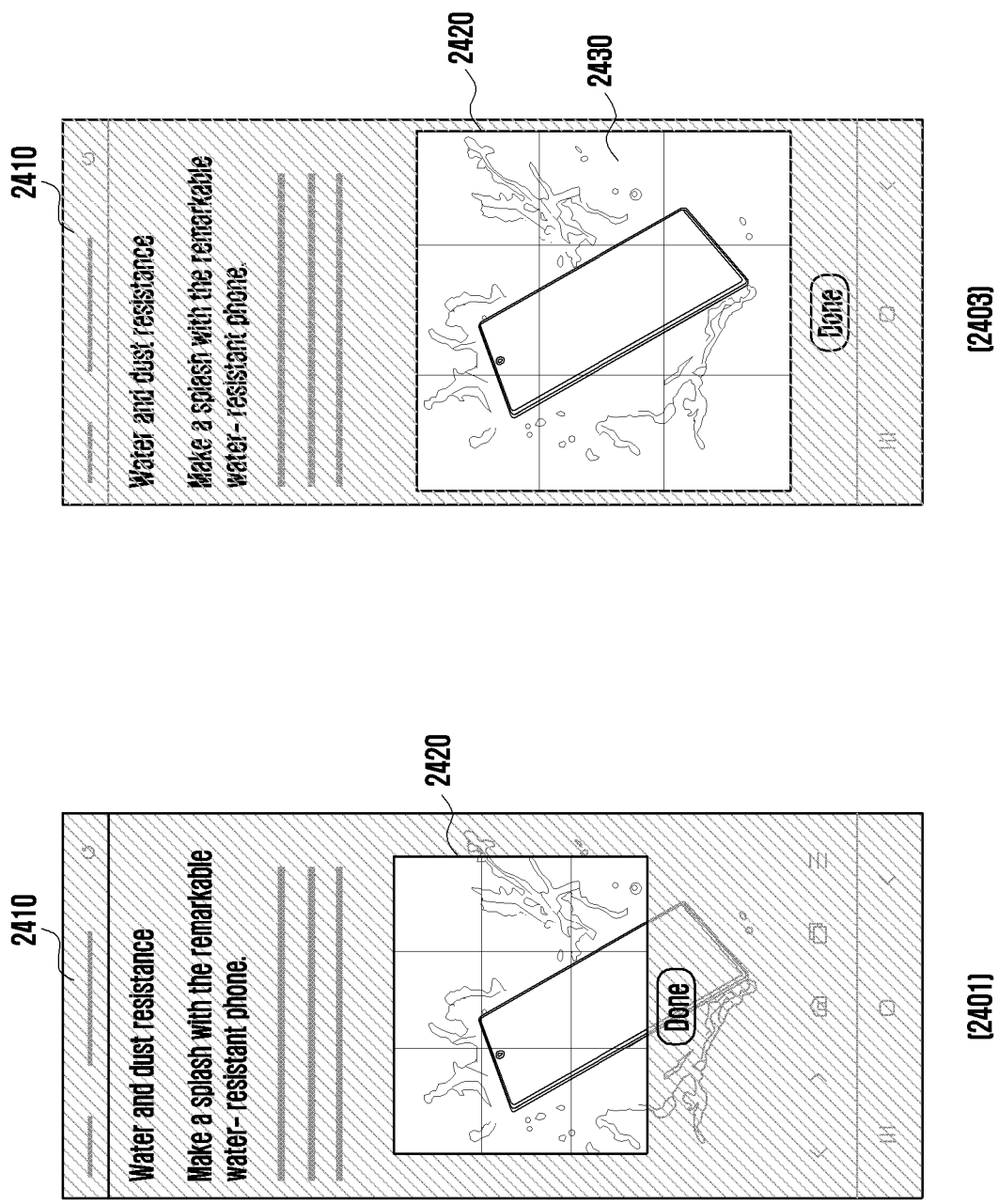
FIG. 24 is a diagram illustrating an operation of capturing a displayed process screen by an electronic device according to an embodiment of the disclosure.

FIG. 24 is a diagram illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 24, in the stage 2401, if it is determined that a received command is a command to select an object region to capture a screen, the electronic device (e.g., the electronic device 101 in FIG. 1, the electronic device 200 in FIG. 2A, or the electronic device 300 in FIG. 3A) may display a user interface 2420 by which an object region can be selected and a screen thereof can be captured, under control of a processor (e.g., the processor 120 in FIG. 1).

In the stage 2403, if it is determined that a received command is a command to select an object region to capture a screen, and there is a region of interest (ROI) 2430 in a captured screen 2410, the electronic device (e.g., the electronic device 101 in FIG. 1, the electronic device 200 in FIG. 2A, or the electronic device 300 in FIG. 3A) may display the user interface 2420 by which an object region centered on the region of interest (ROI) 2430 can be selected and a screen thereof can be captured, under control of the processor (e.g., the processor 120 in FIG. 1). An operation of focusing the region of interest (ROI) 2430 may be performed. The operation may correspond to the view layout 2410 in which a region around the region of interest (ROI) 2430 is processed to be brightened, and the region other than the region of interest (ROI) is processed to be darkened. The operation of focusing the region of interest (ROI) 2430 may be an operation of placing an editing tool user interface (e.g., a "Crop image" user interface) to center on the region of interest (ROI) 2430 while displaying an image (e.g., a box GUI element) indicating the region of interest (ROI) 2430.

Figure 25:
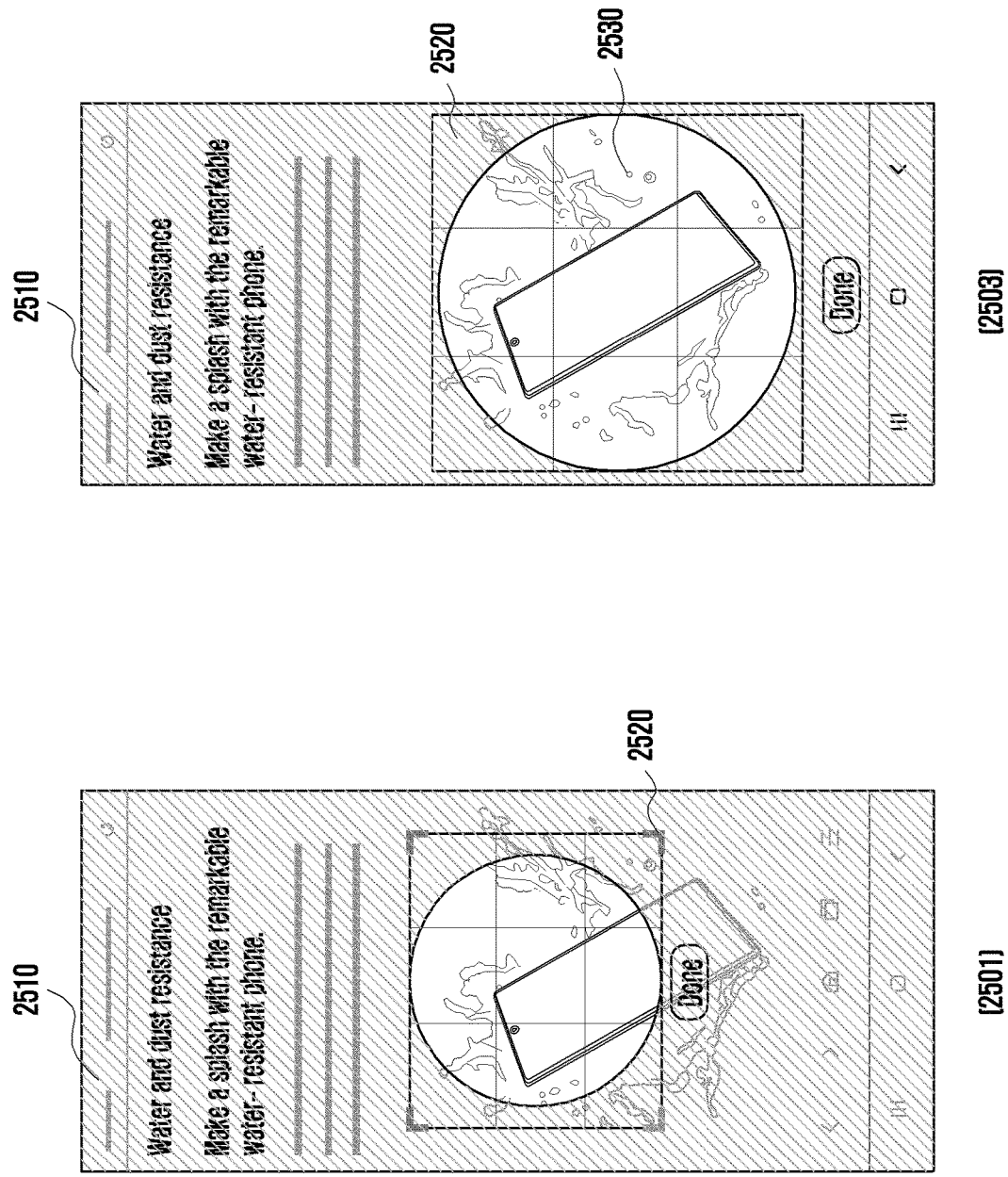
FIG. 25 is a diagram illustrating an operation of capturing a displayed process screen by an electronic device according to an embodiment of the disclosure.

FIG. 25 is a diagram illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 25, in the stage 2501, if it is determined that a received command is a command to select an object region to capture a screen, the electronic device (e.g., the electronic device 101 in FIG. 1, the electronic device 200 in FIG. 2A, or the electronic device 300 in FIG. 3A) may display a user interface 2520 by which an object region can be selected and a screen thereof can be captured, under control of a processor (e.g., the processor 120 in FIG. 1).

In the stage 2503, if it is determined that a received command is a command to select an object region to capture a screen, and there is a region of interest (ROI) 2530 in a captured screen 2510, the electronic device (e.g., the electronic device 101 in FIG. 1, the electronic device 200 in FIG. 2A, or the electronic device 300 in FIG. 3A) may display the user interface 2520 by which an object region centered on the region of interest (ROI) 2530 can be selected and a screen thereof can be captured, under control of the processor (e.g., the processor 120 in FIG. 1). An operation of focusing the region of interest (ROI) 2530 may be performed. The operation may correspond to the view layout 2510 in which a region around the region of interest (ROI) 2530 is processed to be brightened, and the region other than the region of interest (ROI) is processed to be darkened. The operation of focusing the region of interest (ROI) 2530 may be an operation of placing an editing tool user interface (e.g., a "Crop image" user interface) to center on the region of interest (ROI) 2530 while displaying an image (e.g., an oval GUI element) indicating the region of interest (ROI) 2530.

Figure 26:
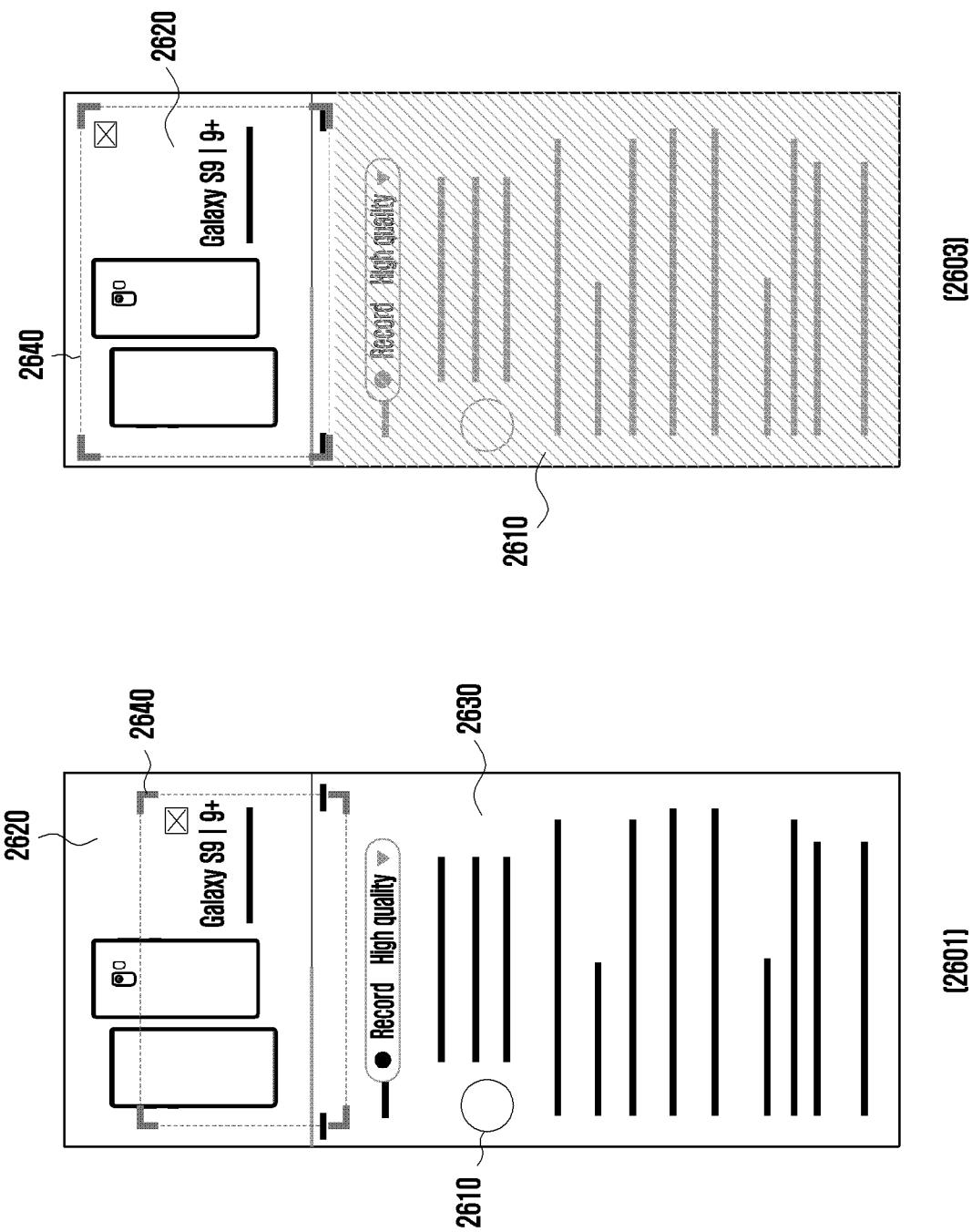
FIG. 26 is a diagram illustrating an operation of capturing a displayed process screen by an electronic device according to an embodiment of the disclosure.

FIG. 26 is a diagram illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 26, in the stage 2601, if it is determined that a received command is a command to select an object region to capture a screen, the electronic device (e.g., the electronic device 101 in FIG. 1, the electronic device 200 in FIG. 2A, or the electronic device 300 in FIG. 3A) may display a user interface 2640 by which an object region can be selected and a screen thereof can be captured, under control of a processor (e.g., the processor 120 in FIG. 1). A captured screen 2610 may include an image region 2620 and a text region 2630.

In the stage 2603, if it is determined that a received command is a command to select an object region to capture a screen, and there is the region of interest (ROI) 2620 in the captured screen 2610, the electronic device (e.g., the electronic device 101 in FIG. 1, the electronic device 200 in FIG. 2A, or the electronic device 300 in FIG. 3A) may display the user interface 2640 by which an object region centered on the region of interest (ROI) 2620 can be selected and a screen thereof can be captured, under control of the processor (e.g., the processor 120 in FIG. 1). An operation of focusing the region of interest (ROI) 2620 may be performed. The operation may correspond to the view layout 2610 in which a region around the region of interest (ROI) 2620 is processed to be brightened, and the region other than the region of interest (ROI) is processed to be darkened. The operation of focusing the region of interest (ROI) 2620 may be an operation of displaying an animation of moving an image indicating the region of interest (ROI) 2620 to the region of interest (ROI). In addition, an editing tool user interface (e.g., a "Crop image" user interface) may be placed to center on the region of interest (ROI) 2620.

Figure 27:
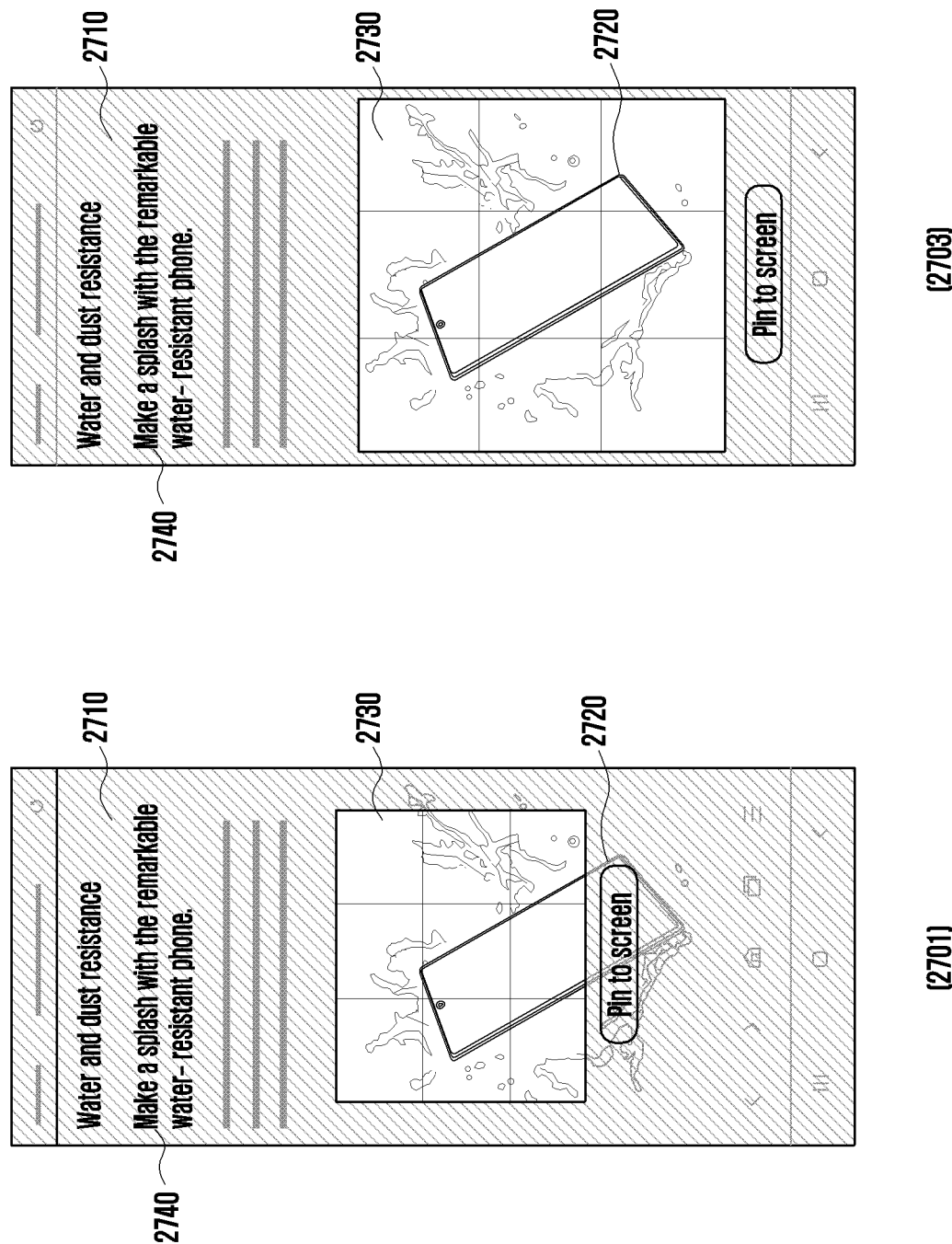
FIG. 27 is a diagram illustrating an operation of capturing a displayed process screen by an electronic device according to an embodiment of the disclosure.

FIG. 27 is a diagram illustrating an operation of capturing a displayed process screen by an electronic device (e.g., the electronic device 101 in FIG. 1, the electronic device 200 in FIG. 2A, or the electronic device 300 in FIG. 3A) according to an embodiment of the disclosure.

Referring to FIG. 27, in the stage 2701, if it is determined that a received command is a command to select an object region to capture a screen, the electronic device (e.g., the electronic device 101 in FIG. 1, the electronic device 200 in FIG. 2A, or the electronic device 300 in FIG. 3A) may display a user interface 2730 by which an object region can be selected and a screen thereof can be captured, under control of a processor (e.g., the processor 120 in FIG. 1). A captured screen 2710 may include an image region 2720 and a text region 2740.

In the stage 2703, if it is determined that a received command is a command to select an object region to capture a screen, and there is the region of interest (ROI) 2720 in the captured screen 2710, the electronic device (e.g., the electronic device 101 in FIG. 1, the electronic device 200 in FIG. 2A, or the electronic device 300 in FIG. 3A) may display the user interface 2730 by which an object region centered on the region of interest (ROI) 2720 can be selected and a screen thereof can be captured, under control of the processor (e.g., the processor 120 in FIG. 1). An operation of focusing the region of interest (ROI) 2720 may be performed. The operation may correspond to the view layout 2710 in which a region around the region of interest (ROI) 2720 is processed to be brightened, and the region other than the region of interest (ROI) is processed to be darkened. The operation of focusing the region of interest (ROI) 2720 may be an operation of displaying a pin-to-screen animation of enlarging an image indicating the region of interest (ROI) 2720 to the region of interest (ROI). In addition, an editing tool user interface (e.g., a "Crop image" user interface) may be placed to center on the region of interest (ROI) 2620.

Figure 28:
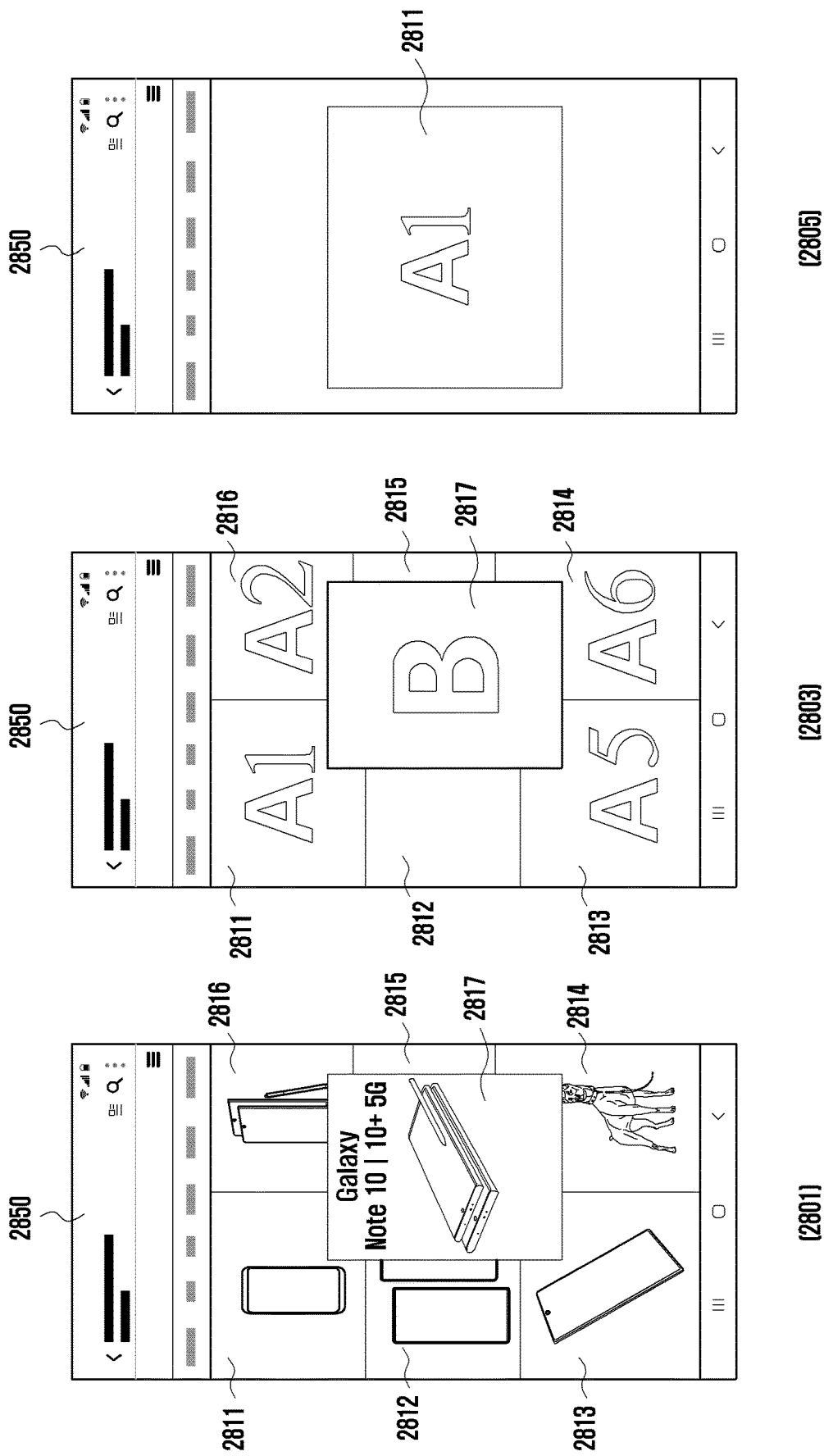
FIG. 28 is a diagram illustrating a method for operating capturing by an electronic device according to an embodiment of the disclosure.

FIG. 28 is a diagram illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 28, in the stage 2801, an electronic device (e.g., the electronic device 101 in FIG. 1, the electronic device 200 in FIG. 2A, or the electronic device 300 in FIG. 3A) may capture a process screen 2850 displayed on a display (e.g., the display device 160 in FIG. 1, the display 230 in FIG. 2A, or the display 301 in FIG. 3A) under control of a processor (e.g., the processor 120 in FIG. 1).

In the stages 2801 and 2803, the captured screen 2850 may include at least one object region 2811, 2812, 2813, 2814, 2815, 2816 and 2817. The electronic device (e.g., the electronic device 101 in FIG. 1, the electronic device 200 in FIG. 2A, or the electronic device 300 in FIG. 3A) may determine whether there is the pop-up object region 2817 in the captured screen 2850, under control of the processor (e.g., the processor 120 in FIG. 1). The pop-up object region 2817 may be a pop-up window.

In the stage 2805, the pop-up object region 2817 may be separated and removed from the captured screen 2850, and the captured screen 2811 positioned below the pop-up object region 2817 may be revised. In the operation of separating the pop-up object region 2817 from the captured screen 2850 and revising the captured screen 2850, the pop-up object region 2817 may be removed and an image may be revised and stored to display the region of interest (ROI) 2811.

Figure 29:
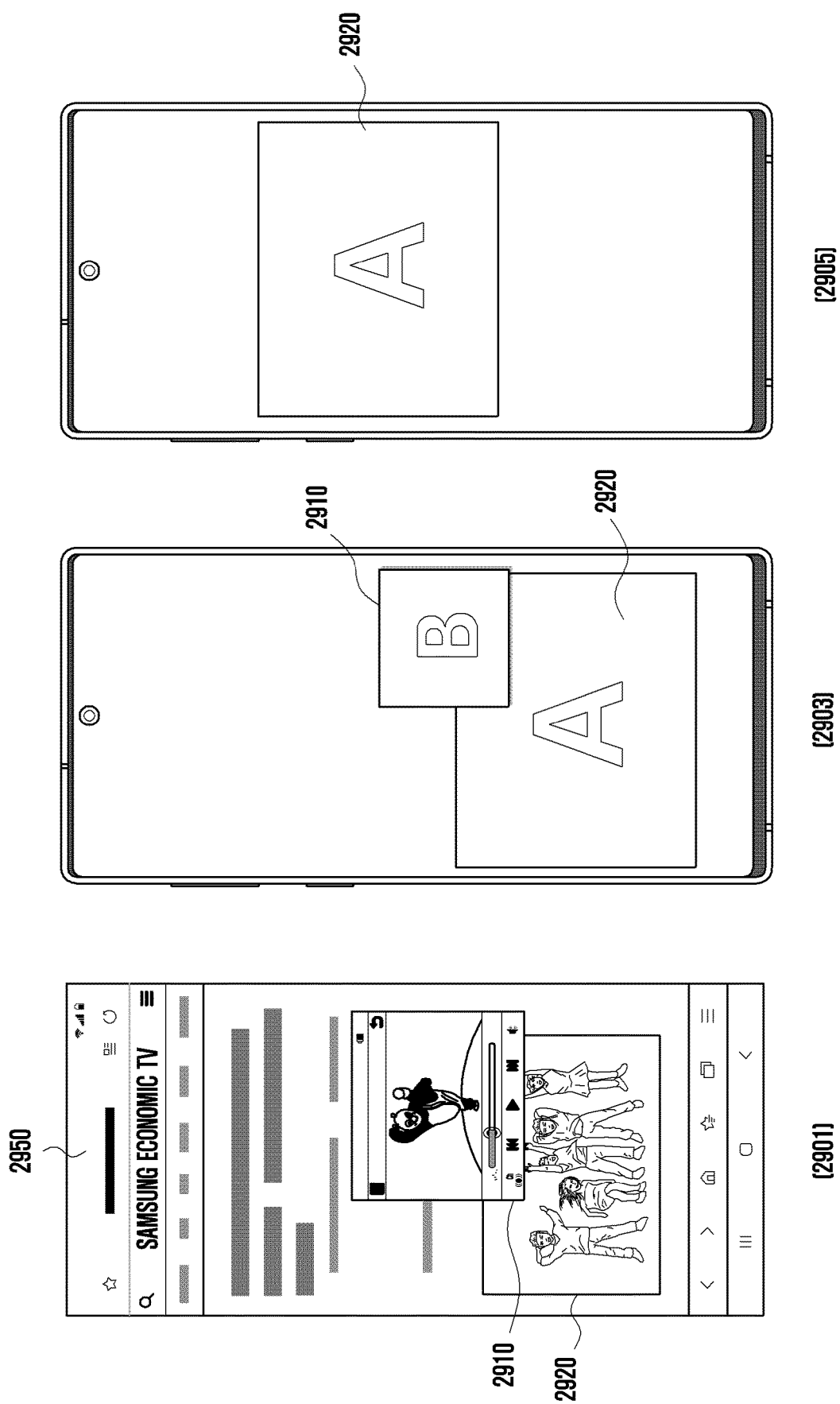
FIG. 29 is a diagram illustrating a method for operating capturing by an electronic device according to an embodiment of the disclosure.

FIG. 29 is a diagram illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 29, in the stage 2901, an electronic device (e.g., the electronic device 101 in FIG. 1, the electronic device 200 in FIG. 2A, or the electronic device 300 in FIG. 3A) may capture a process screen 2950 displayed on a display (e.g., the display device 160 in FIG. 1, the display 230 in FIG. 2A, or the display 301 in FIG. 3A) under control of a processor (e.g., the processor 120 in FIG. 1).

In the stages 2901 and 2903, the captured screen 2950 may include at least one object region 2910 and 2920. The electronic device (e.g., the electronic device 101 in FIG. 1, the electronic device 200 in FIG. 2A, or the electronic device 300 in FIG. 3A) may determine whether there is the pop-up object region 2910 in the captured screen 2950, under control of the processor (e.g., the processor 120 in FIG. 1). The pop-up object region 2910 may be a pop-up window.

In the stage 2905, the pop-up object region 2910 may be separated and removed from the captured screen 2950, and the captured screen 2920 positioned below the pop-up object region 2910 may be revised. In the operation of separating the pop-up object region 2910 from the captured screen 2950 and revising the captured screen 2950, the pop-up object region 2910 may be removed and an image may be revised and stored to display the region of interest (ROI) 2920.

FIG. 30 illustrates a sequence of an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 30, in the stage 3001, an electronic device (e.g., the electronic device 101 in FIG. 1, the electronic device 200 in FIG. 2A, or the electronic device 300 in FIG. 3A) may obtain an image 3020 according to a user input from a captured screen 3010, under control of a processor (e.g., the processor 120 in FIG. 1).

In the stage 3001, the electronic device (e.g., the electronic device 101 in FIG. 1, the electronic device 200 in FIG. 2A, or the electronic device 300 in FIG. 3A) according to various embodiments may determine whether there is a similar pattern or a grouped screen 3020, 3021 and 3022 in a layout of the obtained image 3020, under control of the processor (e.g., the processor 120 in FIG. 1).

In the stage 3002, the electronic device (e.g., the electronic device 101 in FIG. 1, the electronic device 200 in FIG. 2A, or the electronic device 300 in FIG. 3A) may store the obtained image 3020 together with the similar pattern or grouped screen 3021 and 3022 existing in the layout of the obtained image, under control of the processor (e.g., the processor 120 in FIG. 1). The screen 3021 or 3022 that is not selected by the user input may also be stored with the image 3020 selected by the user input.

Figure 31:
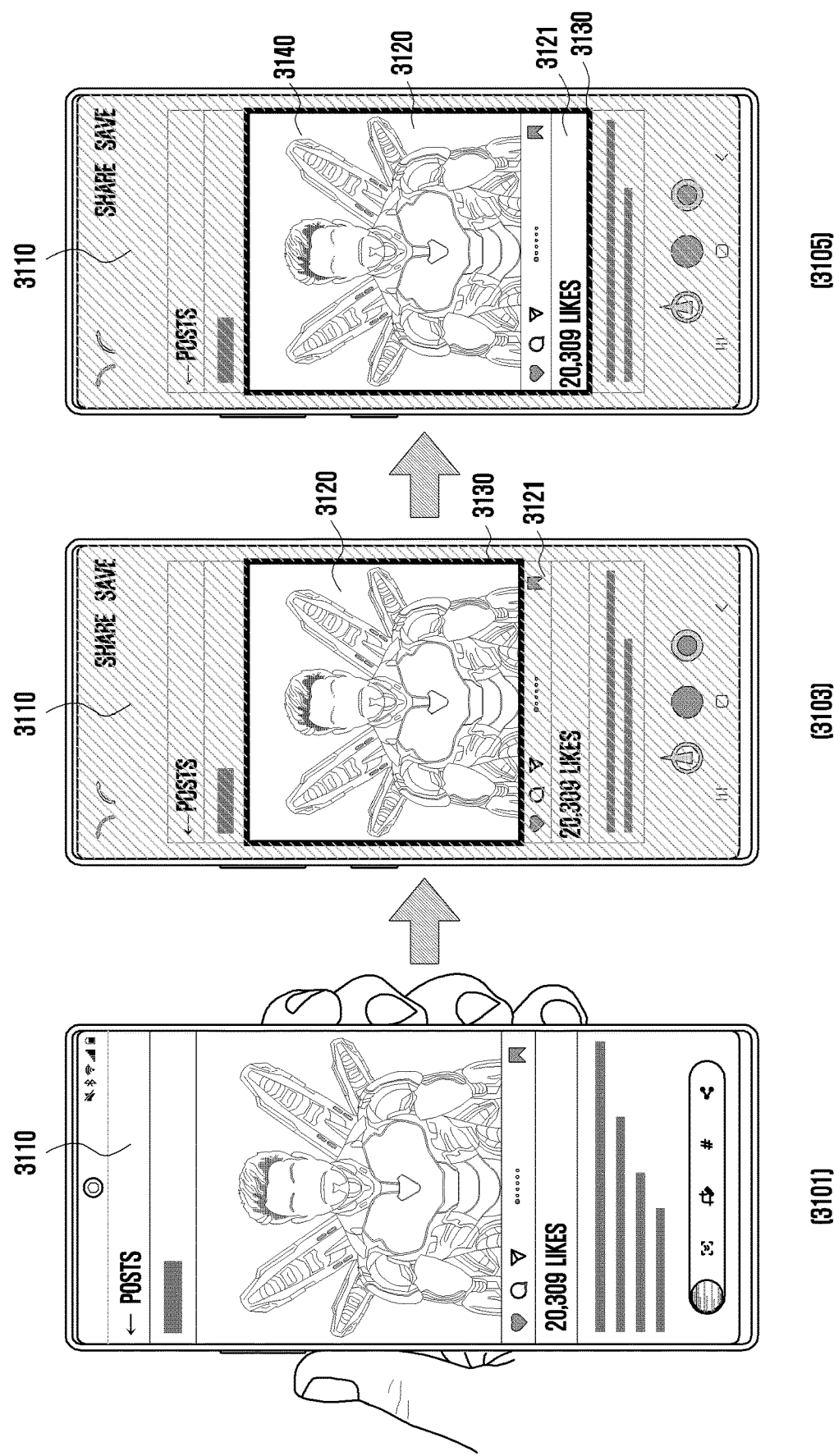
FIG. 31 illustrates a sequence of an editing operation of an electronic device according to a user input according to an embodiment of the disclosure.

FIG. 31 illustrates a sequence of an operation of performing an edit according to a user input by an electronic device (e.g., the electronic device 101 in FIG. 1, the electronic device 200 in FIG. 2A, or the electronic device 300 in FIG. 3A) according to an embodiment of the disclosure.

Referring to FIG. 31, in the stage 3101, an electronic device (e.g., the electronic device 101 in FIG. 1, the electronic device 200 in FIG. 2A, or the electronic device 300 in FIG. 3A) may obtain a captured screen 3110 under control of a processor (e.g., the processor 120 in FIG. 1).

In the stage 3103, the electronic device (e.g., the electronic device 101 in FIG. 1, the electronic device 200 in FIG. 2A, or the electronic device 300 in FIG. 3A) may obtain an image 3120 according to a user input from the captured screen 3110, under control of the processor (e.g., the processor 120 in FIG. 1).

According to various embodiments of the disclosure, the operation of obtaining the image 3120 according to the user input may be an operation of obtaining the image by moving a substantially rectangular and/or square end line, or a square or L-shaped bracket image of a "Crop image" user interface 3130 into a threshold region of an object, and selecting the object region 3120 corresponding to the editing tool user interface 3130 having been moved according to the user input.

In the stage 3103, the electronic device (e.g., the electronic device 101 in FIG. 1, the electronic device 200 in FIG. 2A, or the electronic device 300 in FIG. 3A) according to various embodiments may determine whether there is a similar pattern or a grouped screen 3120 and 3121 in a layout of the obtained image 3120 under control of the processor (e.g., the processor 120 in FIG. 1).

In the stage 3105, the electronic device (e.g., the electronic device 101 in FIG. 1, the electronic device 200 in FIG. 2A, or the electronic device 300 in FIG. 3A) may store, as a new image 3140, both the obtained image 3120 and the similar pattern or grouped screen 3120 and 3121 existing in the layout of the obtained image, under control of the processor (e.g., the processor 120 in FIG. 1). The screen 3121 that is not selected by the user input may also be stored, as the new image 3140, with the image 3120 selected by the user input.

Figure 32A:
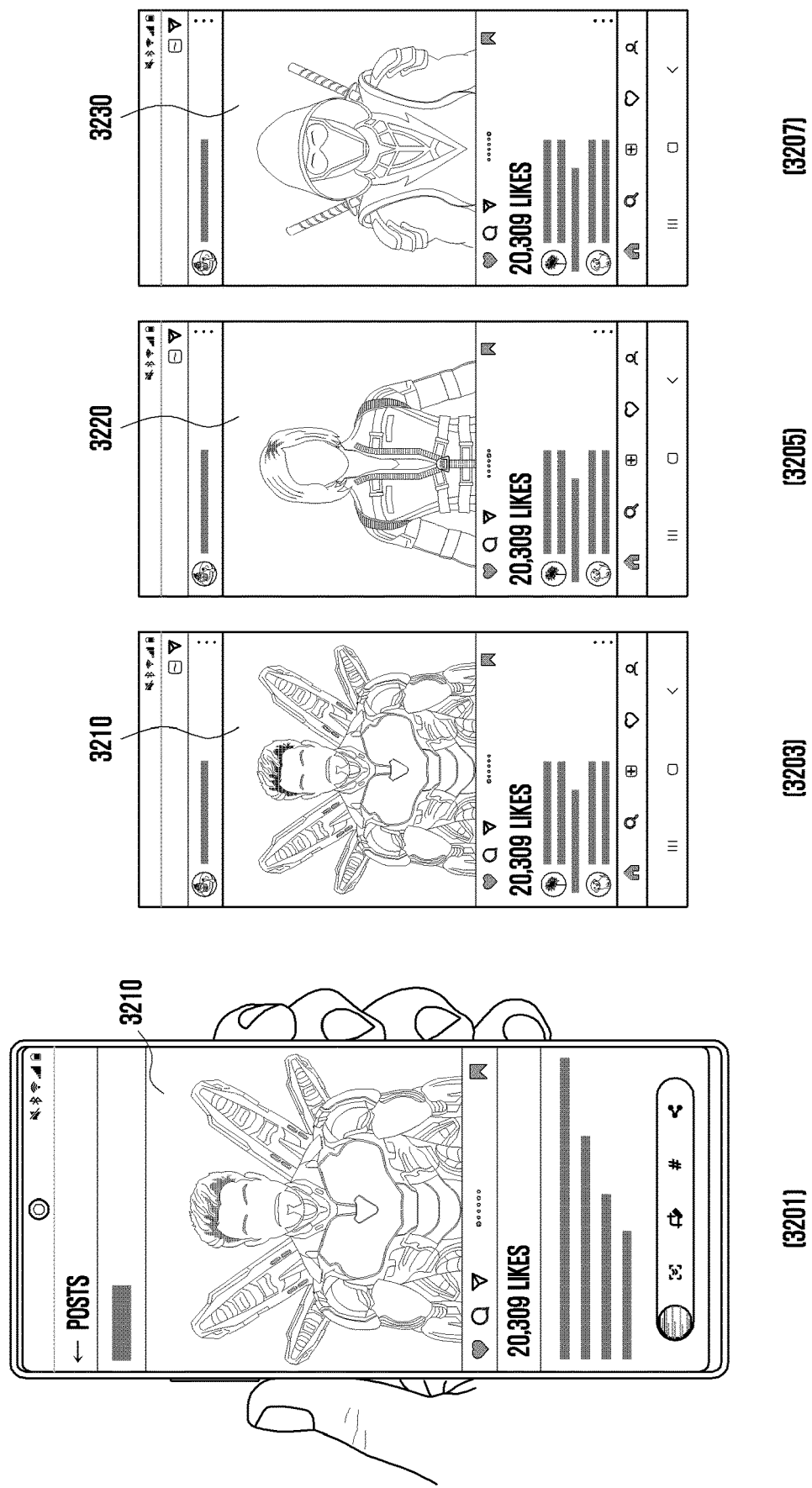
FIG. 32A is a diagram illustrating a method for operating capturing by an electronic device according to an embodiment of the disclosure.
Figure 32B:
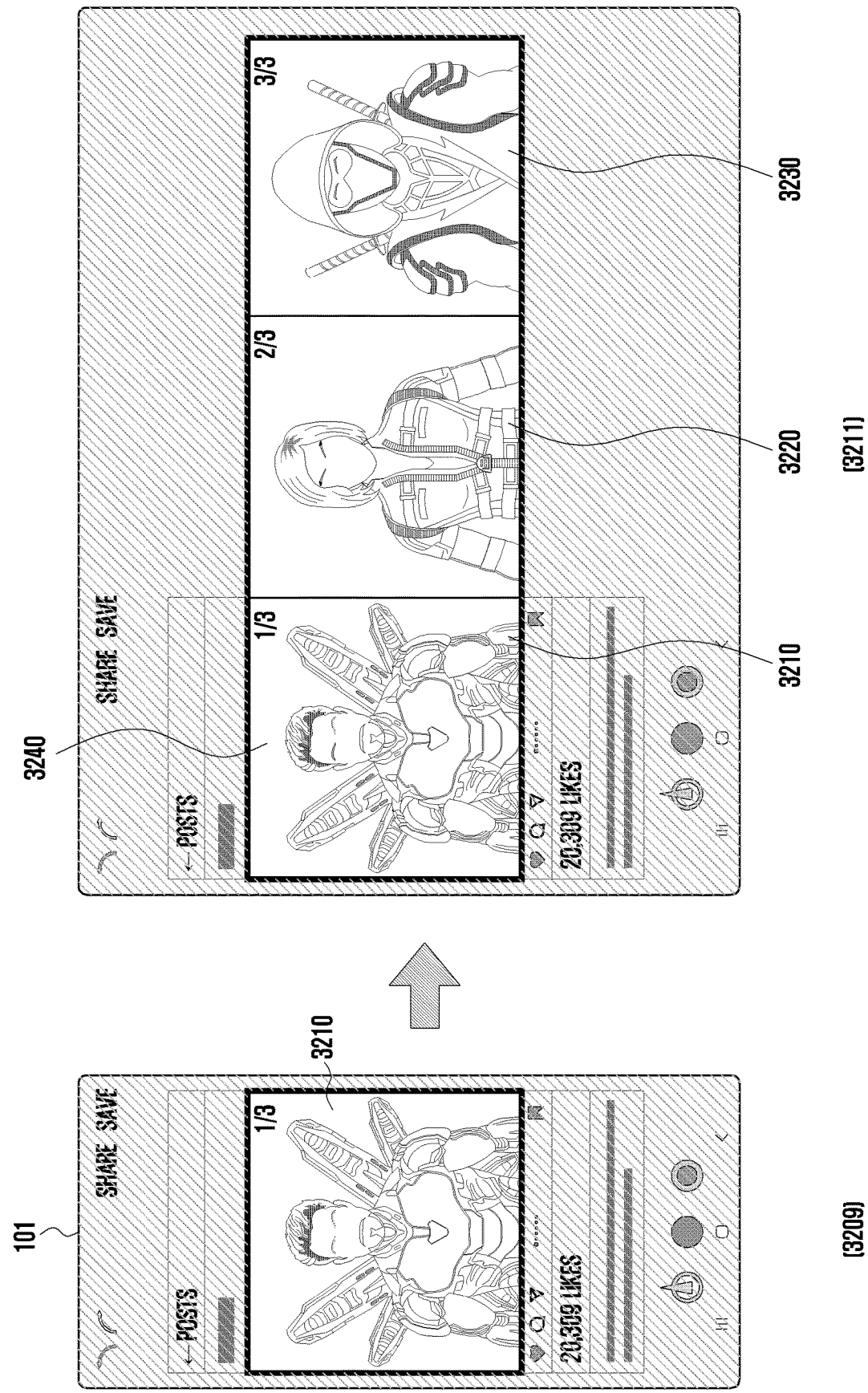
FIG. 32B is a diagram illustrating a method for operating capturing by an electronic device according to an embodiment of the disclosure.

FIGS. 32A and 32B are diagrams illustrating a method for operating capturing by an electronic device (e.g., the electronic device 101 in FIG. 1, the electronic device 200 in FIG. 2A, or the electronic device 300 in FIG. 3A) according to various embodiments of the disclosure.

Referring to FIGS. 32A and 32B, in the stages 3201, 3203, 3205, and 3207, a running application may include horizontal slide images 3210, 3220, and 3230.

In the stage 3209, an electronic device (e.g., the electronic device 101 in FIG. 1, the electronic device 200 in FIG. 2A, or the electronic device 300 in FIG. 3A) may capture a process screen displayed on a display (e.g., the display device 160 in FIG. 1, the display 230 in FIG. 2A, or the display 301 in FIG. 3A) under control of a processor (e.g., the processor 120 in FIG. 1). In the stage 3201, the image 3210 may be obtained from the captured screen according to a user input.

In the stage 3211, the electronic device (e.g., the electronic device 101 in FIG. 1, the electronic device 200 in FIG. 2A, or the electronic device 300 in FIG. 3A) may merge the horizontal slide images 3210, 3220, and 3230 in a region corresponding to the obtained image 3210, to revise the captured screen to a new image 3240 and store the new image under control of the processor (e.g., the processor 120 in FIG. 1).

Figure 33:
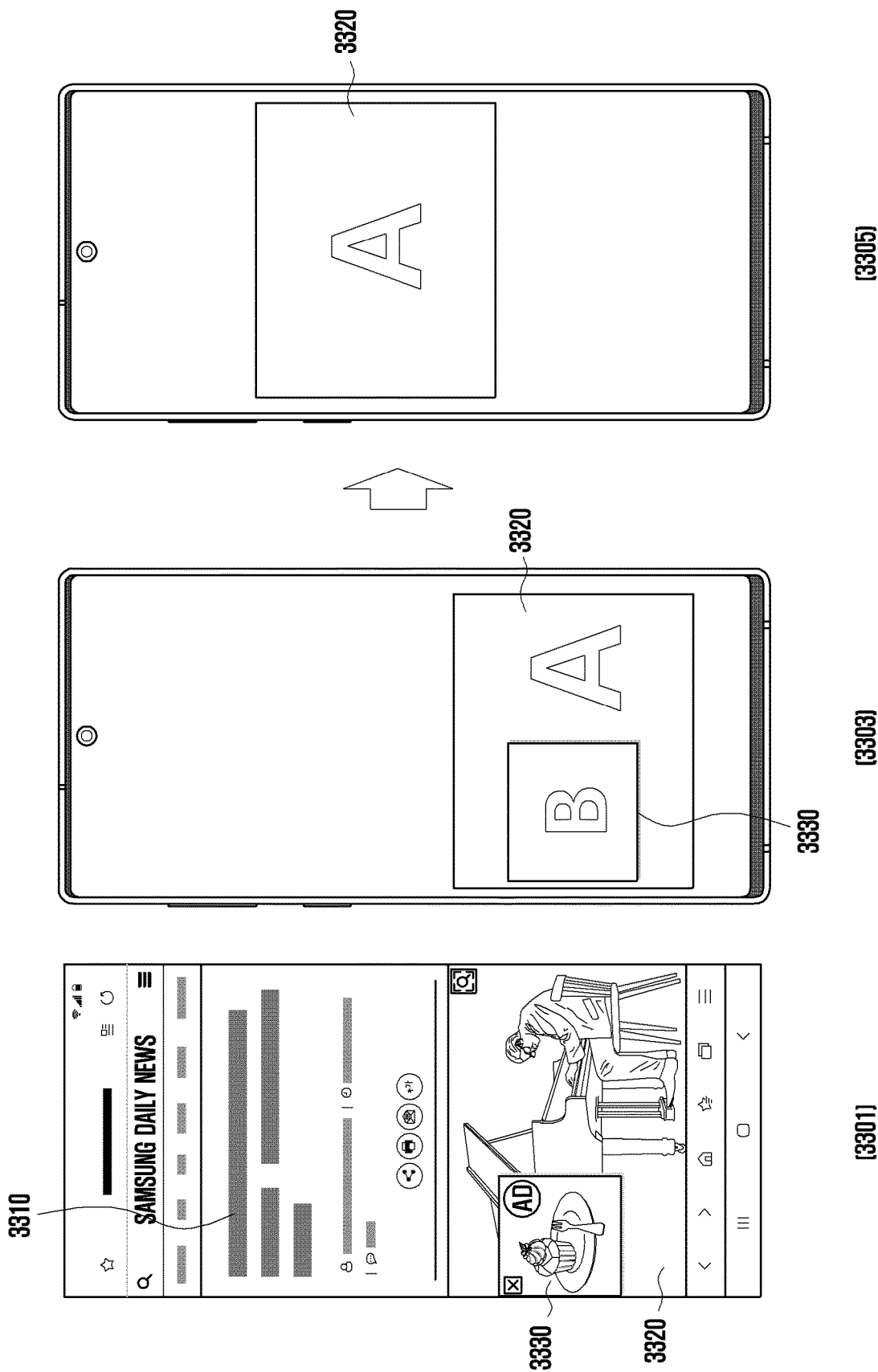
FIG. 33 is a diagram illustrating a method for operating capturing by an electronic device according to an embodiment of the disclosure.

FIG. 33 is a diagram illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 33, in the stage 3301, an electronic device (e.g., the electronic device 101 in FIG. 1, the electronic device 200 in FIG. 2A, or the electronic device 300 in FIG. 3A) may capture a process screen 3310 displayed on a display (e.g., the display device 160 in FIG. 1, the display 230 in FIG. 2A, or the display 301 in FIG. 3A) under control of a processor (e.g., the processor 120 in FIG. 1).

In the stages 3301 and 3303, the captured screen 3310 may include at least one object region 3320 and 3330. The electronic device (e.g., the electronic device 101 in FIG. 1, the electronic device 200 in FIG. 2A, or the electronic device 300 in FIG. 3A) may determine whether there is the pop-up object region 3330 in the captured screen 3310, under control of the processor (e.g., the processor 120 in FIG. 1). The pop-up object region 3330 may be an Internet advertisement view.

In the stage 3305, the pop-up object region 3330 may be separated and removed from the captured screen 3310, and the captured screen 3320 positioned below the pop-up object region 3330 may be revised. In the operation of separating the pop-up object region 3330 from the captured screen 3310 and revising the captured screen 3310, the pop-up object region 3330 is removed, and an image may be revised and stored to display the region of interest (ROI) 3320.

Figure 34:
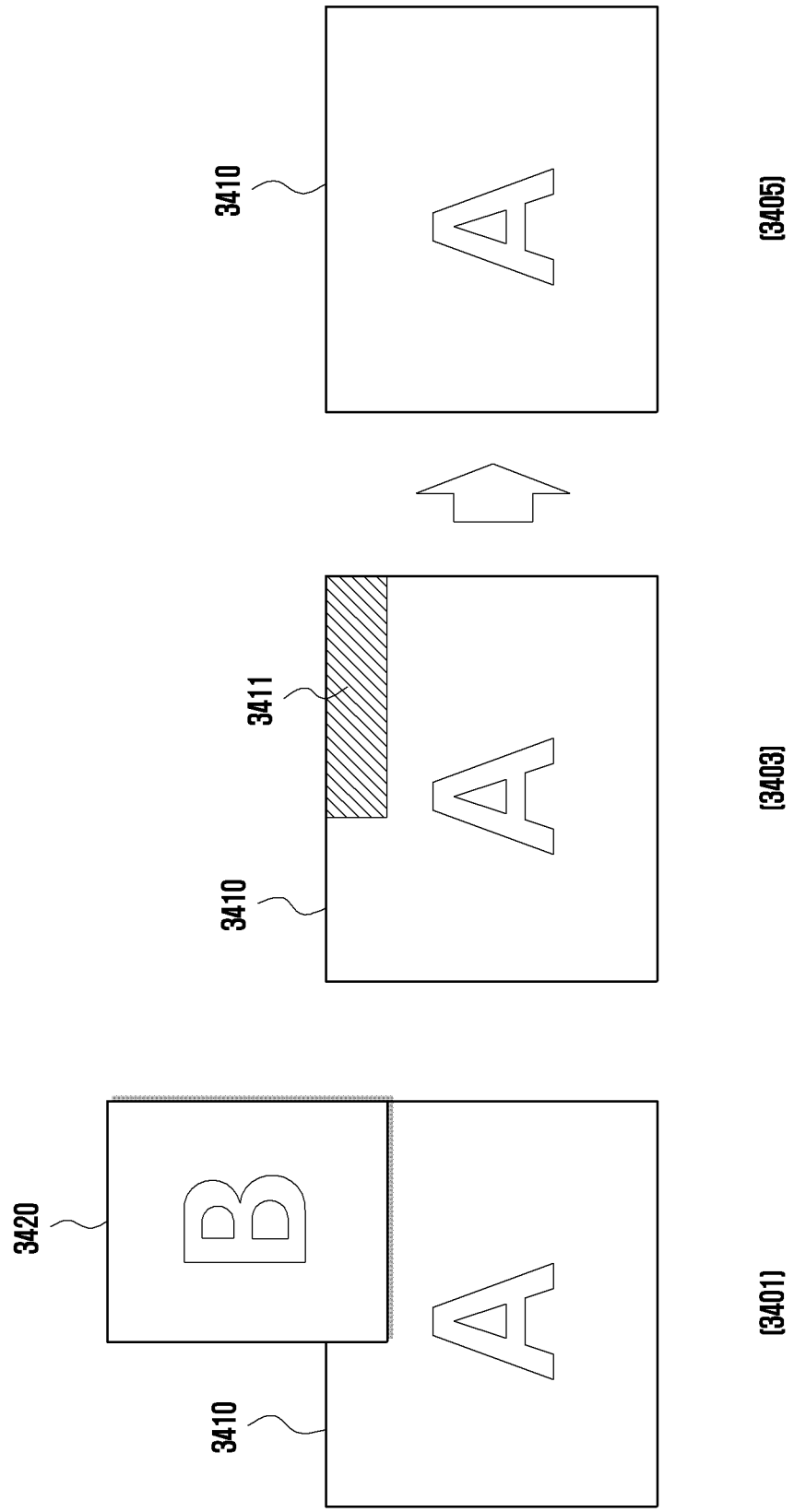
FIG. 34 is a diagram illustrating a method for operating capturing by an electronic device according to an embodiment of the disclosure.

FIG. 34 is a diagram illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 34, in the stage 3401, a captured screen may include at least one object region 3410 and 3420. The electronic device (e.g., the electronic device 101 in FIG. 1, the electronic device 200 in FIG. 2A, or the electronic device 300 in FIG. 3A) according to various embodiments may determine whether there is the pop-up object region 3420 in the captured screen, under control of a processor (e.g., the processor 120 in FIG. 1).

In the stage 3403, the pop-up object region 3420 may be separated and removed from the captured screen, and the captured screen 3410 positioned below the pop-up object region 3420 may be revised. After the pop-up object region 3420 is separated and removed, there may be no data of at least a partial region 3411 of the captured screen 3410 positioned below the pop-up object region 3420. The lost partial region 3411 may be compensated for by using rendering information or extracted additional information, so that the captured screen 3410 positioned below the pop-up object region may be revised. In the operation of separating the pop-up object region 3420 from the captured screen and revising the captured screen, the pop-up object region 3420 may be removed, and an image may be revised and stored to display the region of interest (ROI) 3410.

Figure 35:
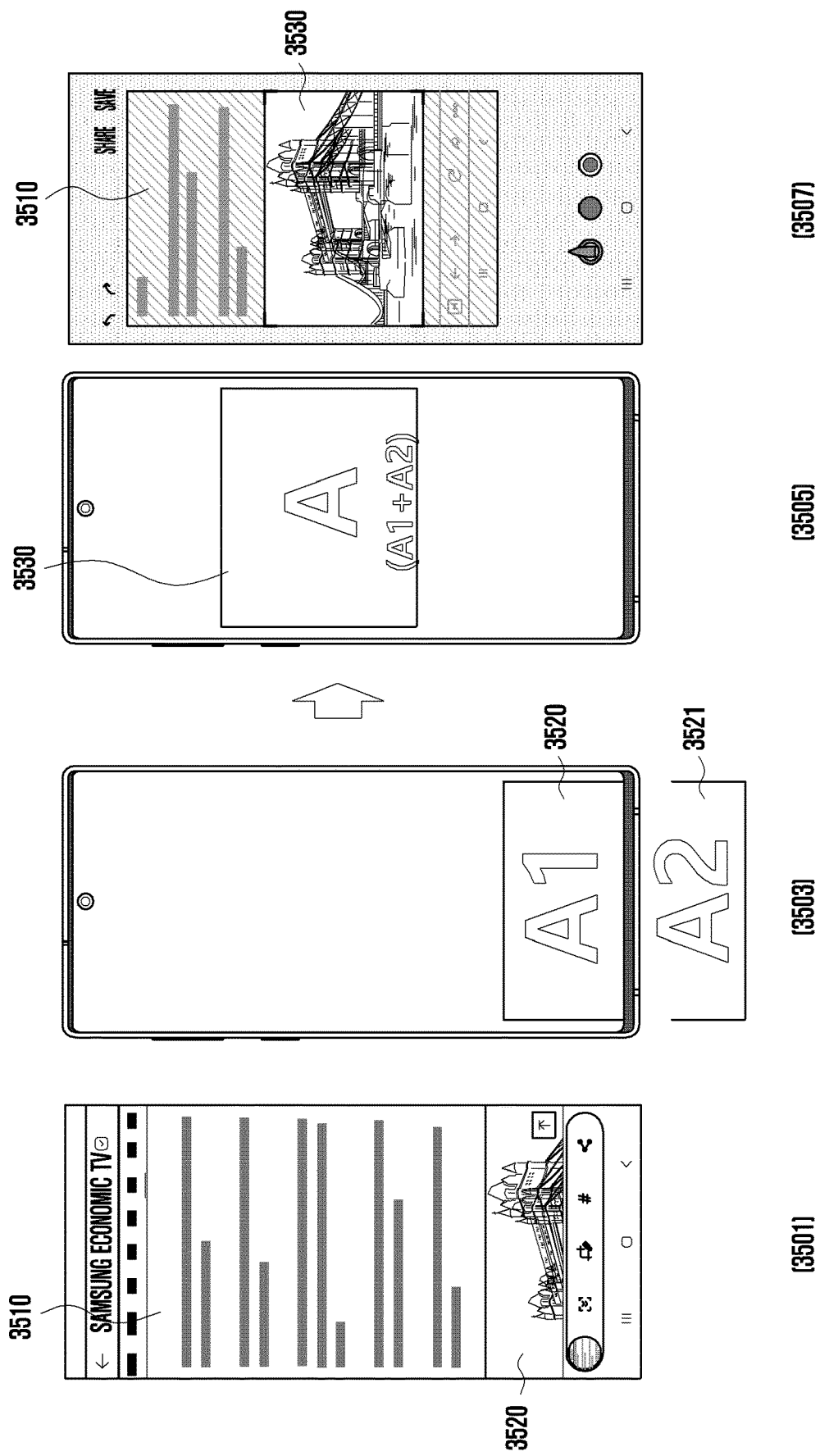
FIG. 35 is a diagram illustrating capturing operated by an electronic device according to an embodiment of the disclosure.

FIG. 35 is a diagram illustrating capturing operated by an electronic device (e.g., the electronic device 101 in FIG. 1, the electronic device 200 in FIG. 2A, or the electronic device 300 in FIG. 3A) according to an embodiment of the disclosure.

Referring to FIG. 35, in the stages 3501 and 3503, an electronic device (e.g., the electronic device 101 in FIG. 1, the electronic device 200 in FIG. 2A, or the electronic device 300 in FIG. 3A) may determine whether an image 3521 which failed to be captured exists at a boundary 3520 of a captured image 3510, under control of a processor (e.g., the processor 120 in FIG. 1).

In the stages 3505 and 3507, if the image 3521 which failed to be captured exists at the boundary 3520 of the captured image 3510, the electronic device (e.g., the electronic device 101 in FIG. 1, the electronic device 200 in FIG. 2A, or the electronic device 300 in FIG. 3A) may separate the image and revise a captured screen to make the image be a continuous image 3530 under control of the processor (e.g., the processor 120 in FIG. 1).

In the stages 3505 and 3507, if the image 3521 which failed to be captured exists at the boundary 3520 of the captured image 3510, the electronic device (e.g., the electronic device 101 in FIG. 1, the electronic device 200 in FIG. 2A, or the electronic device 300 in FIG. 3A) may separate the image, merge the captured image 3510 and the image 3521 which failed to be captured, into a continuous image, and revise the region of interest 3530 to be a captured screen under control of the processor (e.g., the processor 120 in FIG. 1). The operation of revising the captured screen may be performed by compensating for a data loss of an image corresponding to a region which failed to be captured by using rendering information or additional information, to make a continuous image.

FIG. 36 is a diagram illustrating capturing operated by an electronic device (e.g., the electronic device 101 in FIG. 1, the electronic device 200 in FIG. 2A, or the electronic device 300 in FIG. 3A) according to an embodiment of the disclosure.

Referring to FIG. 36, in the stage 3601, the electronic device (e.g., the electronic device 101 in FIG. 1, the electronic device 200 in FIG. 2A, or the electronic device 300 in FIG. 3A) is a foldable electronic device having a plurality of display regions 3690 and 3691, and may display a plurality of running application screens through a plurality of multi-windows 3620, 3621 and 3622.

In the stage 3601, each of the plurality of multi-windows 3620, 3621 and 3622 may include at least one object region 3610, 3611, 3612, 3613, 3614, and 3615.

In the stage 3603, if a command to capture a displayed process screen is received, the electronic device may determine, as a region of interest (ROI), the largest object region 3610 among the at least one object region 3610, 3611, 3612, 3613, 3614, and 3615 included in the plurality of multi-windows 3620, 3621 and 3622, and may suggest image editing to a user through an operation of emphasizing a region around the region of interest (ROI) 3610 and darkening the region other than the region of interest (ROI) 3610. A "Crop image" user interface 3630 may be disposed around the region of interest (ROI) 3610.

Figure 37:
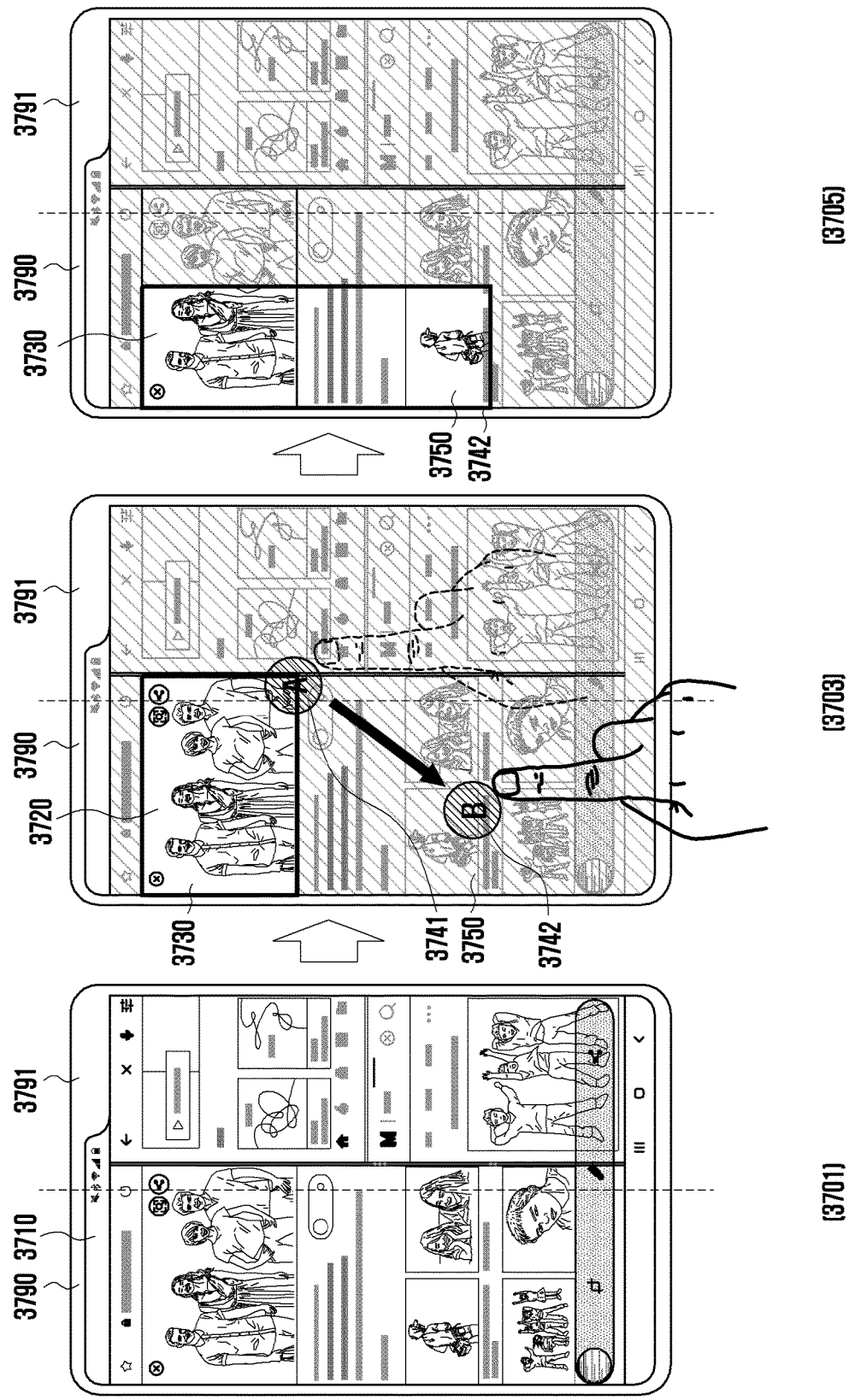
FIG. 37 is a diagram illustrating capturing operated by an electronic device according to an embodiment of the disclosure.

FIG. 37 is a diagram illustrating capturing operated by an electronic device (e.g., the electronic device 101 in FIG. 1, the electronic device 200 in FIG. 2A, or the electronic device 300 in FIG. 3A) according to an embodiment of the disclosure.

Referring to FIG. 37, in the stage 3701, the electronic device (e.g., the electronic device 101 in FIG. 1, the electronic device 200 in FIG. 2A, or the electronic device 300 in FIG. 3A) is a foldable electronic device having a plurality of display regions 3790 and 3791, and may display a plurality of running application screens 3710 through a plurality of multi-windows.

In the stage 3703, each of the plurality of multi-windows may include at least one object region 3720, and 3750.

In the stage 3703, if a command to capture a displayed process screen is received, the electronic device (e.g., the electronic device 101 in FIG. 1, the electronic device 200 in FIG. 2A, or the electronic device 300 in FIG. 3A) may determine, as a region of interest (ROI), the largest object region 3720 among the at least one object region 3720 and 3750 included in the plurality of multi-windows, and may suggest image editing to a user through an operation of emphasizing a region around the region of interest (ROI) 3720 and darkening the region other than the region of interest (ROI) 3720. The electronic device (e.g., the electronic device 101 in FIG. 1, the electronic device 200 in FIG. 2A, or the electronic device 300 in FIG. 3A) may place a "Crop image" user interface 3730 around the region of interest (ROI) 3720.

In the stage 3703, the electronic device (e.g., the electronic device 101 in FIG. 1, the electronic device 200 in FIG. 2A, or the electronic device 300 in FIG. 3A) may move the "Crop image" user interface 3730 placed around the region of interest (ROI) 3720, from a point 3741 to a point 3742 which is in a threshold region of the other object region 3750, according to a user input.

In the stage 3705, if the "Crop image" user interface 3730 placed around the region of interest (ROI) 3720 is moved from the point 3741 to the point 3742 which is in a threshold region of the other object region 3750, according to the user input, the electronic device (e.g., the electronic device 101 in FIG. 1, the electronic device 200 in FIG. 2A, or the electronic device 300 in FIG. 3A) may capture and store the new image 3730 including a partial region of the first object region 3720 and the second object region 3750.

Figure 38:
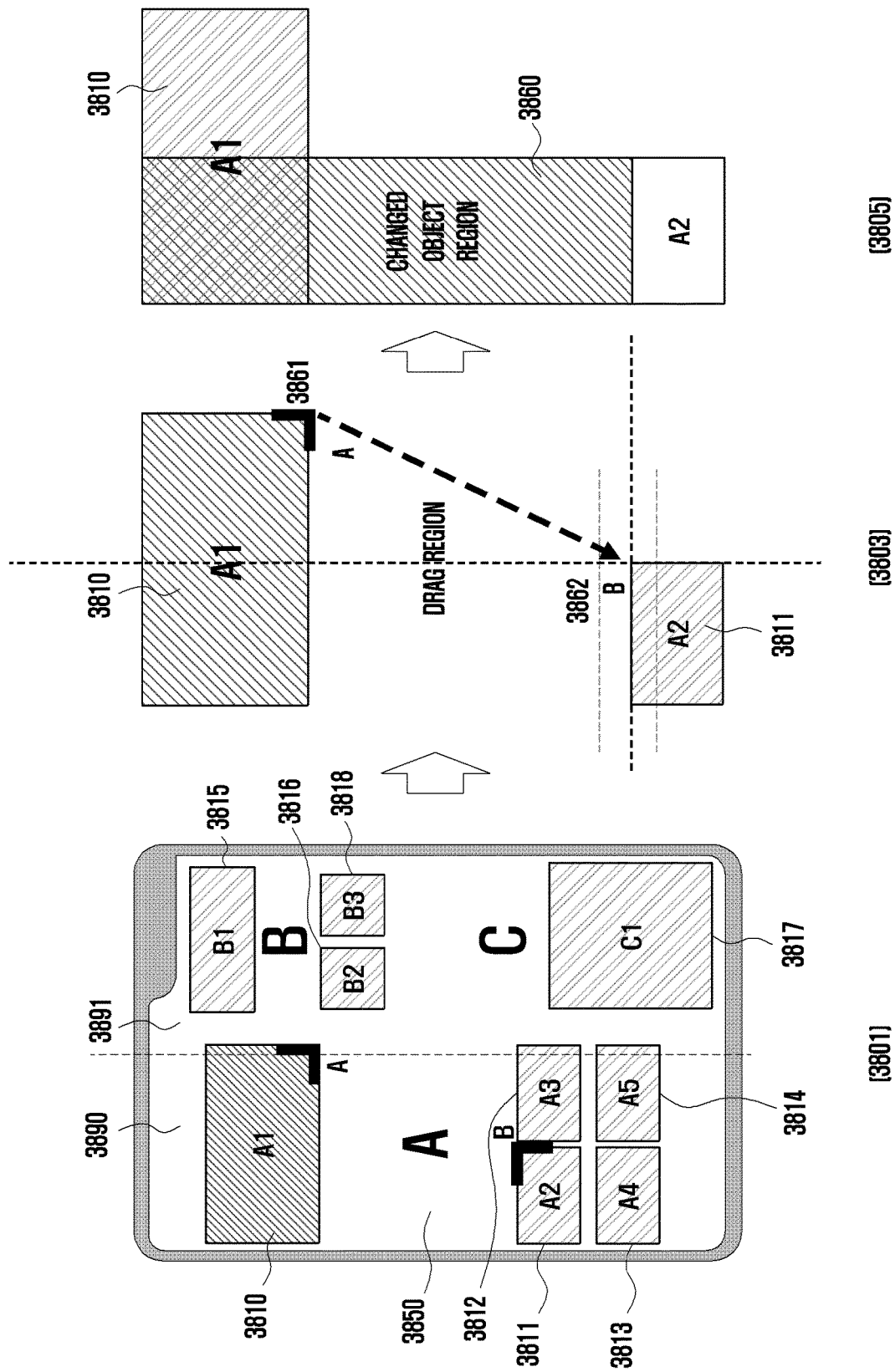
FIG. 38 is a diagram illustrating capturing operated by an electronic device according to an embodiment of the disclosure.

FIG. 38 is a diagram illustrating capturing operated by an electronic device (e.g., the electronic device 101 in FIG. 1, the electronic device 200 in FIG. 2A, or the electronic device 300 in FIG. 3A) according to an embodiment of the disclosure.

Referring to FIG. 38, in the stage 3801, the electronic device (e.g., the electronic device 101 in FIG. 1, the electronic device 200 in FIG. 2A, or the electronic device 300 in FIG. 3A) is a foldable electronic device having a plurality of display regions 3890 and 3891, and may display a plurality of running application screens A, B, and C through a plurality of multi-windows.

In the stage 3801, each of the plurality of multi-windows may include at least one object region 3810, 3811, 3812, 3813, 3814, 3815, 3816, 3817, and 3818.

In the stage 3801, each of the plurality of multi-windows may place a "Crop image" user interface 3850 in the at least one object region 3810, 3811, 3812, 3813, 3814, 3815, 3816, 3817, and 3818.

In the stage 3803, if a command to capture a displayed process screen is received, the electronic device may determine, as a region of interest (ROI), the largest object region 3810 among the at least one object region 3810, 3811, 3812, 3813, 3814, 3815, 3816, 3817, and 3818 included in the plurality of multi-windows, and may suggest image editing to a user through an operation of emphasizing a region around the region of interest (ROI) 3810 and darkening the region other than the region of interest (ROI) 3810. The "Crop image" user interface 3850 may be disposed around the region of interest (ROI) 3810.

In the stage 3803, the electronic device (e.g., the electronic device 101 in FIG. 1, the electronic device 200 in FIG. 2A, or the electronic device 300 in FIG. 3A) may move the "Crop image" user interface 3850 placed around the region of interest (ROI) 3810, from a point 3861 to a point 3862 which is in a threshold region of the other object region 3811, according to a user input.

In the stage 3805, if the "Crop image" user interface 3850 placed around the region of interest (ROI) 3810 is moved from the point 3861 to the point 3862 which is in a threshold region of the other object region 3811, according to the user input, the electronic device (e.g., the electronic device 101 in FIG. 1, the electronic device 200 in FIG. 2A, or the electronic device 300 in FIG. 3A) may capture and store a new image 3860 including up to a boundary of the second object region 3811 as well as a partial region of the first object region 3810.

Figure 39:
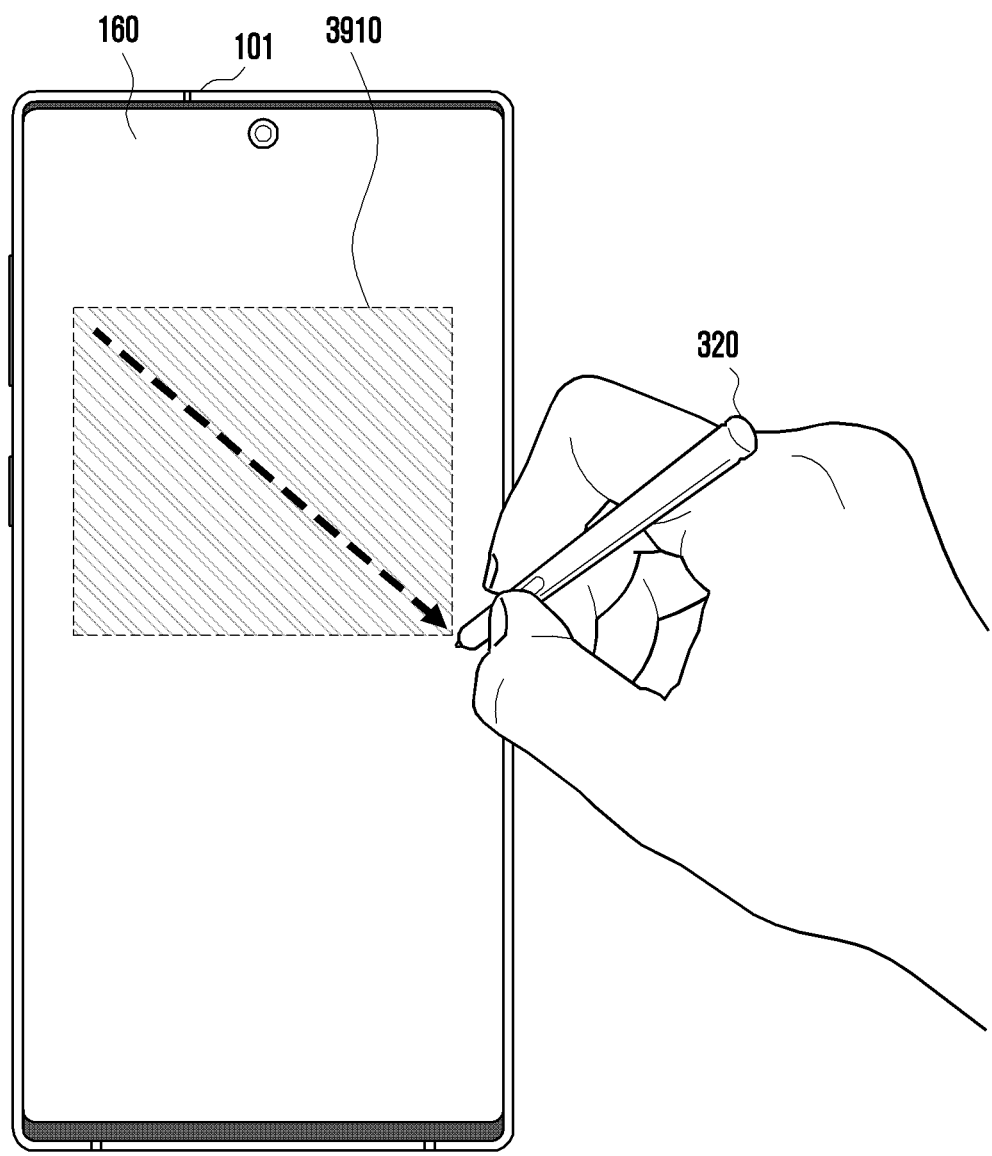
FIG. 39 is a diagram illustrating an operation of selecting an object region to capture a screen by an electronic device according to an embodiment of the disclosure.

FIG. 39 is a diagram illustrating an operation of selecting an object region to capture a screen by an electronic device (e.g., the electronic device 101 in FIG. 1, the electronic device 200 in FIG. 2A, or the electronic device 300 in FIG. 3A) according to an embodiment of the disclosure.

Referring to FIG. 39, according to various embodiments of the disclosure, if an input (e.g., a drag input) of selecting an object region according to a touch input made by a stylus pen 320 is received, an electronic device (e.g., the electronic device 101 in FIG. 1, the electronic device 200 in FIG. 2A, or the electronic device 300 in FIG. 3A) may select the object region 3910 according to the touch input corresponding to the stylus pen 320, to capture a screen under control of a processor (e.g., the processor 120 in FIG. 1).

Figure 40:
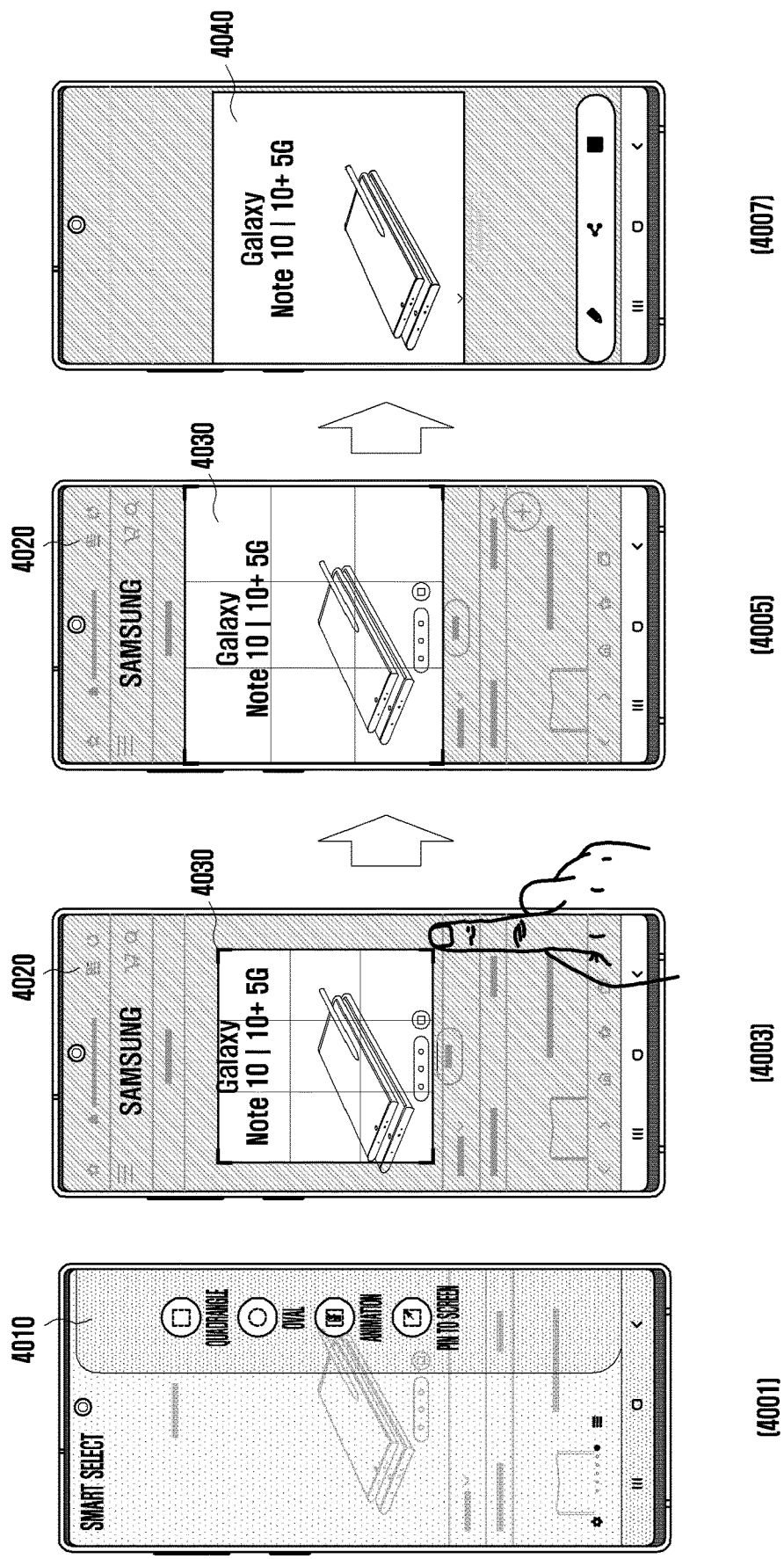
FIG. 40 is a diagram illustrating an operation of selecting an object region to capture a screen by an electronic device according to an embodiment of the disclosure.

FIG. 40 is a diagram illustrating an operation of selecting an object region to capture a screen by an electronic device (e.g., the electronic device 101 in FIG. 1, the electronic device 200 in FIG. 2A, or the electronic device 300 in FIG. 3A) according to an embodiment of the disclosure.

Referring to FIG. 40, in the stage 4001, the electronic device (e.g., the electronic device 101 in FIG. 1, the electronic device 200 in FIG. 2A, or the electronic device 300 in FIG. 3A) may execute a function of selecting an object region. The electronic device (e.g., the electronic device 101 in FIG. 1, the electronic device 200 in FIG. 2A, or the electronic device 300 in FIG. 3A) may display a user interface 4010 relating to the object region selecting function on a display (e.g., the display device 160 in FIG. 1).

In the stages 4003 and 4005, if the object region selecting function is selected, the electronic device (e.g., the electronic device 101 in FIG. 1, the electronic device 200 in FIG. 2A, or the electronic device 300 in FIG. 3A) may receive an input of selecting an object region according to a touch input (e.g., a touch by a stylus pen or a hand) on a running screen 4020, and may display a "Crop image" user interface 4030 corresponding to the selected object region.

In the stage 4007, the electronic device (e.g., the electronic device 101 in FIG. 1, the electronic device 200 in FIG. 2A, or the electronic device 300 in FIG. 3A) may capture the object region 4040 selected according to the touch input (e.g., a touch by a stylus pen or a hand).

Figure 41:
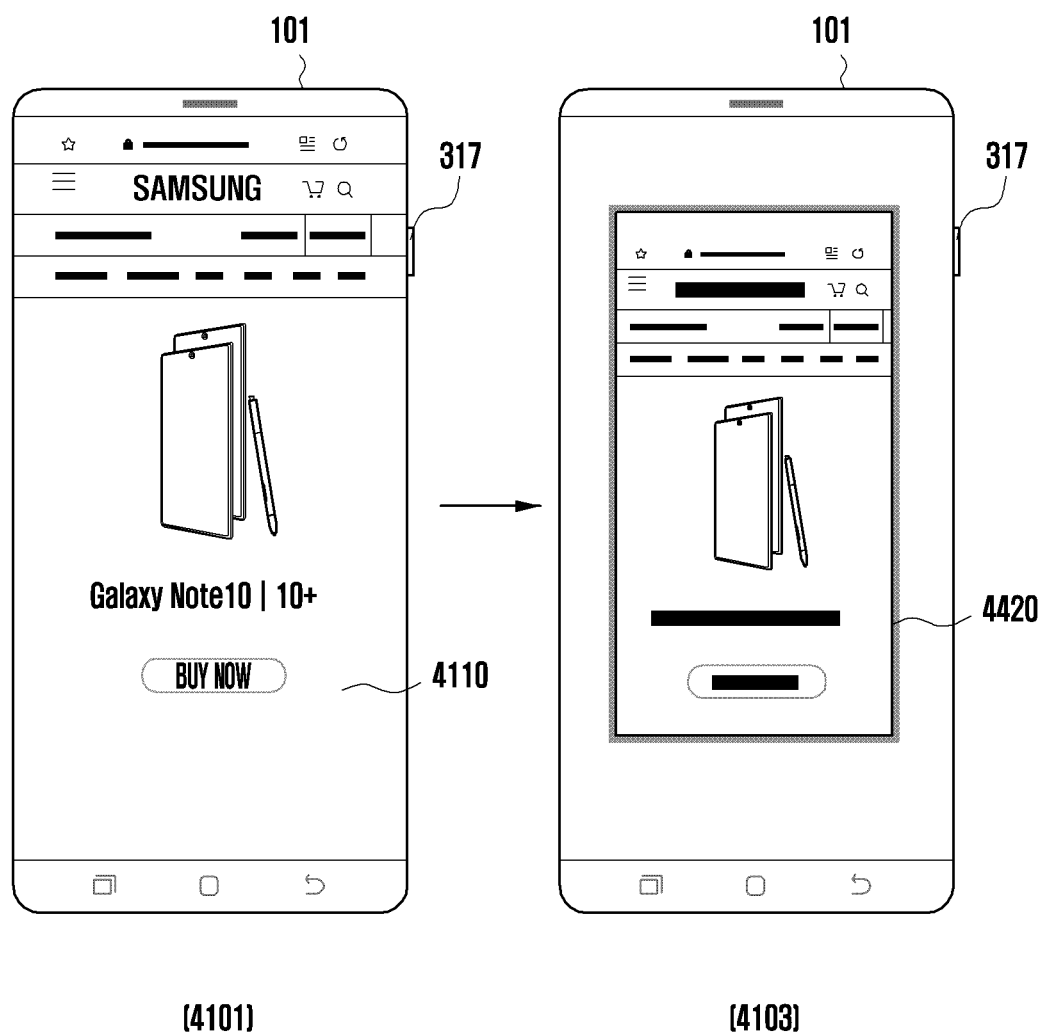
FIG. 41 is a diagram illustrating an operation of capturing the entire screen by an electronic device according to an embodiment of the disclosure.

FIG. 41 is a diagram illustrating an operation of capturing the entire screen by an electronic device (e.g., the electronic device 101 in FIG. 1, the electronic device 200 in FIG. 2A, or the electronic device 300 in FIG. 3A) according to an embodiment of the disclosure.

Referring to FIG. 41, in the stage 4101, the electronic device (e.g., the electronic device 101 in FIG. 1, the electronic device 200 in FIG. 2A, or the electronic device 300 in FIG. 3A) according to various embodiments may display a running process screen 4110 on a display (e.g., the display device 160 in FIG. 1).

In the stage 4103, when an input by a combination of multiple button keys (e.g., the input device 150 in FIG. 1, and the key input device 317 in FIGS. 3A and 3B) is received, the electronic device (e.g., the electronic device 101 in FIG. 1, the electronic device 200 in FIG. 2A, or the electronic device 300 in FIG. 3A) may capture a displayed screen 4420.

Figure 42:
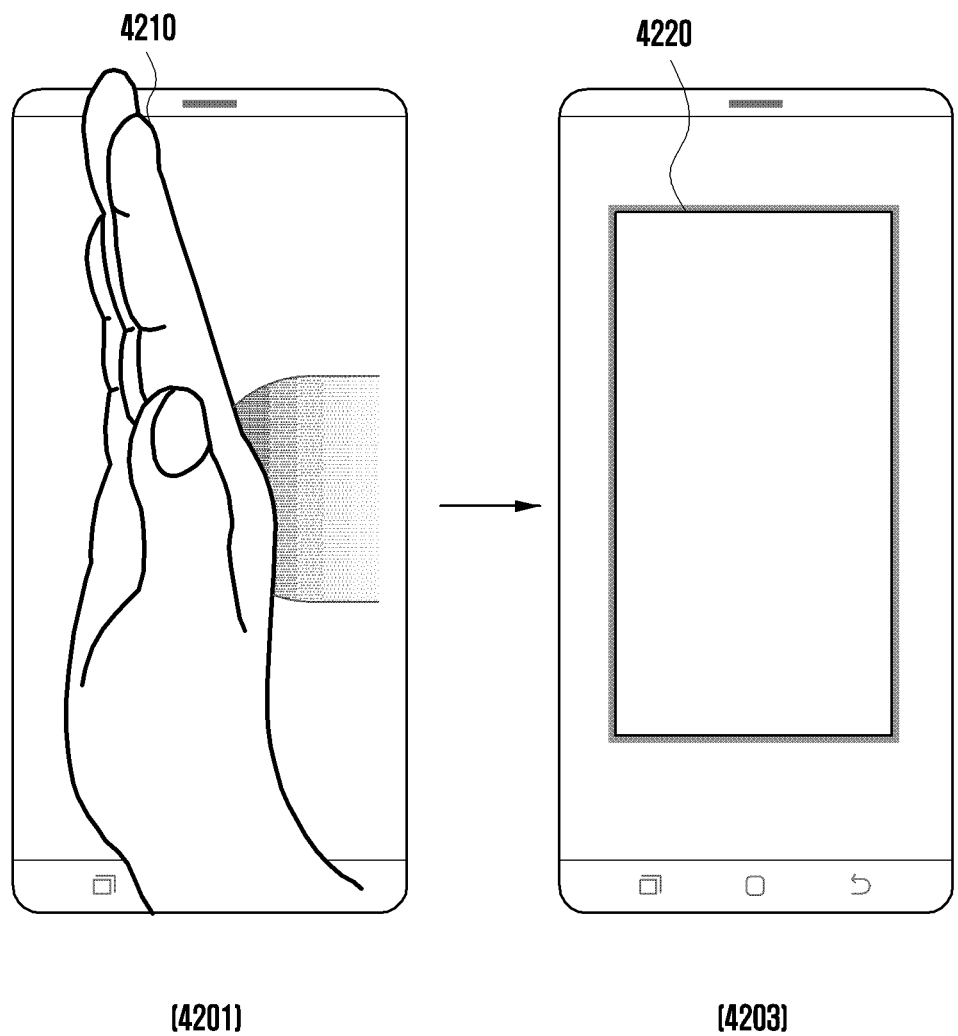
FIG. 42 is a diagram illustrating an operation of capturing the entire screen by an electronic device according to an embodiment of the disclosure.

FIG. 42 is a diagram illustrating an operation of capturing the entire screen by an electronic device (e.g., the electronic device 101 in FIG. 1, the electronic device 200 in FIG. 2A, or the electronic device 300 in FIG. 3A) according to an embodiment of the disclosure.

Referring to FIG. 42, in the stage 4201, an electronic device (e.g., the electronic device 101 in FIG. 1, the electronic device 200 in FIG. 2A, or the electronic device 300 in FIG. 3A) may receive a particular gesture 4210 by a touch input on a display (e.g., the display device 160 in FIG. 1). For example, the particular gesture by a touch input may be a gesture in which a user swipes the display (or a touch screen) with the edge or palm of his/her hand in a particular direction.

In the stage 4203, the electronic device (e.g., the electronic device 101 in FIG. 1, the electronic device 200 in FIG. 2A, or the electronic device 300 in FIG. 3A) may capture a displayed screen 4220.

Figure 43:
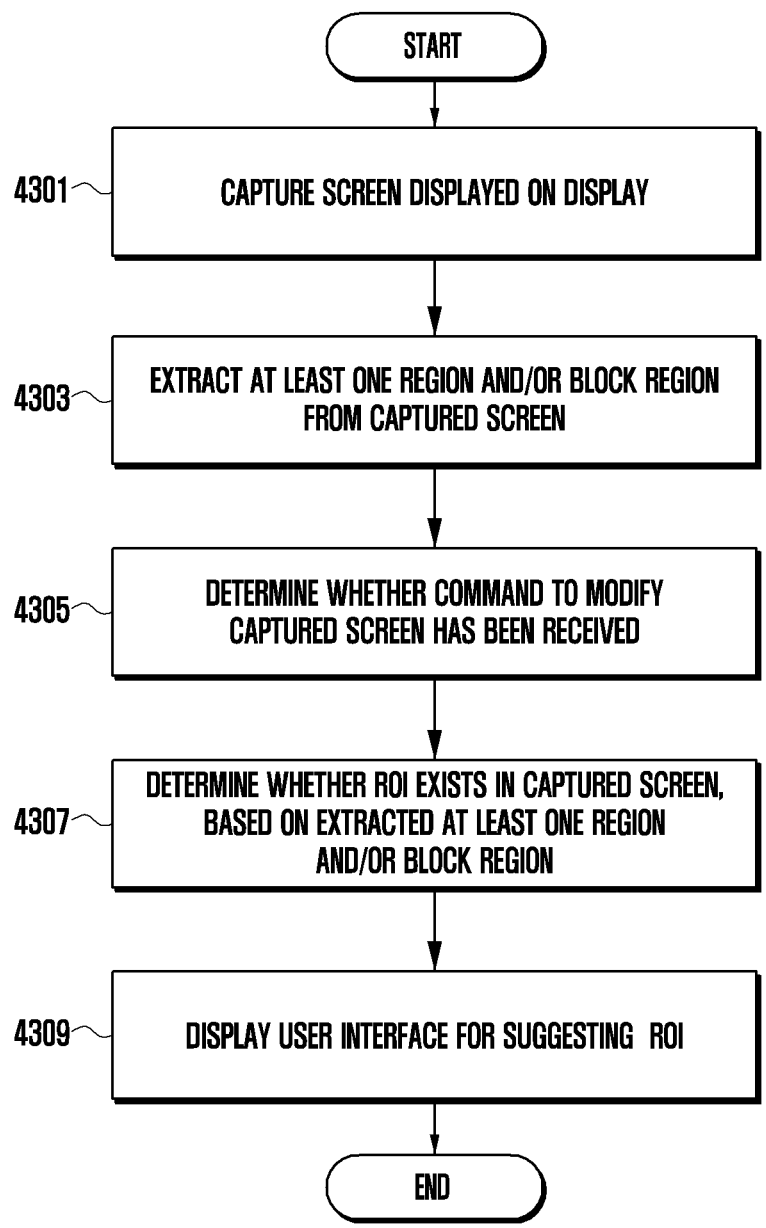
FIG. 43 is a flowchart illustrating a method for operating capturing by an electronic device according to an embodiment of the disclosure.

FIG. 43 is a flowchart illustrating a method for operating capturing by an electronic device (e.g., the electronic device 101 in FIG. 1, the electronic device 200 in FIG. 2A, or the electronic device 300 in FIG. 3A) according to an embodiment of the disclosure.

Referring to FIG. 43, an electronic device (e.g., the electronic device 101 in FIG. 1, the electronic device 200 in FIG. 2A, or the electronic device 300 in FIG. 3A) according to various embodiments may capture a screen displayed on a display (e.g., the display device 160 in FIG. 1, the display 230 in FIG. 2A, or the display 301 in FIG. 3A) under control of a processor (e.g., the processor 120 in FIG. 1), in operation 4301.

The electronic device (e.g., the electronic device 101 in FIG. 1, the electronic device 200 in FIG. 2A, or the electronic device 300 in FIG. 3A) according to various embodiments may extract at least one region and/or block region from the captured screen under control of the processor (e.g., the processor 120 in FIG. 1), in operation 4303.

The electronic device (e.g., the electronic device 101 in FIG. 1, the electronic device 200 in FIG. 2A, or the electronic device 300 in FIG. 3A) according to various embodiments may determine whether a command to modify the captured screen has been received, under control of the processor (e.g., the processor 120 in FIG. 1), in operation 4305.

If a command to modify the captured screen is received, the electronic device (e.g., the electronic device 101 in FIG. 1, the electronic device 200 in FIG. 2A, or the electronic device 300 in FIG. 3A) according to various embodiments may determine whether a region of interest (ROI) exists in the captured screen, based on the extracted at least one region and/or block region under control of the processor (e.g., the processor 120 in FIG. 1), in operation 4307.

If a region of interest (ROI) exists in the captured screen, the electronic device (e.g., the electronic device 101 in FIG. 1, the electronic device 200 in FIG. 2A, or the electronic device 300 in FIG. 3A) according to various embodiments may display a user interface for suggesting the region of interest (ROI) on the display (e.g., the display device 160 in FIG. 1) under control of the processor (e.g., the processor 120 in FIG. 1), in operation 4309.

According to various embodiments of the disclosure, the user interface for suggesting the region of interest (ROI) may be, for example, a GUI element related to highlight, inversion, a box, and/or an icon.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described element may include a single entity or multiple entities. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating capturing by an electronic device, the method comprising:
capturing a screen displayed on a display;
extracting an image region containing an image from the captured screen as distinguishable from a text region in the captured screen;
receiving a command to modify the captured screen;
in response to receiving the command to modify the captured screen, displaying a user interface including a first indication for indicating a region of interest (ROI) in the captured screen, based on the extracted image region, and a second indication for indicating a full screen region in the captured screen, wherein the user interface is configured to enable selection of one of the extracted image region included in the ROI or the full screen region in the captured screen;
in response to selection of the extracted image region included in the ROI, enabling a modification of the ROI; and
in response to selection of the full screen region, enabling a modification of the full screen region.

2. The method of claim 1, wherein the displaying of the user interface comprises maintaining a view layout of the captured screen while displaying the user interface for indicating the ROI for a pre-configured time interval.

3. The method of claim 2, wherein the user interface for indicating the ROI comprises a graphical user interface (GUI) element related to highlight, inversion, a box, and/or an icon.

4. The method of claim 1, further comprising:
determining whether the ROI is selected; and
based on determining that the ROI is selected, displaying a first edit screen.

5. The method of claim 4, further comprising:
based on determining that the ROI is not selected, displaying a second edit screen.

6. The method of claim 4, wherein the first edit screen comprises an edit screen in which a view layout of the captured screen is maintained while an editing tool user interface is placed to center on the ROI.

7. The method of claim 5, wherein the second edit screen comprises an edit screen in which a view layout of the captured screen is maintained while an editing tool user interface is placed to center on an entire screen.

8. The method of claim 4, further comprising:
determining whether there is editing according to a user input.

9. The method of claim 8, wherein the editing according to the user input comprises:
moving an editing tool user interface according to the user input to modify the first edit screen to an edited screen desired by a user in the captured screen; and
storing the edited screen as an image.

10. The method of claim 9, further comprising:
based on determining that the editing tool user interface reaches a threshold region of an object region while the editing tool user interface is being moved by the user input, snapping to the object region.

11. An electronic device comprising:
a display;
a processor operatively connected to the display; and
a memory operatively connected to the processor,
wherein the memory stores instructions which, when executed, cause the processor to:
capture a screen displayed on a display,
extract an image region containing an image from the captured screen as distinguishable from a text region in the captured screen,
receive a command to modify the captured screen,
in response to receiving the command to modify the captured screen, display a user interface including a first indication for indicating a region of interest (ROI) in the captured screen, based on the extracted image region, and a second indication for indicating a full screen region in the captured screen, wherein the user interface is configured to enable selection of one of the extracted image region included in the ROI or the full screen region in the captured screen,
in response to selection of the extracted image region included in the ROI, enable a modification of the ROI, and
in response to selection of the full screen region, enable a modification of the full screen region.

12. The electronic device of claim 11, wherein the instructions are further configured to cause the processor to maintain a view layout of the captured screen while displaying the user interface for indicating the ROI for a pre-configured time interval.

13. The electronic device of claim 12, wherein the user interface for indicating the ROI comprises a graphical user interface (GUI) element related to highlight, inversion, a box, and/or an icon.

14. The electronic device of claim 11, wherein the instructions are further configured to cause the processor to:
determine whether the ROI is selected, and
when the ROI is selected, display a first edit screen on the display.

15. The electronic device of claim 14, wherein the instructions are further configured to cause the processor to, when the ROI is not selected, display a second edit screen on the display.

16. The electronic device of claim 14, wherein the first edit screen is an edit screen in which a view layout of the captured screen is maintained while an editing tool user interface is placed to center on the ROI.

17. The electronic device of claim 15, wherein the second edit screen is an edit screen in which a view layout of the captured screen is maintained while an editing tool user interface is placed to center on an entire screen.

18. The electronic device of claim 14, wherein the instructions are further configured to cause the processor to:
determine whether there is editing according to a user input.

19. The electronic device of claim 18, wherein the instructions are further configured to cause the processor to:
move an editing tool user interface according to the user input to modify the first edit screen to an edited screen desired by a user in the captured screen, and
store the edited screen as an image.

20. The electronic device of claim 19, wherein the instructions are further configured to cause the processor to, when the editing tool user interface reaches a threshold region of an object region while the editing tool user interface is being moved by the user input, snap to the object region.

* * * * *